US011831739B2

(12) United States Patent
Yamada et al.

(10) Patent No.: US 11,831,739 B2
(45) **Date of Patent: *Nov. 28, 2023**

(54) COMMUNICATION APPARATUS AND COMMUNICATION SYSTEM

(71) Applicant: Sony Semiconductor Solutions Corporation, Kanagawa (JP)

(72) Inventors: Junya Yamada, Kanagawa (JP); Satoshi Ota, Kanagawa (JP); Toshihisa Hyakudai, San Diego, CA (US)

(73) Assignee: Sony Semiconductor Solutions Corporation, Kanagawa (JP)

( * ) Notice: Subject to any disclaimer, the term of this patent is extended or adjusted under 35 U.S.C. 154(b) by 266 days.

This patent is subject to a terminal disclaimer.

(21) Appl. No.: 17/241,614

(22) Filed: Apr. 27, 2021

(65) Prior Publication Data

US 2021/0400123 A1 Dec. 23, 2021

Related U.S. Application Data

(60) Provisional application No. 63/042,229, filed on Jun. 22, 2020.

(51) Int. Cl.

*G06F 15/16* (2006.01)
*H04L 69/08* (2022.01)
*H04L 1/1607* (2023.01)

(52) U.S. Cl.

CPC ............ *H04L 69/08* (2013.01); *H04L 1/1607* (2013.01)

(58) Field of Classification Search

CPC .............................. H04L 69/08; H04L 1/1607

(Continued)

(56) References Cited

U.S. PATENT DOCUMENTS

2002/0165962 A1* 11/2002 Alvarez .............. H04L 41/0843 709/230
2003/0026525 A1* 2/2003 Alvarez ............. H04Q 11/0005 385/16

(Continued)

FOREIGN PATENT DOCUMENTS

CN 101507183 A 8/2009
JP 2010502046 A 1/2010

(Continued)

*Primary Examiner* — Vivek Srivastava
*Assistant Examiner* — Karina J Garcia-Ching
(74) *Attorney, Agent, or Firm* — Michael Best & Friedrich LLP

(57) ABSTRACT

A communication apparatus includes: a LINK for performing protocol-conversion on a signal from a Master and outputting the converted signal to a Slave SerDes and for performing protocol-conversion on a signal from the Slave SerDes and outputting the converted signal to the Master, the LINK being capable of alternatively selecting a first mode and a second mode when transmitting the signal from the Master to the Slave SerDes, in the first mode, the LINK converting the signal transmitted from the Master into a signal of a first communication standard in units of one byte, receiving a signal of the first communication standard including one of an ACK signal representing an affirmative response and a NACK signal representing a negative response after transmitting the converted signal to the Slave SerDes, converting the received signal into a signal of a second communication standard, and transmitting the converted signal to the Master.

20 Claims, 74 Drawing Sheets

(58) Field of Classification Search
USPC .................................. 709/208; 370/466, 467
See application file for complete search history.

(56) References Cited

U.S. PATENT DOCUMENTS

| | | | | |
|---|---|---|---|---|
| 2003/0091267 | A1* | 5/2003 | Alvarez | H04Q 11/0005 385/16 |
| 2005/0047334 | A1* | 3/2005 | Paul | H04L 49/505 370/229 |
| 2008/0072113 | A1* | 3/2008 | Tsang | H04L 1/1874 714/748 |
| 2009/0086735 | A1* | 4/2009 | Tsang | H04L 49/901 370/394 |
| 2010/0194996 | A1 | 8/2010 | Vergoossen | |
| 2012/0230671 | A1* | 9/2012 | Nakada | H04L 1/1825 398/1 |
| 2015/0237145 | A1* | 8/2015 | Koseki | H04L 67/56 709/225 |
| 2017/0220517 | A1* | 8/2017 | Khan | H04B 1/40 |

FOREIGN PATENT DOCUMENTS

| | | | |
|---|---|---|---|
| JP | 2011044100 | A | 3/2011 |
| JP | 2011239011 | A | 11/2011 |
| JP | 2015154260 | A | 8/2015 |
| WO | WO-2008020401 | A2 | 2/2008 |

* cited by examiner

Figure 5. Write Format To Remote $I^2C$ Slave

| cmd_mode [7]=0 | value | function | |
|---|---|---|---|
| [7] | 1 | Byte I2C mode | |
| | 0 | Bulk I2C mode | |
| [6] | 1 | Slave-side I2C communication Retry mode at time of NACK reception | Retry |
| | 0 | | Not retry |
| [5] | 1 | Define Slave SerDes operation where NACK has come during Slave access | Output RAW DATA |
| | 0 | | normal |
| [4] | 1 | I2C command batch transmission mode | Transmit at time of End of data and cmd_done |
| | 0 | | Perform end determination for each End of data and reply |
| [3] | 1 | Slave-side I2C address mode | current location (sub address not set) |
| | 0 | | random location (sub address set) |
| [2:0] | 111 | I2C format type on communication standard X | Error command Format |
| | 110 | | Special command Format |
| | 10X | | Reserved |
| | 011 | | Read response Format |
| | 010 | | ACK/NACK Format |
| | 001 | | Read command Format |
| | 000 | | Write command Format |

cmd_mode [7:0] in Bulk I2C mode

FIG.10A

| cmd_mode [7]=1 | value | function | |
|---|---|---|---|
| [7] | 1 | Byte I2C mode | |
| | 0 | Bulk I2C mode | |
| [6:5] | 11 | Clk_mode: defines node1 to tell node2 on generating clocks automatically or manually for Slave. | generates 9 clocks manually for ACK/NACK + DATA |
| | 10 | | generates 8 clocks manually for DATA |
| | 01 | | generates 1 clock manually for ACK/NACK |
| | 00 | | generates 9/8/1 clocks automatically |
| [4] | 1 | I2C Packet Type: defines the packetized I2C data<br>(Remarks) If error occurs, cmd_mode[3:0] indicates 4'b1111. Usually this combination doesn't exist. | Write/Read DATA to follow cmd_mode |
| | 0 | | No Write/Read DATA to follow cmd_mode |
| [3] | 1 | | NACK received from Slave or Master |
| | 0 | | No NACK received |
| [2] | 1 | | ACK received from Slave or Master |
| | 0 | | No ACK received |
| [1] | 1 | | STOP detected |
| | 0 | | No STOP detected |
| [0] | 1 | | START/ReSTART detected |
| | 0 | | No START/ReSTRAT detected |

cmd_mode [7:0] in Byte I2C mode

FIG.10B

Table2: (I2C Cmd Table in I2C Cmd Unit)

I2C command packet value

| Function | bit | 7 | 6 | 5 | 4 | 3 | 2 | 1 | 0 |
|---|---|---|---|---|---|---|---|---|---|
| ACK | 81 | 1 | 0 | 0 | 0 | 0 | 0 | 0 | 1 |
| NACK | 7E | 0 | 1 | 1 | 1 | 1 | 1 | 1 | 0 |
| Repeated_start | 60 | 0 | 1 | 1 | 0 | 0 | 0 | 0 | 0 |
| End of data | 9F | 1 | 0 | 0 | 1 | 1 | 1 | 1 | 1 |
| cmd_done | FF | 1 | 1 | 1 | 1 | 1 | 1 | 1 | 1 |
| Rsv_command | XX | X | X | X | X | X | X | X | X |

FIG.12 cmd_mode = 8'b1000_0001
[7]=1: Byte I2C mode
[6:5] = 00: node2 clocks automatically
[4] = 0: No DATA
[3] = 0: No NACK
[2] = 0: No ACK
[1] = 0: No STOP
[0] = 1: START (P3)

cmd_mode = 8'b1011_0001
[7]=1: Byte I2C mode
[6:5] = 01: node2 generates 1 clock manually
[4] = 1: DATA
[3] = 0: No NACK
[2] = 0: No ACK
[1] = 0: No STOP
[0] = 1: START/ReSTART (P4)

cmd_mode = 8'b1111_0001
[7]=1: Byte I2C mode
[6:5] = 11: node2 generates 9 clocks manually
[4] = 1: DATA
[3] = 0: NACK
[2] = 0: No ACK
[1] = 0: No STOP
[0] = 1: START/ReSTART (P5)
cmd_mode = 8'b1001_0100
[7]=1: Byte I2C mode
[6:5] = xx
[4] = 1: DATA
[3] = 0: No NACK
[2] = 1: ACK
[1] = 0: No STOP
[0] = 0: No START (P6)

cmd_mode = 8'b1000_1010
[7]=1: Byte I2C mode
[6:5] = xx
[4] = 0: No DATA
[3] = 1: NACK
[2] = 0: No ACK
[1] = 1: STOP
[0] = 0: No START Write operation 2

Write operation 3

Write operation 4

Read operation 1

Read operation 3

Err operation 1

Err operation 2

1W. Operation (Random Write) of Master → SerDes 1

Table1:
Stored data in mem 1

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | wdata |
| ... | ... |
| N-2 | wdata |
| N-1 | End of data |

FIG.28

2W. Operation (Random Write) of SerDes 1 → SerDes 2

Table3:
Stored data in mem 2

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | wdata |
| ... | ... |
| N-2 | wdata |
| N-1 | End of data |

FIG.30

3W. Operation (Random Write) of SerDes 2 → Slave

Table3:
Stored data in mem 2

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | wdata |
| ... | ... |
| N-2 | wdata |
| N-1 | End of data |
| N | A or Nak |

FIG.33

Table1:
Stored data in mem 1

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | wdata |
| ... | ... |
| N-2 | wdata |
| N-1 | End of data |
| N | CLK_value |
| N+1 | Cmd_mode |
| N+2 | Master_Adr |
| N+3 | Sub_adrH |
| N+4 | Sub_adrL |
| N+5 | LengthH |
| N+6 | LengthL |
| N+7 | Slave_adr |
| N+8 | A or Nak |
| N+9 | End of data |

FIG.35

7W. Operation (Random Write) of Master → SerDes 1 // Finishing processing

Table1:
Stored data in mem 1

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | wdata |
| ... | ... |
| N-2 | wdata |
| N-1 | End of data |
| N | CLK_value |
| N+1 | Cmd_mode |
| N+2 | Master_Adr |
| N+3 | Sub_adrH |
| N+4 | Sub_adrL |
| N+5 | LengthH |
| N+6 | LengthL |
| N+7 | Slave_adr |
| N+8 | A or Nak |
| N+9 | End of data |
| N+10 | Clear |

FIG.38

1WS. Overview of operation (Random Write & cmd_done) of Master → SerDes 1

1R. Operation (Random Read) of Master → SerDes 1

Table1:
Stored data in mem 1

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | End of data |

FIG.43

2R. Operation (Random Read) of SerDes 1 → SerDes 2

Table3:
Stored data in mem 2

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | End of data |

FIG.45

3R. Operation (Random Read) of SerDes 2 → Slave

Table3:
Stored data in mem 2

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | End of data |
| 8 | rdata |
| ... | ... |
| N-2 | rdata |
| N-1 | A or Nak |
| N | End of data |

FIG.47

4R. Operation (Random Read) of SerDes 2 → SerDes 1

5R. Operation (mem write) of SerDes 1 // Holding of request command result

Table1:
Stored data in mem 1

| Sub Adr | Data[7:0] |
| --- | --- |
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | End of data |
| 8 | CLK_value |
| 9 | cmd_mode |
| 10 | Master Adr |
| 11 | Sub_adrH |
| 12 | Sub_adrL |
| 13 | LengthH |
| 14 | LengthL |
| 15 | Slave Adr |
| 16 | A or Nak |
| ··· | rdata0 |
| N-3 | ··· |
| N-2 | Rdata M |
| N-1 | End of data |

FIG.50

Table1:
Stored data in mem 1

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | End of data |
| 8 | CLK_value |
| 9 | cmd_mode |
| 10 | Master Adr |
| 11 | Sub_adrH |
| 12 | Sub_adrL |
| 13 | LengthH |
| 14 | LengthL |
| 15 | Slave Adr |
| 16 | A or Nak |
| ... | Rdata 0 |
| N-3 | ... |
| N-2 | Rdata M |
| N-1 | End of data |
| N | Clear |

FIG.52

Table3:
Stored data in mem 2

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | End of data |
| 8 | A or Nak |
| 9 | rdata 0 |
| ... | ... |
| N-2 | rdata M |
| N-1 | End of data |

FIG.54

Normal Read Case

Read Error Case1

Table3:
Stored data in mem 2

| Format | Sub Adr | Data[7:0] |
|---|---|---|
| Read Command Format | 0 | CLK_value |
| | 1 | cmd_mode |
| | 2 | Slave Adr |
| | 3 | Sub_adrH |
| | 4 | Sub_adrL |
| | 5 | LengthH |
| | 6 | LengthL |
| | 7 | End of data |
| Error Command Format | 8 | A or Nak |
| | 9 | rdata 0 |
| | ... | Don't care |
| | N-2 | Don't care |
| | N-1 | End of data |

FIG.57

Table1:
Stored data in mem 1

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | End of data |
| 8 | CLK_value |
| 9 | cmd_mode |
| 10 | Master Adr |
| 11 | Sub_adrH |
| 12 | Sub_adrL |
| 13 | LengthH |
| 14 | LengthL |
| 15 | Slave Adr |
| 16 | A or Nak |
| ··· | rdata0 |
| N-3 | Don't care |
| N-2 | Don't care |
| N-1 | End of data |

Read Command Format (Sub Adr 0–7)

Error Command Format (Sub Adr 8–N-1)

clk_value sub_adr=8 cnd_mode sub_adr=9

Error Command Format (→ cmd_mode)

FIG.58

Read Error Case2

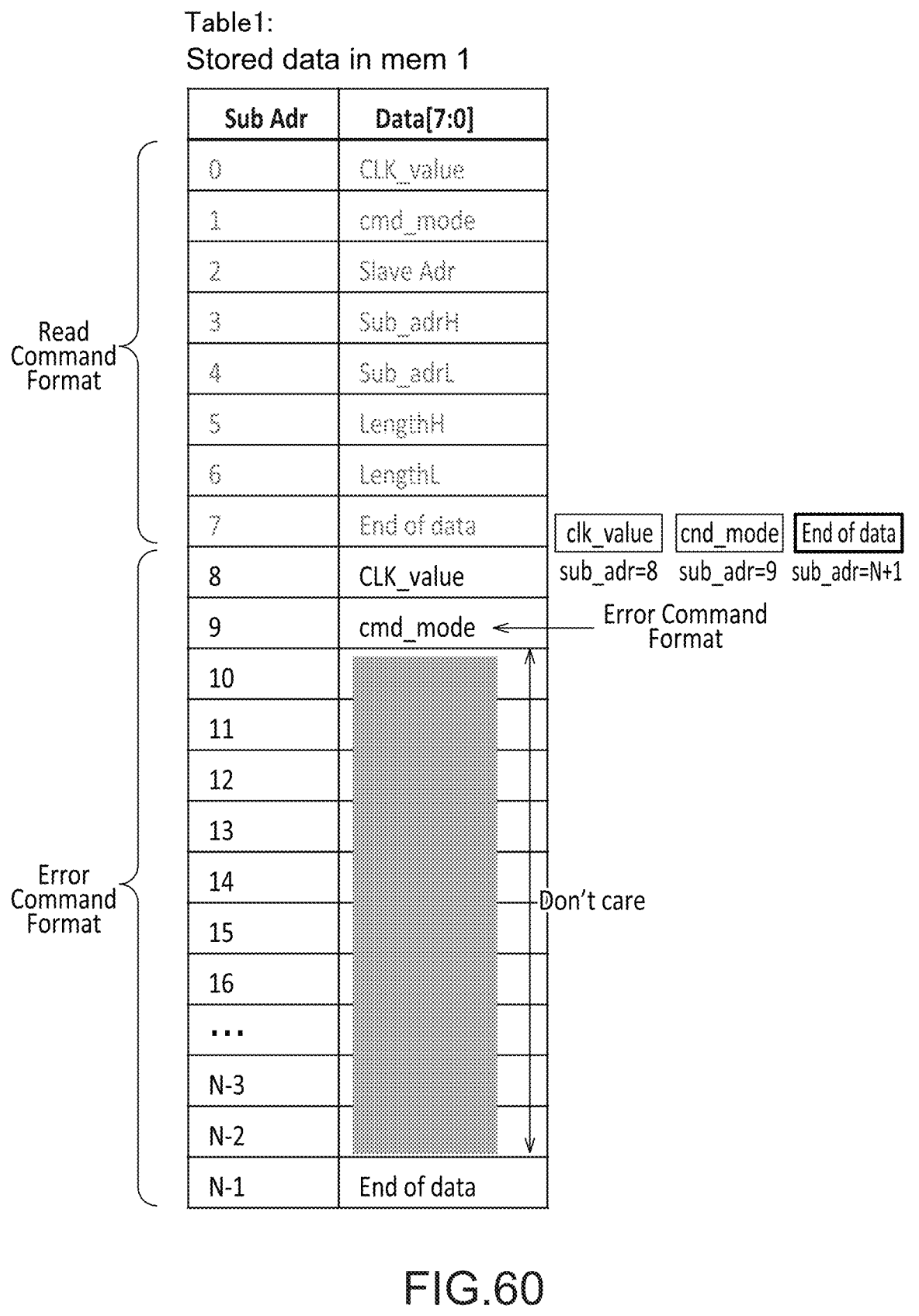

Table1:
Stored data in mem 1

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | End of data |
| 8 | CLK_value |
| 9 | cmd_mode |
| 10 | |
| 11 | |
| 12 | |
| 13 | |
| 14 | |
| 15 | |
| 16 | |
| ... | |
| N-3 | |
| N-2 | |
| N-1 | End of data |

Read Command Format (Sub Adr 0–7)

Error Command Format (Sub Adr 8–N-1)

cmd_mode (Sub Adr 9) ← Error Command Format

Sub Adr 10 – N-2: Don't care

| clk_value | cnd_mode | End of data |
|---|---|---|
| sub_adr=8 | sub_adr=9 | sub_adr=N+1 |

FIG.60

Table1:
Stored data in mem 1

| Sub Adr | Data[7:0] |
|---|---|
| 0 | CLK_value |
| 1 | cmd_mode |
| 2 | Slave Adr |
| 3 | Sub_adrH |
| 4 | Sub_adrL |
| 5 | LengthH |
| 6 | LengthL |
| 7 | wdata |
| ... | ... |
| N-2 | wdata |
| N-1 | End of data |
| N | CLK_value |
| N+1 | Cmd_mode |
| N+2 | |
| N+3 | |
| N+4 | |
| N+5 | |
| N+6 | |
| N+7 | |
| N+8 | |
| N+9 | End of data |

Write Command Format (Sub Adr 0 to N-1)

Error Command Format (Sub Adr N to N+9)

Don't care (N+2 to N+8)

Error Command Format ← wdata (N-2)

clk_value sub_adr=N
cnd_mode sub_adr=N+1
End of data sub_adr=N+9

FIG.61

COMMUNICATION APPARATUS AND COMMUNICATION SYSTEM

CROSS REFERENCE TO RELATED APPLICATIONS

This application claims the benefit of U.S. Priority Patent Application U.S. 63/042,229 filed Jun. 22, 2020, the entire contents of which are incorporated herein by reference.

BACKGROUND

The present disclosure relates to a communication apparatus and a communication system.

A technology for performing, when data communication is performed between a master apparatus and a slave apparatus, serial communication between a SerDes apparatus for the master apparatus and a SerDes apparatus for the slave apparatus has been proposed.

SUMMARY

In the case where the slave apparatus receives data transmitted from the master apparatus, it is common for the slave apparatus to transmit, to the master apparatus, an ACK signal indicating that the data has been received.

In the case where two SerDes apparatuses are located between the master apparatus and the slave apparatus, since the ACK signal passes through these SerDes apparatuses, it takes a considerable amount of time for the master apparatus to receive the ACK signal after the slave apparatus transmits the ACK signal.

In the case where the specification is such that a new signal cannot be transmitted to the slave apparatus until the master apparatus receives the ACK signal from the slave apparatus, it takes time to receive the ACK signal, which may delay the processing of the master apparatus.

In this regard, the present disclosure provides a communication apparatus and a communication system capable of efficiently performing data communication.

In order to achieve the above-mentioned object, in accordance with the present disclosure, there is provided a communication apparatus including:

a LINK for performing protocol-conversion on a signal from a Master and outputting the converted signal to a Slave SerDes and for performing protocol-conversion on a signal from the Slave SerDes and outputting the converted signal to the Master, in which the LINK is capable of alternatively selecting a first mode and a second mode when transmitting the signal from the Master to the Slave SerDes, in the first mode, the LINK repeats processing of converting the signal transmitted from the Master into a signal of a first communication standard in units of one byte, receiving a signal of the first communication standard including one of an ACK signal representing an affirmative response and a NACK signal representing a negative response after transmitting the converted signal to the Slave SerDes, converting the received signal into a signal of a second communication standard, and transmitting the converted signal to the Master, in the second mode, the LINK transmits, to the Master, a signal including one of the ACK signal and the NACK signal every time a signal of a plurality of bytes transmitted from the Master is received byte by byte, collectively transmits the converted signal to the Slave SerDes after the conversion of the signal of a plurality of bytes received from the Master is completed, then, receives a signal of the first communication standard including one of the ACK signal and the NACK signal from the Slave SerDes and holds the received signal, and then, converts, in response to a read request from the Master, the signal of the first communication standard into a signal of the second communication standard and transmits the converted signal to the Master, a signal to be transmitted to the Slave SerDes includes command information indicating content transmitted from the Master, and a signal to be transmitted to the Master includes command information indicating content transmitted from the Slave SerDes.

The number of bytes of the signal to be transmitted to the Slave SerDes in the first mode may be one of 2 bytes and 3 bytes except for clock frequency information and error correction code.

In the first mode, the LINK may transition to a first state upon receiving a signal including a Start Condition from the Master, convert, when transitioning to the first state, the Start Condition into a signal of the first communication standard and transmits the obtained signal to the Slave SerDes, then, transition to a second state upon receiving, in the first state, a signal including address information of a final destination apparatus of one byte from the Master, and hold a clock from the Master at a low level, convert, in the second state, a signal including the address information into a signal of the first communication standard and transmit the obtained signal to the Slave SerDes, then, upon receiving, in the second state, a signal including one of the ACK signal and the NACK signal from the Slave SerDes, recognize, where a specific bit of the signal including the address information has a first bit value, the specific bit as writing and transition to a third state, and convert, in the third state, the signal including one of the ACK signal and the NACK signal received from the Slave SerDes into a signal of the second communication standard, transmit the obtained signal to the Master, and then, release the holding of the low level of the clock from the Master.

In the first mode, the LINK may transition to a fourth state upon receiving, in the third state, a signal including writing data of one byte from the Master, convert, in the fourth state, the received signal into a signal of the first communication standard, and transmit the obtained signal to the Slave SerDes, and then, upon receiving, in the fourth state, a signal including one of the ACK signal and the NACK signal from the Slave SerDes, convert the received signal into a signal of the second communication standard and transmit the obtained signal to the Master.

In the first mode, the LINK may transition to a fifth state where the signal including one of the ACK signal and the NACK signal is not received from the Slave SerDes within a predetermined time period in one of the second state and the fourth state, and perform error processing in the fifth state.

In the first mode, the LINK may transition to the first state upon receiving a signal including one of a Start Condition and a ReStart Condition from the Master, convert, when transitioning to the first state, the signal including one of the Start Condition and the ReStart Condition into a signal of the first communication standard and transmit the obtained signal to the Slave SerDes, then, transition to the second state upon receiving, in the first state, a signal including address information of a final destination apparatus of one byte from the Master, and hold a clock from the Master at a low level, convert, in the second state, a signal including the address information into a signal of the first communication standard and transmit the obtained signal to the Slave SerDes, then, upon receiving, in the second state, a signal including one of the ACK signal and the NACK signal from the Slave SerDes, recognize, where a specific bit of the signal including the address information has a second bit value, the specific bit as reading and transition to a sixth state, and convert, in the sixth state, the signal including one of the ACK signal and the NACK signal received from the Slave SerDes into a signal of the second communication standard, transmit the obtained signal to the Master, and then, release the holding of the low level of the clock from the Master.

In the first mode, the LINK may transition to a seventh state upon receiving, in the sixth state, a signal including reading data of one byte from the Slave SerDes, convert, in the seventh state, the received signal into a signal of the second communication standard, and transmit the obtained signal to the Master, and then, transition to the sixth state upon receiving, in the seventh state, a signal including one of the ACK signal and the NACK signal from the Master, convert the received signal into a signal of the first communication standard, and transmit the obtained signal to the Slave SerDes.

In the first mode, the LINK may transition to an eighth state where the reading data is not received from the Slave SerDes within the predetermined time period in the sixth state, transition to the eighth state where the one of the ACK signal and the NACK signal is not received from the Master within the predetermined time period in the seventh state, and perform error processing in the eighth state to avoid deadlock of an entire system including the communication apparatus, the Master, and the Slave SerDes.

In the second mode, the LINK may hold the received signal from when receiving the signal including the Start Condition to when receiving a signal including a Stop Condition, and transmit a signal including one of the ACK signal and the NACK signal to the Master byte by byte of the received signal, convert the received signal into a signal of the first communication standard, and transmit the converted signal to the Slave SerDes, and receive a signal including one of the ACK signal and the NACK signal from the Slave SerDes and holds the received signal, then convert, in accordance with a reading request from the Master, the signal from the Slave SerDes into a signal of the second communication standard, and transmit the obtained signal to the Master.

The command information may include at least one of first information for selecting one of the first mode and the second mode, second information for alternatively selecting, where the first mode is selected, whether one of the Slave SerDes and the communication apparatus generates a clock signal for transmitting and receiving data by its own determination or one of the Slave SerDes and the communication apparatus explicitly designates the clock signal to be used, third information indicating, where the first mode is selected, whether or not one of writing data and reading data is included, fourth information indicating, where the first mode is selected, whether or not the NACK signal is received, fifth information indicating, where the first mode is selected, whether or not the ACK signal is received, sixth information indicating, where the first mode is selected, whether or not a Stop Condition instructing to stop transmission of information is included, or seventh information indicating, where the first mode is selected, whether or not one of a Start Condition instructing to start transmission of information and a Repeated Start Condition instructing to resume transmission of information is included.

In the first mode, the LINK may transmit the signal including the seventh information to the Slave SerDes, and then transmit the signal including the address information of the final destination apparatus to the Slave SerDes.

In the first mode, the LINK may transmit a signal obtained by combining the seventh information and the address information of the final destination apparatus to the Slave SerDes.

Each of the signal to the Slave SerDes and the signal to the Master may include, in addition to the command information, at least one of an error correction code, data, clock frequency information, or information indicating a type of a command to be transmitted and received.

The signal to the Slave SerDes may include at least one of final destination address information for identifying the final destination apparatus of the signal transmitted from the Master, sub-address information of the final destination apparatus, or data-length information indicating a length of data transmitted from the Master.

The command information may include, where the second mode is selected, command-format information defined by the first communication standard, and the command-format information may include an error command format.

The command information may include, where the second mode is selected, data-end-determination-condition information for specifying a condition for determining an end of the signal transmitted from the Master.

Each of the signal to the Slave SerDes and the signal from the Slave SerDes may include a command obtained by performing protocol conversion on a command of I2C (Inter-Integrated Circuit) communication into a command of the first communication standard.

The protocol conversion by the LINK may be protocol conversion of TDD (Time Division Duplex).

In accordance with the present disclosure, there is provided a communication apparatus, including:

a LINK for performing protocol-conversion on a signal from a Master SerDes and outputting the converted signal to a Slave and for performing protocol-conversion on a signal from the Slave and outputting the converted signal to the Master SerDes, in which the LINK is capable of alternatively selecting a first mode and a second mode when transmitting the signal from the Master SerDes to the Slave, in the first mode, the LINK repeats processing of converting a signal of a first communication standard transmitted from the Master SerDes into a signal of a second communication standard in units of the received signal, receiving a signal of the second communication standard including one of an ACK signal representing an affirmative response and a NACK signal representing a negative response after transmitting the converted signal to the Slave, converting the received signal into a signal of the first communication standard, and transmitting the converted signal to the Master SerDes, in the second mode, the LINK converts, upon receiving a signal of a plurality of bytes of the first communication standard transmitted from the Master SerDes, the received signal into a signal of the second communication standard, and transmits the converted signal to the Slave byte by byte, receives, every time the converted signal is transmitted to the Slave byte by byte, a signal of the second communication standard including one of the ACK signal and the NACK signal from the Slave and holds the received signal, and transmits, after finishing transmitting the signal from the Master SerDes to the Slave, a signal of the first communication standard corresponding to the held signal to the Master SerDes, a signal from the Master SerDes includes command information indicating content transmitted from the Master SerDes, and a signal from the Slave includes command information indicating content transmitted from the Slave.

In accordance with the present disclosure, there is provided a communication system, including:

a Master SerDes that includes a first LINK; and a Slave SerDes that includes a second LINK, in which the first LINK is capable of alternatively selecting a first mode and a second mode when transmitting the signal from a Master to the Slave SerDes, in the first mode, the first LINK repeats processing of converting the signal transmitted from the Master into a signal of a first communication standard in units of one byte, receiving a signal of the first communication standard including one of an ACK signal representing an affirmative response and a NACK signal representing a negative response after transmitting the converted signal to the Slave SerDes, converting the received signal into a signal of a second communication standard, and transmitting the converted signal to the Master, in the second mode, the first LINK transmits, to the Master, a signal including one of the ACK signal and the NACK signal every time a signal of a plurality of bytes transmitted from the Master is received byte by byte, collectively transmits the converted signal to the Slave SerDes after the conversion of the signal of a plurality of bytes received from the Master is completed, then, receives a signal of the first communication standard including one of the ACK signal and the NACK signal from the Slave SerDes and holds the received signal, and then, converts, in response to a read request from the Master, the signal of the first communication standard into a signal of the second communication standard and transmits the converted signal to the Master, a signal to be transmitted to the Slave SerDes includes command information indicating content transmitted from the Master, a signal to be transmitted to the Master includes command information indicating content transmitted from the Slave SerDes, the second LINK is capable of alternatively selecting a first mode and a second mode when transmitting the signal from the Master SerDes to the Slave, in the first mode, the second LINK repeats processing of converting a signal of a first communication standard transmitted from the Master SerDes into a signal of a second communication standard in units of the received signal, receiving a signal of the second communication standard including one of an ACK signal representing an affirmative response and a NACK signal representing a negative response transmitted from the Slave after transmitting the converted signal to the Slave, converting the received signal into a signal of the first communication standard, and transmitting the converted signal to the Master SerDes, in the second mode, the second LINK converts, upon receiving a signal of a plurality of bytes of the first communication standard transmitted from the Master SerDes, the received signal into a signal of the second communication standard, and transmits the converted signal to the Slave byte by byte, receives, every time the converted signal is transmitted to the Slave byte by byte, a signal of the second communication standard including one of the ACK signal and the NACK signal from the Slave and holds the received signal, and transmits, after finishing transmitting the signal from the Master SerDes to the Slave, a signal of the first communication standard corresponding to the held signal to the Master SerDes, a signal from the Master SerDes includes command information indicating content transmitted from the Master SerDes, and a signal from the Slave includes command information indicating content transmitted from the Slave.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 10A is a diagram showing an example of a cmd_mode in the Bulk I2C mode;

FIG. 10B is a diagram showing an example of the cmd_mode in the Byte I2C mode;

FIG. 12 is a diagram showing a type and bit strings of a command transmitted over the communication standard X protocol;

FIG. 28 is a diagram showing an example of data stored in a table 1 in a mem 1 in the Bulk I2C mode;

FIG. 30 is a diagram showing an example of a table 3 in a mem 2 at the time of the Random Write operation in the Bulk I2C mode;

FIG. 33 is a diagram showing the state of a storage area of a mem 2 before releasing the storage area in response to the Random Write Command in the Bulk I2C mode;

FIG. 35 is a diagram showing a state table 1 of the mem 1 after receiving reply data from the Slave SerDes in response to the Random Write Command in the Bulk I2C mode;

FIG. 38 is a diagram showing stored data in the mem 1 before the storage area is released in response to the Random Write Command in the Bulk I2C mode;

FIG. 43 is a diagram showing stored data of the table 1 in the mem 1 at the time of the Random Read operation in the Bulk I2C mode;

FIG. 45 is a diagram showing stored data in a table 3 in the mem 2 at the time of the Random Read operation in the Bulk I2C mode;

FIG. 47 is a diagram showing stored data of the table 3 in the mem 2 after the Random Read operation in the Bulk I2C mode;

FIG. 50 is a diagram showing an example of data in the mem 1 after receiving reply data from the Slave SerDes in response to the Random Read Command in the Bulk I2C mode;

FIG. 52 is a diagram showing an example of stored data of the table 1 in the mem 1 before releasing the storage area in response to the Random Read Command in the Bulk I2C mode;

FIG. 54 is a diagram showing an example of stored data of the table 3 in the mem 2 in the case where the Random Read Command is performed in the Bulk I2C mode;

FIG. 57 is a diagram showing stored data of the table 3 in the mem 2 when the Slave SerDes has transmitted the error command format in the Bulk I2C mode;

FIG. 58 is a diagram showing stored data of the table 1 in the mem 1 when the Master SerDes has received the error command format in the Bulk I2C mode;

FIG. 60 is a diagram showing stored data of the table 1 in the mem 1 of the node 1 in the Read error case 2;

FIG. 61 is a diagram showing stored data of the table 1 in the mem 1 of the node 1 in a Write error case.

DETAILED DESCRIPTION OF EMBODIMENTS

Hereinafter, an embodiment of a communication apparatus and a communication system 3 will be described with reference to the drawings. Although the main components of the communication apparatus and the communication system 3 will be mainly described below, there may be components and functions not shown or described in the communication apparatus and the communication system 3. The following description does not exclude components or functions not shown or described.

Figure 1:
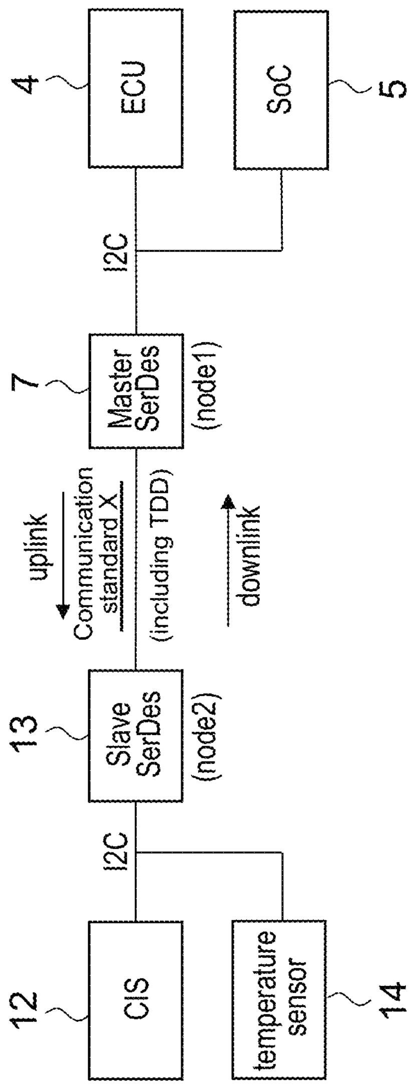
FIG. 1 is a block diagram showing a schematic configuration of a communication system including a communication apparatus according to an embodiment.
Figure 2:
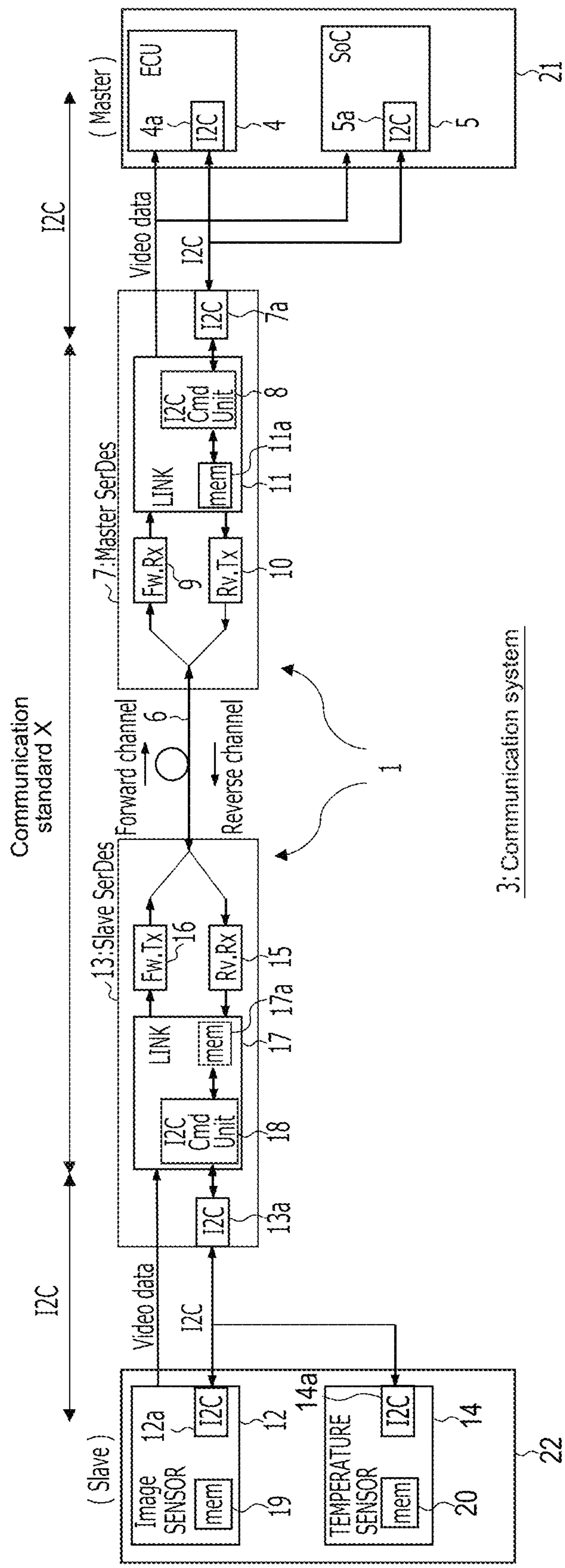
FIG. 2 is a block diagram of a more specific one of the communication system shown in FIG. 1.

FIG. 1 is a block diagram showing a schematic configuration of a communication system including a communication apparatus according to an embodiment, and FIG. 2 is a block diagram of a more specific one of the communication system shown in FIG. 1. The communication system shown in FIG. 1 and FIG. 2 is, for example, a camera video recognition system that is a part of an ADAS (Advanced Driver Assistance System).

The communication apparatus shown in FIG. 1 and FIG. 2 includes an ECU 4 and a SoC 5 that are operable as a Master 21, an image sensor 12 and a temperature sensor 14 that are operable as a Slave 22, a Master SerDes 7, and a Slave SerDes 13.

The Master SerDes 7 and the Slave SerDes 13 are connected to each other so as to be capable of communicating with each other over a predetermined communication standard (hereinafter, referred to as the "communication standard X"). Examples of the predetermined communication standard X include, but are not limited to, FPD-Link III, A-phy, and ASA. Each of the Master SerDes 7 and the Slave SerDes 13 corresponds to the communication apparatus according to this embodiment. In this specification, the Master SerDes 7 is referred to as the SerDes 1, and the Slave SerDes 13 is referred to as the SerDes 2 in some cases.

The Master 21 and the Master SerDes 7 are connected to each other so as to be capable of communicating with each other through, for example, I2C (Inter-Integrated Circuit) communication. Note that the communication between the Master 21 and the Master SerDes 7 is not limited to the I2C communication, and may be, for example, communication using GPIO (General Purpose Input/Output).

Similarly, the Slave 22 and the Slave SerDes 13 are connected to each other so as to be capable of communicating with each other through, for example, I2C communication. Note that the communication between the Slave 22 and the Slave SerDes 13 is not limited to the I2C communication, and may be, for example, communication using GPIO.

In FIG. 1 and FIG. 2, a signal path on a transmission path 6 for performing serial transmission on information from the Slave SerDes 13 to the Master SerDes 7 is referred to as the downlink or the forward channel, and a signal path on the transmission path 6 for performing serial transmission on information from the Master SerDes 7 to the Slave SerDes 13 is referred to as the uplink or the reverse channel.

The ECU 4 controls the entire communication system 3 and includes an I2C 4*a*. The ECU 4 receives an image signal from the Master SerDes 7 and performs I2C communication with the Master SerDes 7 via the I2C 4*a*.

The SoC 5 performs, for example, image recognition or video processing, and includes an I2C 5*a*. The SoC 5 receives an image signal from the Master SerDes 7 and performs I2C communication with the Master SerDes 7 via the I2C 5*a*.

The image sensor 12 captures an image and includes an I2C 12*a* and a mem 19. The image sensor 12 outputs image data of the captured image to the Slave SerDes 13 and performs I2C communication with the Slave SerDes 13 through the I2C 12*a*. In this specification, the image sensor 12 is referred to as the CIS (CMOS image sensor) in some cases. The mem 19 is capable of storing pixel data obtained by capturing by the image sensor 12 or storing data transmitted from the Master 21. In this specification, the mem 19 is referred to as the mem 3 in some cases.

The temperature sensor 14 measures the temperature of an arbitrary target (e.g., the image sensor 12) and includes an I2C 14*a*. The temperature sensor 14 performs I2C communication with the Slave SerDes 13 via the I2C 14*a*, and transmits temperature data relating to the measured temperature, or the like to the Slave SerDes 13.

The Master SerDes 7 converts the signal of the I2C protocol received from the Master 21 into a signal of the communication standard X protocol, transmits the converted signal to the Slave SerDes 13, and appropriately performs format conversion on the signal of the communication standard X protocol received from the Slave SerDes 13 to generate image data or a signal of the I2C protocol, and outputs the generated data or signal to the Master 21. This Master SerDes 7 includes a LINK 11, a forward receiver (Fw.Rx) 9, a reverse transmitter (Rv.Tx) 10, and an I2C 7*a*.

The LINK 11 performs format conversion on the signal of the I2C protocol received from the Master 21 via the I2C 7*a* into a signal of the communication standard X protocol, and transmits the converted signal to the Slave SerDes 13 via the Rv.Tx 10. Further, the LINK 11 generates image data from the signal of the communication standard X protocol received from the Slave SerDes 13 via the Fw.Rx 9 and transmits the generated data to the Master 21, or generates a signal of the I2C protocol including information other than image data and outputs the generates signal to the Master 21 via the I2C 7*a*.

The Slave SerDes 13 performs format conversion on the signal of the I2C protocol or the image signal received from the Slave 22 into a signal of the communication standard X protocol and transmits the converted signal to the Master SerDes 7, and appropriately performs format conversion on the signal of the communication standard X protocol received from the Master SerDes 7 into a signal of the I2C protocol and outputs the converted signal to the Slave 22. This Slave SerDes 13 includes a LINK 17, a forward transmitter (Fw.Tx) 16, a reverse receiver (Rv.Rx) 15, and an I2C 13*a*.

The LINK 17 performs format conversion on the signal of the I2C protocol or the image data received from the Slave 22 via the I2C 13*a* into a signal of the communication standard X protocol and transmits the converted signal to the Master SerDes 7 via the Fw.Tx 16. Further, the LINK 17 converts the signal of the communication standard X protocol received from the Master SerDes 7 via the Rv.Rx 15 into a signal of the I2C standard and transmits the converted signal to the Slave 22 via the I2C 13*a*. At this time, there is a possibility that the following problems 1) and 2) occur.

1) In the case where the ECU 4 or the SoC 5 constituting the Master 21 uses I2C communication to control the image sensor 12 or the temperature sensor 14 constituting the Slave 22, the Master 21 needs to receive an ACK signal or a NACK signal from the Slave 22 every time the Master 21 transmits information in units of one byte or the like. In this case, the propagation delay of I2C communication via the Master SerDes 7 and the Slave SerDes 13 is generally larger than the period of one clock of I2C communication (e.g., 400 kH or 1 MHz for a frequency of one clock) in some cases. In this case, the Master SerDes 7 receives, from the Slave SerDes 13, the ACK signal or the NACK signal from the Slave 22 and holds the clock (SCL) of the I2C protocol signal at a Low level until the I2C protocol conversion is completed and it is ready to output the ACK signal or the NACK signal to the Master 21 via the I2C 7*a*. The Master SerDes 7 releases the held Low level of the clock (SCL) of the I2C protocol signal after it is ready to output the ACK signal or the NACK signal transmitted from the Slave 22 to the Master 21. As a result, the Master 21 is capable of resuming I2C communication and receiving the ACK signal or the NACK signal. Since the Master 21 cannot perform I2C communication while the Master SerDes 7 holds the SCL at the Low level, problems that it takes time to transfer a command and communication with another Slave 22 (e.g., the temperature sensor 14 in the case of standing by for the ACK signal or the NACK signal from the image sensor 12) connected to an I2C bus cannot be performed occur.

Figure 3:
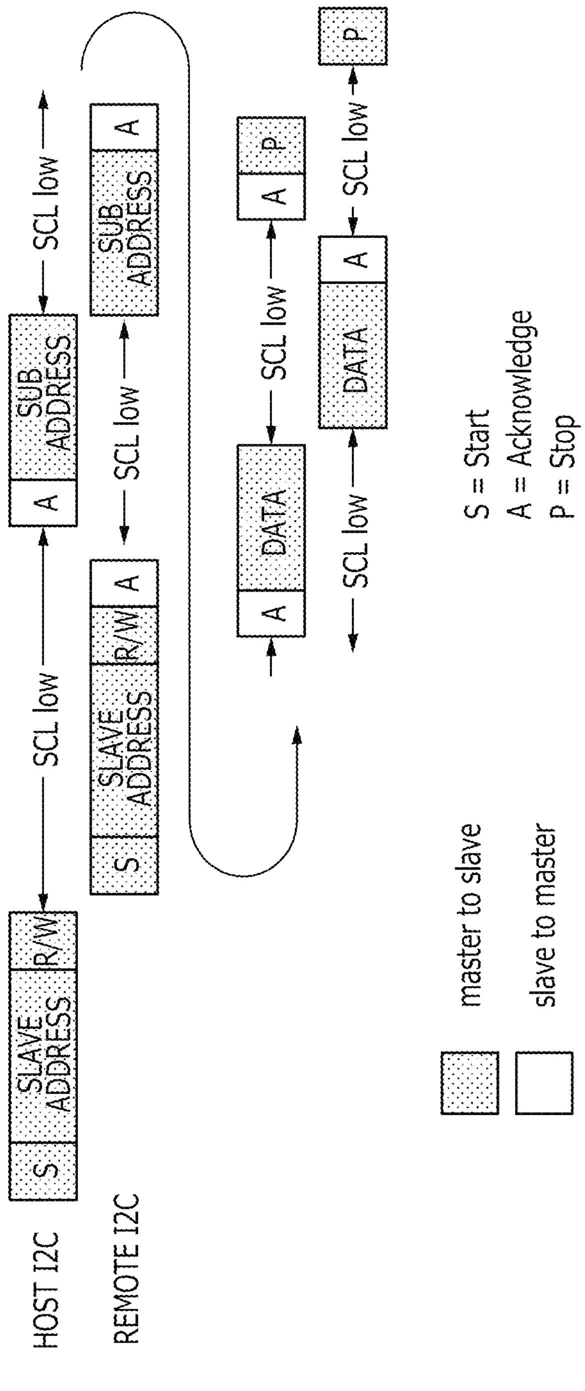
FIG. 3 is a diagram showing a write format of a packet in the case where writing is performed through I2C communication between a Master and a Slave via a general SerDes device.

FIG. 3 shows I2C communication in the case where writing is performed from a HOST I2C (e.g., the Master 21) to a REMOTE I2C (e.g., the Slave 22) via the Master SerDes 7 and a Slave SerDes 13 through I2C communication. Here, the SCL low period of the HOST I2C indicates that the SCL is held at the low level until the Master SerDes 7 is ready to output the ACK signal or the NACK signal from a Slave 22 and the HOST I2C cannot perform I2C communication during this period.

2) Further, it is favorable that various devices other than the image sensor 12 and the temperature sensor 14 can be connected as the Slave 22 to the Slave SerDes 13. The various Slaves 22 may have different I2C operation clocks. For this reason, the Slave SerDes 13 is assumed to perform I2C communication with the various Slaves 22, and the I2C operation clock of the Slave 22 (operation clock of I2C communication between the Slave 22 and the Slave SerDes 13) is set lower than required in some cases.

In FIG. 3, in the case where the I2C operation clock frequency of the Slave 22 is set to be lower than required as described above, it means that the I2C operation period of the REMOTE I2C (period other than the SCL low on the REMOTE I2C side in FIG. 3) becomes longer. This causes the problem that SCL Low period on the HOST I2C side becomes longer, and further increases the time required for completing the I2C communication.

The communication system 3 shown in FIG. 1 and FIG. 2 provides a storage device (the mem 11*a* in FIG. 1) in the Master SerDes 7 to solve the above-mentioned 1), stores, when the Master SerDes 7 receives one byte from the Master 21, the one byte in the storage device, and returns an ACK signal or a NACK signal to the Master 21, on behalf of the Slave 22. Therefore, the Master 21 is capable of shortening the extended period of SCL low.

Further, in order to solve the above-mentioned 2), in the communication system 3 shown in FIG. 1, the Master 21 sets a CLK_value (Data [0]) described below, and the Slave SerDes 13 performs I2C communication with the Slave 22 at the frequency specified by the CLK_value (Data [0]). Therefore, the Slave 22 and the Slave SerDes 13 is capable of realizing I2C communication at the specified frequency.

The LINK 11 shown in FIG. 2 includes an I2C Cmd Unit 8 and a mem 11*a*. The I2C Cmd Unit 8 stores a table 2 in a ROM (not shown), and the mem 11*a* stores a table 1. The mem 11*a* is a volatile memory. In this specification, the mem 11*a* is referred to as the mem 1 in some cases. Every time this LINK 11 receives one byte from the Master 21 via the I2C 7*a*, the LINK 11 writes the one byte to the table 1 of the mem 11*a*, returns an ACK signal or a NACK signal to the Master 21 on behalf of the Slave 22, reads, when a predetermined condition is satisfied (e.g., written up to End of data), the table 1, and transmits it to the Slave SerDes 13 via the Rv.Tx 10. Further, the LINK 11 writes the signal received from the Slave SerDes 13 via the Fw.Rx to the table 1 of the mem 11*a*, reads, when a predetermined condition (e.g., written up to End of data) is satisfied, the table 1, and performs I2C communication with the Master 21 via the I2C 7*a* and transmits, to the Master 21, the image data obtained by capturing by the image sensor 12 received from the Slave SerDes 13 via the Fw.Rx 9 at the same time.

The LINK 17 shown in FIG. 2 includes an I2C Cmd Unit 18 and a mem 17*a*. The I2C Cmd Unit 18 stores the table 2 in a ROM (not shown), and the mem 17*a* stores a table 3. In this specification, the mem 17*a* is referred to as the mem 2 in some cases. This LINK 17 writes the signal received from the Master SerDes 7 via the Rv.Rx 15 to the table 3 of the mem 17*a*, reads, when a predetermined condition (e.g., written up to End of data) is satisfied, the table 3, and transmits it to the Slave 22 via the I2C 13*a*. Further, the LINK 17 writes, when performing I2C communication with the Slave 22 via the I2C 13*a* to receive a signal or receiving the temperature data converted into the I2C protocol from the temperature sensor 14 via the I2C 13*a*, the received signal or data to the table 3 of the mem 17*a*, reads, when a predetermined condition (e.g., written up to End of data) is satisfied, the table 3, and transmits it to the Master SerDes 7 via the Fw.Tx 16.

Figure 4:
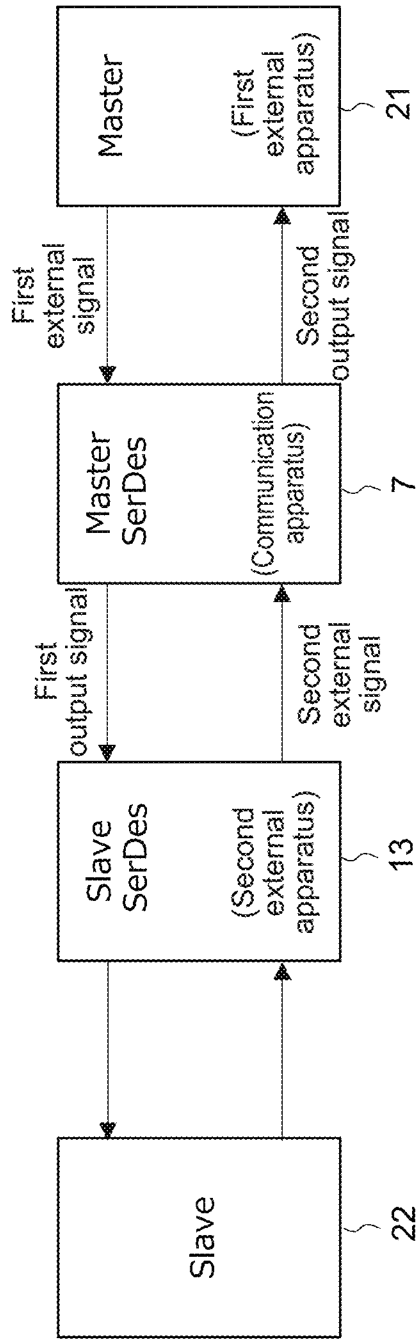
FIG. 4 is an equivalent block diagram in the case where a Master SerDes performs I2C communication between a Master and a Slave SerDes.

FIG. 4 is an equivalent block diagram when the Master SerDes 7 of the communication system 3 shown in FIG. 1 and FIG. 2 performs I2C communication between the Master 21 and the Slave SerDes 13. In FIG. 4, the Master SerDes 7 is a communication apparatus, the Master 21 is a first external apparatus, and the Slave SerDes 13 is a second external apparatus.

The communication apparatus (the Master SerDes 7) shown in FIG. 4 generates a first output signal on the basis of a first external signal from the first external apparatus (the Master 21) and outputs the generated signal to the second external apparatus (the Slave SerDes 13). Further, the communication apparatus (the Master SerDes 7) generates a second output signal on the basis of a second external signal from the second external apparatus (the Slave SerDes 13) and outputs the generated signal to the first external apparatus (the Master 21).

Figure 5:
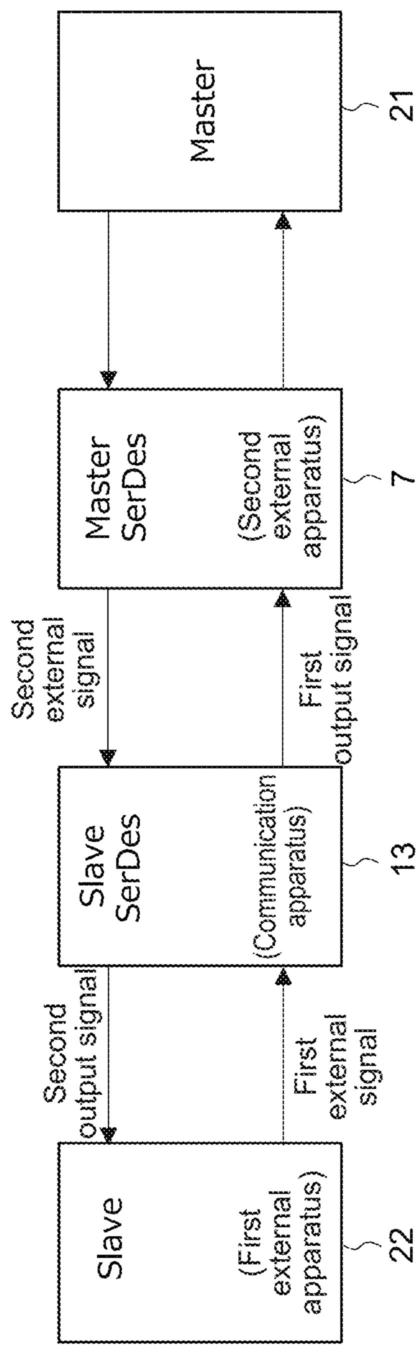
FIG. 5 is an equivalent block diagram in the case where the Slave SerDes performs I2C communication between the Slave and the Master SerDes.

FIG. 5 is an equivalent block diagram when the Slave SerDes 13 of the communication system 3 shown in FIG. 1 and FIG. 2 performs I2C communication between the Slave 22 and the Master SerDes 7. In FIG. 5, the Slave SerDes 13 is a communication apparatus, the Slave 22 is a first external apparatus, and the Master SerDes 7 is a second external apparatus.

The communication apparatus (the Slave SerDes 13) shown in FIG. 5 generates a first output signal on the basis of the first external signal from the first external apparatus (the Slave 22) and outputs the generated signal to the second external apparatus (the Master SerDes 7). Further, the communication apparatus (the Slave SerDes 13) generates a second output signal on the basis of the second external signal from the second external apparatus (the Master SerDes 7) and outputs the generated signal to the first external apparatus (the Slave 22).

Each of the first output signal and the second external signal in FIG. 4 and FIG. 5 includes command information Cmd_mode indicating the content of the command transmitted from the first external apparatus, final-destination-apparatus-identification information Slave_Adr for identifying the final destination apparatus of the data transmitted from the first external apparatus, internal address information Sub_Adr of the final destination apparatus, data-length information Length of the data transmitted from the first external apparatus, and data-end-position information End of Data transmitted from the first external apparatus.

Slave_Adr may be placed next to Cmd_mode, Sub_Adr may be placed next to Slave_Adr, and Length may be placed next to Sub_Adr.

Cmd_mode may include command format information Cmd_mode [2:0] that defines the command format on the communication standard X, which has the function of identifying a Write command and a Read command. That is, Cmd_mode may include Cmd_mode [2:0] that defines the command format on the predetermined communication standard between the communication apparatus and the second external apparatus.

Cmd_mode may include at least Cmd_mode [0]-Cmd_mode [7], and the data-end-determination-condition information Cmd_mode [7] may specify a condition for determining the end of data transmitted from the first external apparatus.

Each of the first output signal and the second external signal may further include communication frequency information CLK_value that specifies a communication frequency between the second external apparatus and the final destination apparatus.

The first output signal and the second external signal may include a command obtained by protocol-converting a command of I2C (Inter-Integrated Circuit) communication into a predetermined communication standard between the communication apparatus and the second external apparatus.

The LINKs 11 and 17 may transmit, every time the LINKs 11 and 17 receive each information unit constituting the first external signal from the first external apparatus, an ACK signal indicating an affirmative response or a NACK signal indicating a negative response to the first external apparatus.

The LINKs 11 and 17 may have a storage unit that stores a signal corresponding to the first external signal and a signal corresponding to the second external signal, and the LINKs 11 and 17 may collectively perform, when the reception of the first external signal from the first external apparatus is completed, protocol conversion on the first external signal received and stored in the storage unit and generate the first output signal.

The protocol conversion performed by the LINKs 11 and 17 may be protocol conversion corresponding to TDD (Time Division Duplex).

The LINKs 11 and 17 may transmit the first output signal to the second external apparatus, and store, when receiving information indicating that the processing for the first output signal is completed from the second external apparatus, the signal indicating the processing completion in the storage unit.

The LINKs 11 and 17 may release the storage area of the storage unit on the basis of a command from the first external apparatus.

The LINKs 11 and 17 may output the processing completion information for the second external signal transmitted from the second external apparatus in response to a request signal from the first external apparatus, or output, to the first external apparatus, an interrupt request flag for performing interrupt processing on the first external apparatus.

The LINKs 11 and 17 may receive, from the first external apparatus, a first external signal including output instruction information cmd_done for instructing to output the first output signal and transmission-stopping information P (STOP condition) indicating the transmission stopping of the first external signal.

The LINKs 11 and 17 may recognize, in the case where a first value is received as the data-end-determinationcondition information for specifying the condition for end determination of the data transmitted from the first external apparatus, that the first external signal transmitted from the first external apparatus has ended when the transmission-stop information P (STOP condition) indicating the transmission stopping of the first external signal.

The LINKs 11 and 17 may recognize, in the case where a second value is received as the data-end-determination-condition information for specifying the condition for end determination of the data transmitted from the first external apparatus, that the first external signal transmitted from the first external apparatus has ended regardless of the value of the data-end-determination-condition information to be received thereafter, when the output instruction information for instructing to output the first output signal and the transmission-stopping information indicating the transmission stopping of the first external signal are received.

The LINKs 11 and 17 may release the storage area of the storage unit after transmitting the first output signal to the second external apparatus.

The LINKs 11 and 17 may perform, a predetermined number of times or within a predetermined time, at least one of outputting the signal obtained by performing the protocol conversion for the second output signal on the signal based on the second external signal stored in the storage unit to the first external apparatus for each information unit or receiving the respective information units constituting the first external signal output from the first external apparatus.

Figure 6:
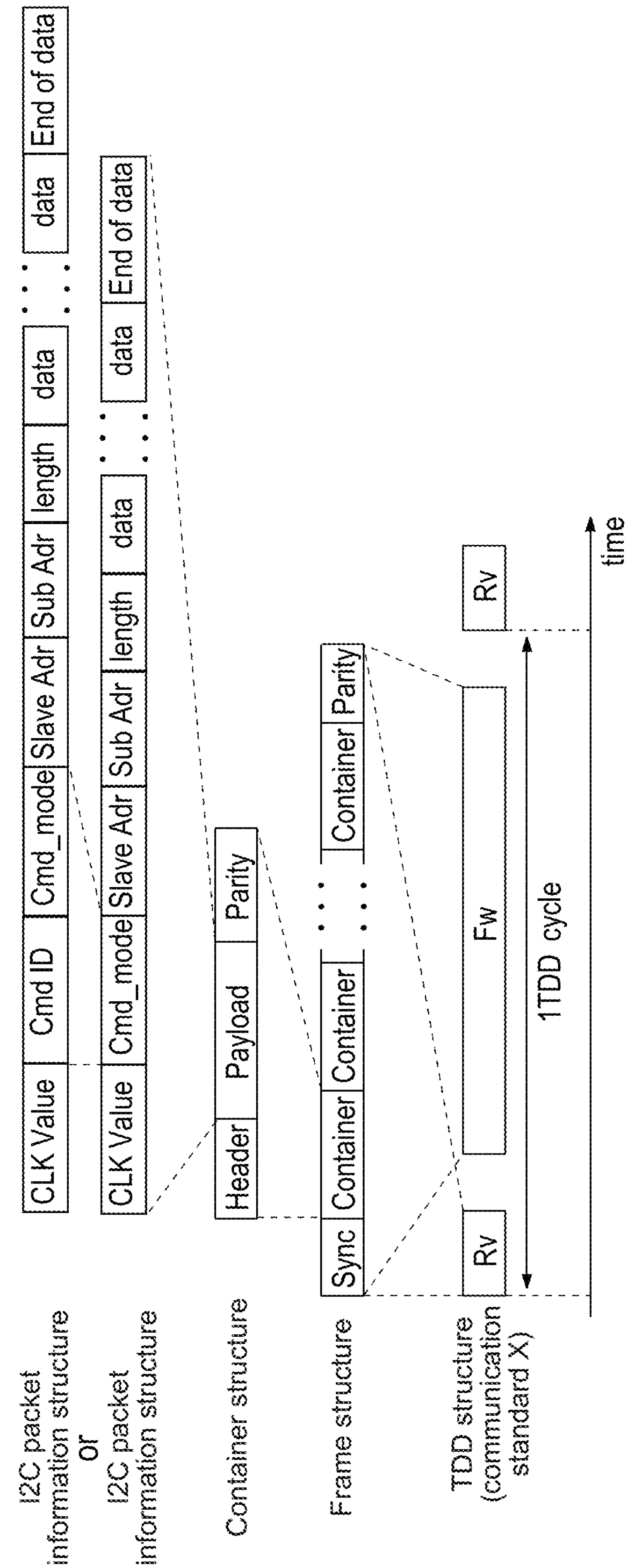
FIG. 6 is a diagram showing an example of a frame structure of a signal of a communication standard X protocol.

FIG. 6 is a diagram showing an example of a frame structure of the signal of the communication standard X protocol transmitted and received between the Master SerDes 7 and the Slave SerDes 13.

The frame structure shown in FIG. 6 includes a plurality of containers between a Sync pattern and a Parity. The Sync pattern is a signal pattern for synchronizing the physical layers of the Master SerDes 7 and the Slave SerDes 13. The plurality of containers includes, for example, approximately 2 to 100 containers. The number of containers included in the frame structure changes depending on the signal transmission state. The Parity is a bit or bit string for error detection or error correction.

The container structure include a Header, a Payload, and a Parity. The Header includes, for example, address information indicating the destination of the Payload. The Payload is the main body of the signal to be transmitted and received. The Payload includes an OAM (Operations, Administration, Maintenance) for SerDes control in addition to a video signal. The Parity is a bit or bit string for error detection or error correction of the Payload.

The Payload includes pieces of information of CLK value, Cmd_mode, Slave Adr, length, data, and End of data. The CLK value represents the operation clock of the Slave 22, i.e., the SCL frequency that the Slave SerDes 13 uses in I2C communication with the Slave 22. The Cmd_mode represents the content of the command transmitted from the Master 21. The Slave Adr represents address information for identifying the Slave 22. The length represents the length of data transmitted from the Master 21. The End of data represents the end position of the data transmitted from the Master 21.

Note that in the case where the Cmd_mode is extended to two bytes, the upper one byte of the Cmd_mode may be assigned to Cmd_ID. The Cmd_ID represents identification information used to distinguish and identify the command transmitted from the Master 21.

In the case of performing data communication between the Master 21 and the Slave 22 using the TDD method, changing the signal ratio of a signal Rv from the Master 21 to the Slave 22 within one TDD cycle and the signal ratio of a signal Fw from the Slave 22 to the Master 21 can be realized by changing the number of containers included in each frame structure. Note that the size of the container may be the same or different between the signal Rv and the signal Fw.

In the communication system according to this embodiment, I2C communication is performed between the Master 21 and the Master SerDes 7, and I2C communication is performed also between the Slave SerDes 13 and Slaver 22. In the I2C communication, one of a first mode (referred to also as the Byte I2C mode) for receiving an ACK signal/NAK signal every time a predetermined number of bytes (e.g., 1 byte or 2 bytes in the case where an error correction code is not transmitted, or 2 bytes or 3 bytes in the case where an error correction code is transmitted) of information is transmitted and a second mode (Bulk I2C mode) for receiving an ACK signal/NAK signal every time bulk information, which is a bulk of a plurality of bytes of information, is transmitted can be selected.

Figure 8:
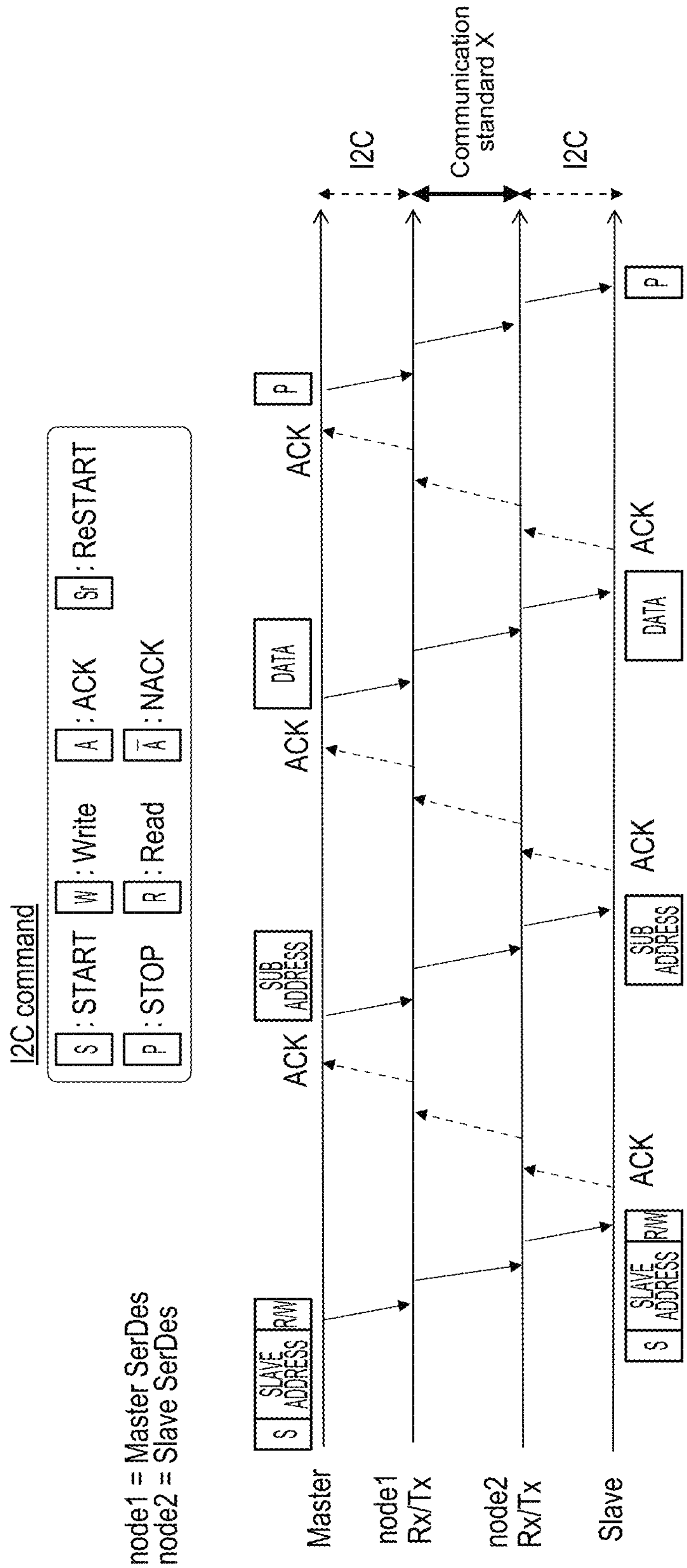
FIG. 8 is a timing chart where I2C communication is performed between the Master and the Slave by an FDD method.

Meanwhile, in the case of performing I2C communication between the Master SerDes 7 and the Slave SerDes 13 using the FDD (Frequency Division Duplexing) method, in order to transmit, from the Master 21, information whose final destination is the Slave 22, as shown in the timing chart of FIG. 8, the operation of receiving the ACK/NACK signal every time one byte of data is transmitted is repeated. In the FDD method, unlike the TDD method, it is not necessary to switch between uplink and downlink and it is possible to transmit information from the Master 21 to the Slave 22 or from the Slave 22 to the Master 21 at arbitrary timing.

Figure 9A:
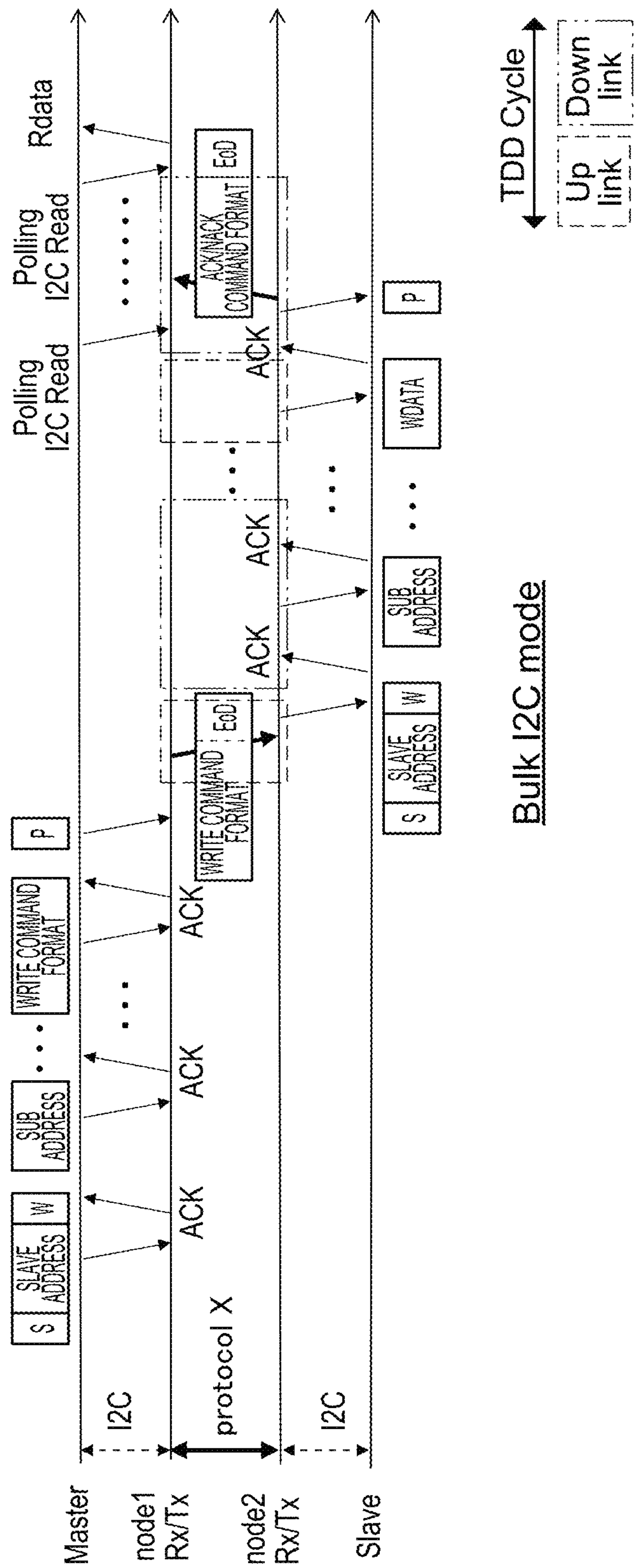
FIG. 9A is a timing chart of a Bulk I2C mode by a TDD method.
Figure 9B:
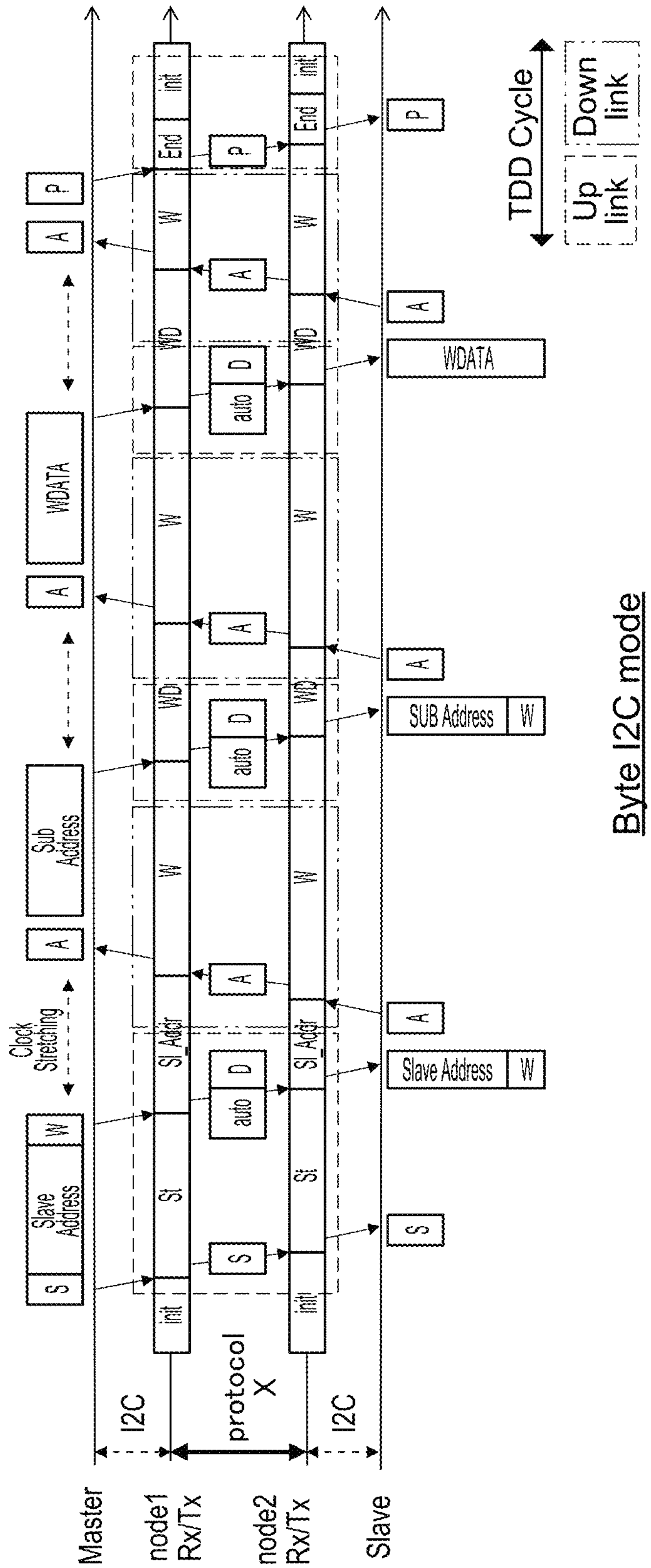
FIG. 9B is a timing chart of a Byte I2C mode by the TDD method.

FIG. 9A is a timing chart of the Bulk I2C mode in the TDD method, and FIG. 9B is a timing chart of the Byte I2C mode in the TDD method. In the Bulk I2C mode, the Master SerDes 7 transmits a signal including an ACK signal or a NACK signal to the Master 21 every time a signal of a plurality of bytes transmitted from the Master 21 is received byte by byte as shown in FIG. 9A. Next, after the conversion of the signal of the plurality of bytes received from the Master 21 is completed, the Master SerDes 7 collectively transmits the converted signal to the Slave SerDes 13. Here, as a specific method of conversion, there are cases where conversion from the I2C protocol to the communication protocol X is sequentially performed every time the Master SerDes 7 receives one byte of data from the Master 21 and where conversion from the I2C protocol to the communication protocol X is collectively performed after receiving all the plurality of bytes of data from the Master 21. After that, the Master SerDes 7 receives the signal of the communication protocol X (first communication standard) including an ACK signal or a NACK signal from the Slave SerDes 13 and holds the received signal. After that, in response to a read request from the Master 21, the Master SerDes 7 converts the signal of the communication protocol X into a signal of the I2C protocol (second communication standard) and transmits the converted signal to the Master 21.

Note that the signal to be transmitted to the Slave SerDes 13 includes command information indicating the content transmitted from the Master 21, and the signal to be transmitted to the Master 21 includes information transmitted from the Slave SerDes 13.

Further, in the Bulk I2C mode, as shown in FIG. 9A, the Slave SerDes 13 converts, when a signal of a plurality of bytes of the communication protocol X transmitted from the Master SerDes 7 is received, the received signal into a signal of the I2C protocol, and transmits the converted signal to the Slave 22 byte by byte. Every time the converted signal is transmitted byte by byte to the Slave 22, the signal of the I2C protocol including an ACK signal or a NACK signal from the Slave 22 is received and held. After the signal from the Master SerDes 7 is transmitted to the Slave 22, a signal of the communication protocol X corresponding to the held signal is transmitted to the Master SerDes 7.

Meanwhile, in the Byte I2C mode, as shown in FIG. 9B, the Master SerDes 7 converts the signal transmitted from the Master 21 into a signal of the first communication standard in units of one byte, receives a signal of the first communication standard including one of an ACK signal representing an affirmative response and a NACK signal representing a negative response transmitted from the Slave SerDes 13 after transmitting the converted signal to the Slave SerDes 13, converts the received signal to a signal of the second communication standard, and transmits the converted signal to the Master 21.

Further, in the Byte I2C mode, as shown in FIG. 9B, the Slave SerDes 13 converts, when receiving the signal of the first communication standard transmitted from the Master SerDes 7, the received signal into a signal of the second communication standard in units of the received signal, receives a signal of the second communication standard including one of an ACK signal representing an affirmative response and a NACK signal representing a negative response transmitted from the Slave 22 after transmitting the converted signal to the Slave 22, converts the received signal into a signal of the first communication standard, and transmits the converted signal to the Master SerDes 7.

Between the Bulk I2C mode and the Byte I2C mode, the information of Cmd_mode in the frame structure shown in FIG. 6 differs. In this specification, the Cmd_mode is referred to as the command information in some cases. The Cmd_mode is, for example, one byte of information, and information of each of the bits differs between the Bulk I2C mode and the Byte I2C mode.

FIG. 10A is a diagram showing an example of the cmd_mode in the Bulk I2C mode. The bit [7] of the cmd_mode shown in FIG. 10A indicates the selection of the mode described above, 1 indicates the Byte I2C mode, and 0 indicates the Bulk I2C mode. The bit [6] is a bit for specifying whether or not to perform retry at the time of receiving a NACK signal through the Slave-side I2C communication, 1 indicates performing retry, and 0 indicates not performing retry. The bit [5] is a bit indicating the operation of the Slave SerDes 13 in the case where the Slave SerDes 13 receives a NACK signal while accessing the Slave 22, 1 indicates that the RAW data for writing is to be continuously output in the case of writing by ignoring NACK and performing the processing, and 0 indicates that normal processing is to be performed. The bit [4] indicates the batch transmission mode of the I2C command, 1 indicates performing transmission at the time of End of data and cmd_done. 0 indicates that end determination is performed for each End of data and the transmission is performed. The bit [3] indicates the selection of the I2C address mode on the Slave side, 1 indicates the address of the current position without the offset address, and 0 indicates the address of the current position with the offset address. The bits [2:0] indicate the I2C format type of the communication standard X, 111 indicates an error command format, 110 indicates a special command format, 10X indicates a reserved bit, 011 indicates a Read response format, 010 indicates an ACK/NACK format, 001 indicates a Read command format, and 000 indicates a Write command format.

FIG. 10B is a diagram showing an example of the cmd_mode in the Byte I2C mode. The bit [7] of the cmd_mode shown in FIG. 10B is the same as the bit [7] shown in FIG. 10A and is referred to herein as the first information in some cases. The bits [6:5] indicate the selection of a clock mode and is referred to herein as the second information in some cases. The clock mode includes a mode in which a node 2 automatically generates a clock signal where the Master SerDes 7 is the node 1 and the Slave SerDes 13 is the node 2, and a mode in which the node 1 on behalf of the node 2 calculates and notifies a period count of 9/8/1 of the clock CLK used by the node 2. 11 indicates that the node 2 generates nine clock signals including ACK/NACK signals and data. 10 indicates that the node 2 generates eight clock signals including data. 01 indicates that the node 2 generates one clock signal including ACK/NACK signals. 00 indicates that the node 2 automatically generates 9/8/1 clock signals.

The bits [4:0] indicate the I2C packet type for defining the packetized I2C data. The bit [4] indicates information for instructing whether it is data for Write or Read or other data, and is referred to herein as the third information in some cases. The value 1 of the bit [4] indicates that a Write/Read data packet follows next. The value 0 of the bit [4] indicates that there are no Write/Read data packets. The bit [3] indicates information indicating whether or not a NACK signal has been received, and is referred to herein as the fourth information in some cases. The value 1 of the bit [3] indicates that a NACK signal has been received from the Slave 22 or the Master 21, and 0 indicates that no NACK signal has been received. The bit [2] indicates information indicating whether or not an ACK signal has been received and is referred to herein as the fifth information in some cases. The value 1 of the bit [2] indicates that an ACK signal has been received from the Slave 22 or the Master 21, and 0 indicates that no ACK signal has been received. The bit [1] indicates information indicating whether or not a STOP command is included, and is referred to herein as the sixth information in some cases. The value 1 of the bit [1] indicates that a STOP command has been detected, and 0 indicates that no STOP command has been detected. The bit [0] indicates information indicating whether or not a START/ReSTART command is included, and is referred to herein as the seventh information in some cases. The value 1 of the bit [0] indicates that a START/ReSTART command has been detected, and 0 indicates that no START/ReSTART command has been detected.

The cmd_mode shown in FIG. 10A and FIG. 10B is an example, and what information is assigned to each bit of the cmd_mode is assigned can be arbitrarily set. Further, the Cmd_mode may have a byte length of 2 bytes or more.

Figure 11A:
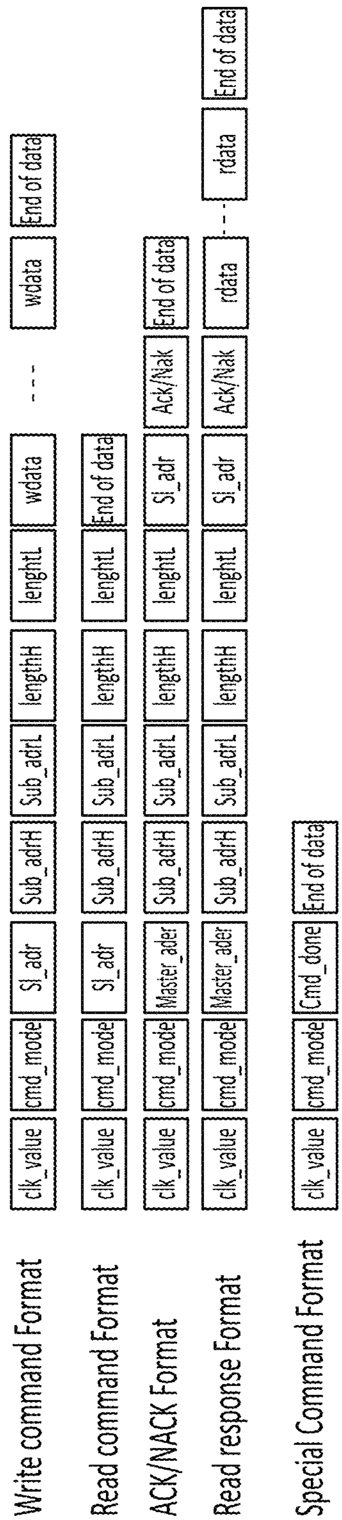
FIG. 11A is a diagram showing a first example of a command format transmitted and received through I2C communication when the Bulk I2C mode is selected.

FIG. 11A is a diagram showing a first example of a command format transmitted and received through the I2C communication when the Bulk I2C mode is selected. As shown in FIG. 11A, when the Bulk I2C mode is selected, the command format includes a Write command format, a Read command format, an ACK/NACK command format, a Read response format, and a special command format (Special Command Format). The Write command format includes clk_value, cmd_mode, Sl_adr, Sub_adrH, Sub_adrL, and lengthH, lengthL, WDATA, and End of data. The Read command format is the same as the Write command format, except that it does not include WDATA. The ACK/NACK command format includes clk_value, cmd_mode, Master_adr, Sub_adrH, Sub_adrL, lengthH, lengthL, Sl_adr, ACK/NACK, and End of data. The Read response format is obtained by adding RDATA to the ACK/NACK command format. The Special command format includes clk_value, cmd_mode, Cmd_done, and End of data.

Figure 11B:
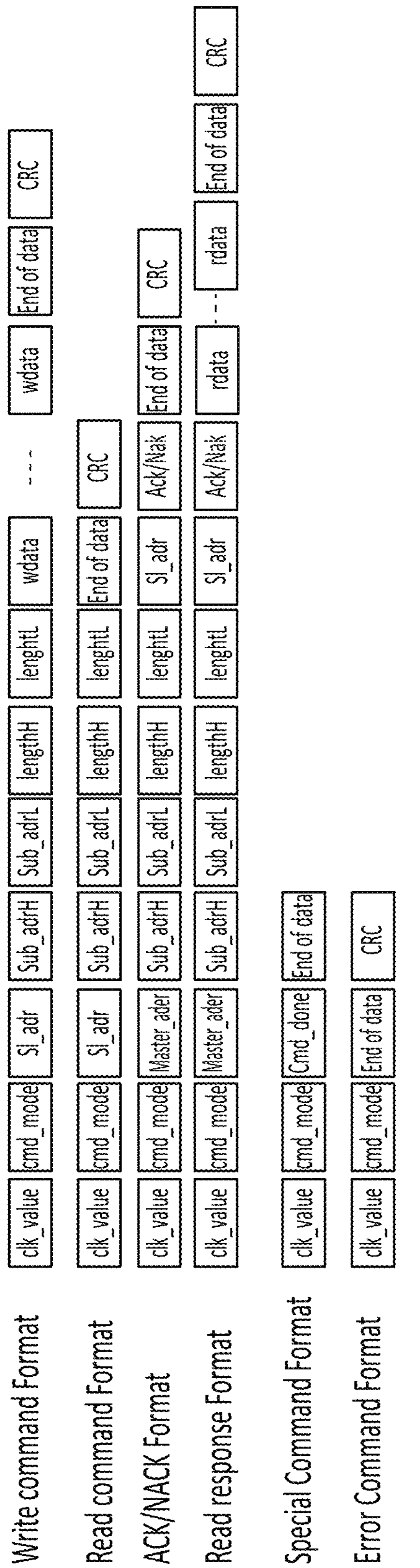
FIG. 11B is a diagram showing a second example of the command format transmitted and received through I2C communication when the Bulk I2C mode is selected.

FIG. 11B is a diagram showing a second example of a command format transmitted and received through the I2C communication when the Bulk I2C mode is selected. In the second example shown in FIG. 11B, the command format is obtained by adding CRC that is an error correction code subsequent to End of Data of the end of each command format shown in FIG. 11A. In addition, in the second example of FIG. 11B, an error command format that is not in the first example of FIG. 11A has been newly added. The error command format includes clk_value, cmd_mode, End of data, and CRC. The error command format will be described below.

Figure 11C:
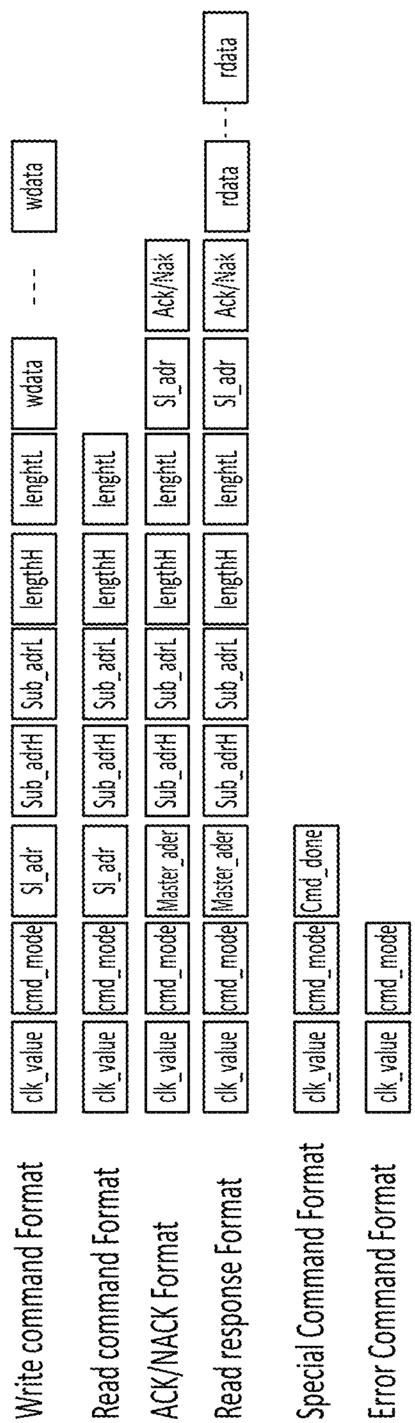
FIG. 11C is a diagram showing a third example of the command format transmitted and received through I2C communication when the Bulk I2C mode is selected.

In FIG. 11A and FIG. 11B, End of Data (EoD) is included in the vicinity of the end of each command format, but EoD can be omitted. FIG. 11C is a diagram showing a third example of a command format transmitted and received through the I2C communication when the Bulk I2C mode is selected, and the command format is obtained by omitting EoD from the respective formats shown in FIG. 11A. Even if the information of EoD is used inside the Master SerDes 7 and the Slave SerDes 13, the communication format between the Master SerDes 7 and Slave SerDes 22 can calculate the end position of data on the reception side from information of cmd_mode, lengthH, and lengthL without EoD.

Figure 11D:
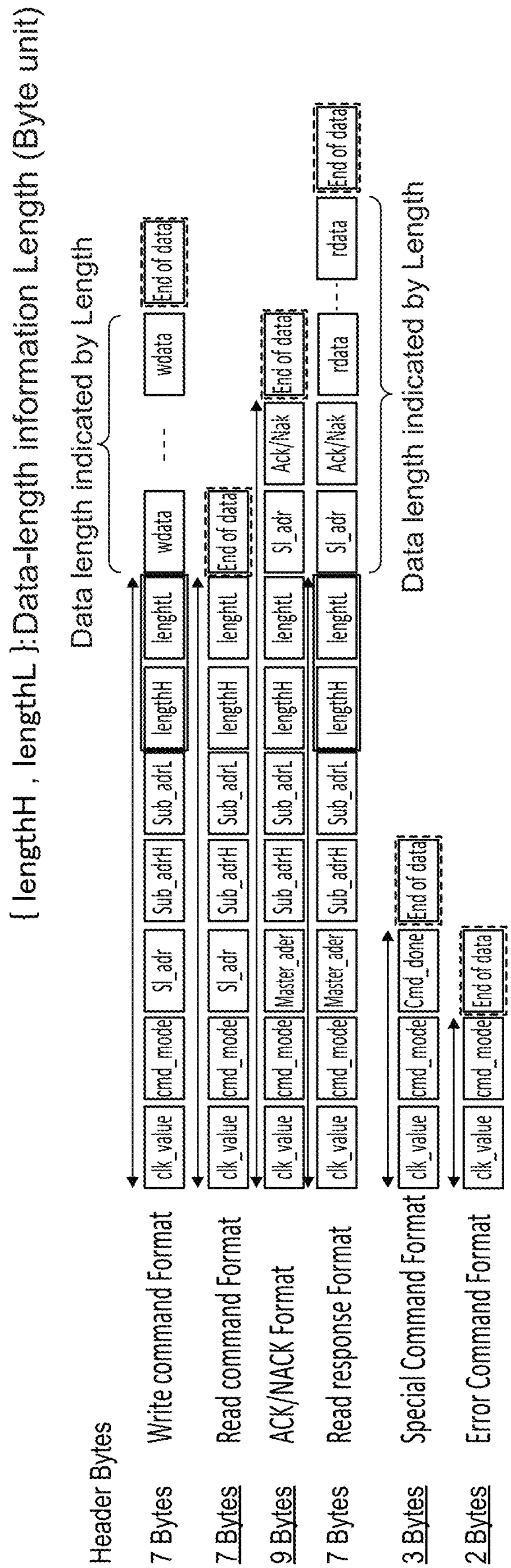
FIG. 11D is a diagram describing a method of calculating the position of an End of Data in the third example of FIG. 11C.

FIG. 11D is a diagram describing a method of calculating the position of End of Data in the third embodiment shown in FIG. 11C. The Read command format, the ACK/NACK format, the Special command format, and the error command format have fixed byte lengths, respectively. More specifically, the Read command format has 7 bytes, the ACK/NACK format has 9 bytes, the Special command format has 3 bytes, and the error command format has 2 bytes. Ford this reason, the end position of each format can be specified without EoD. Note that the ACK/NACK format does not necessarily have fixed 9 bytes. All the ACK/NACK received during the I2C communication may be added.

Meanwhile, the Write command format and the Read response format include WDATA or RDATA that is data having a variable length, but the length of WDATA or RDATA is the sum of lengthH and lengthL. For this reason, the position of End of Data can be specified from the value of lengthH and lengthL. For example, in the case where the Write command format has header 7 bytes+WDATA 64 bytes=71 bytes and the Read response format has header 7 bytes+RDATA 64 bytes=71 bytes, the sum of lengthH and lengthL is 64, so the end position of each format can be specified without EoD.

Figure 11E:
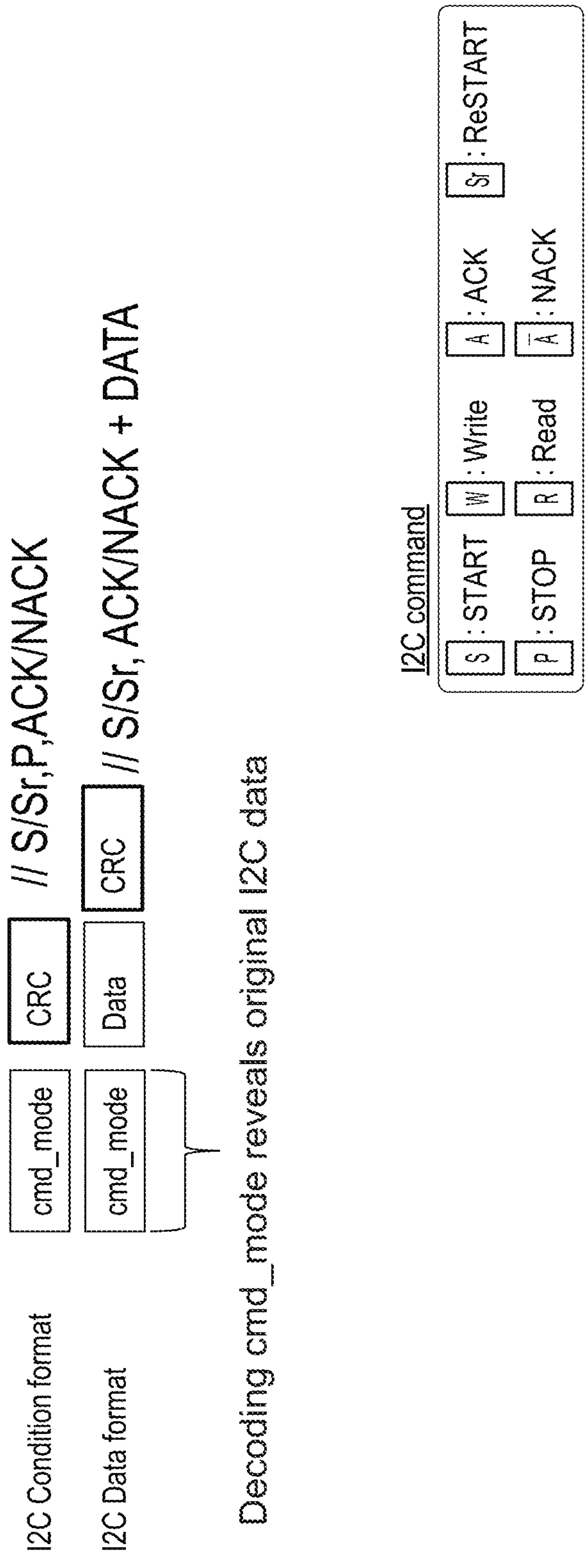
FIG. 11E is a diagram showing a first example of a command format when the Byte I2C mode is selected.

FIG. 11E is a diagram showing a first example of a command format when the Byte I2C mode is selected. As shown in FIG. 11E, when the Byte I2C mode is selected, an I2C condition format or an I2C data format is selected.

The I2C condition format includes cmd_mode and CRC. The I2C commands transmitted in the I2C condition format are S (START), Sr (ReSTART), P (STOP), and ACK/NACK. The I2C data format includes cmd_mode, Data, and CRC. The I2C commands transmitted in the I2C data format are S (START), Sr (ReSTART), P (STOP), and ACK/NACK+ data.

Figure 11F:
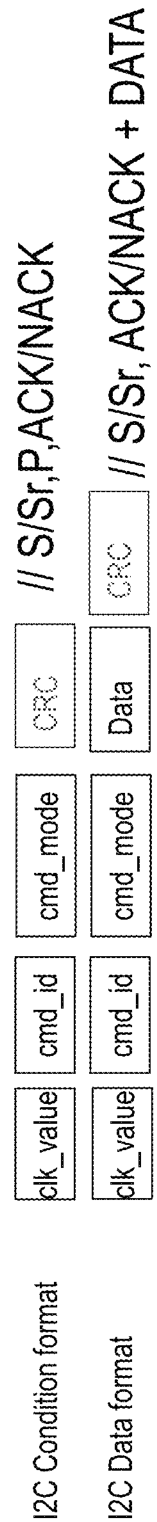
FIG. 11F is a diagram showing a second example of the command format when the Byte I2C mode is selected.

Clk_value or cmd_id may be added to the command format shown in FIG. 11E. FIG. 11F is a diagram showing a second example of a command format when the Byte I2C mode is selected. The second example of FIG. 11F shows an example in which clk_value and cmd_id are added immediately in front of cmd_mode in the first example of FIG. 11E. Whether or not CRC is added to the end of each format in the second example of FIG. 11F is optional. The same applies to the first example of FIG. 11E.

FIG. 12 a diagram showing a type and bit strings of the I2C command transmitted over the communication standard X protocol in the Bulk I2C mode. In FIG. 12, ACK represents an affirmative response, indicating that the processing has completed successfully. NACK represents a negative response, indicating that the processing has not completed successfully.

Repeated_start represents a start flag indicating that the signal of the I2C protocol continues. Specifically, the Repeated_start corresponds to Sr in the combined format of I2C shown in FIG. 7. Sr represents a flag issued before starting the next I2C communication in the case of starting the next I2C communication after starting the I2C communication from the Master 21 to the Master SerDes 7 (after issuing S (START condition)) and without finishing this I2C communication (without issuing P (STOP condition)).

End of data in the I2C command transmitted over the communication standard X protocol indicates P (STOP condition). In the case where Cmd_mode [4]=0 in the Bulk I2C mode, it indicates that the signal of the I2C protocol from S (START condition) to P (STOP condition) is transmitted to the Slave SerDes 13.

Cmd_done in the I2C command transmitted over the communication standard X protocol is a special command in the case where the following data is 0xFF when Cmd_mode [4]=1 in the Bulk I2C mode. Cmd_done represents information for instructing to transmit, to the Slave SerDes 13, one or more sets, each of the sets including the signal of the I2C protocol from S (START condition) to P (STOP condition).

Rsv_command in the I2C command transmitted over the communication standard X protocol represents Reserved, and is not specified in the present time point. The data in the I2C command indicates the data to be written to the Slave 22 or the data read from the Slave 22.

FIG. 12 shows an example in which the I2C command to be transmitted over the communication standard X protocol is represented by 8 bits. However, the present disclosure is not limited thereto and the I2C command may be represented by 9 bits or more. For example, in the case of representing the I2C command by 9 bits, one bit on the MSB side is set to "0" if the signal of the I2C protocol is "data" and one bit on the MSB side is set to "1" if the signal of the I2C protocol is other than "data", thereby making it possible to easily determine whether or not the signal of the I2C protocol is "data".

(Detailed Operation of Byte I2C Mode)

Figure 13A:
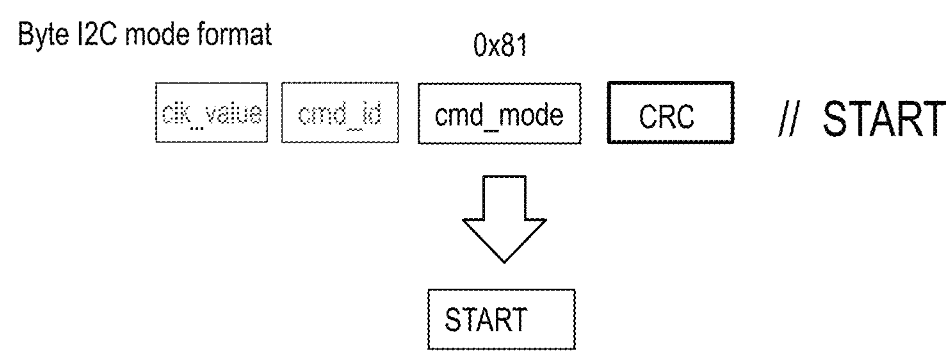
FIG. 13A is a diagram showing an example of setting the cmd-mode in the case where condition information and an instruction for the Slave SerDes to automatically generate a clock CLK count are transmitted in the Byte I2C mode.
Figure 13B:
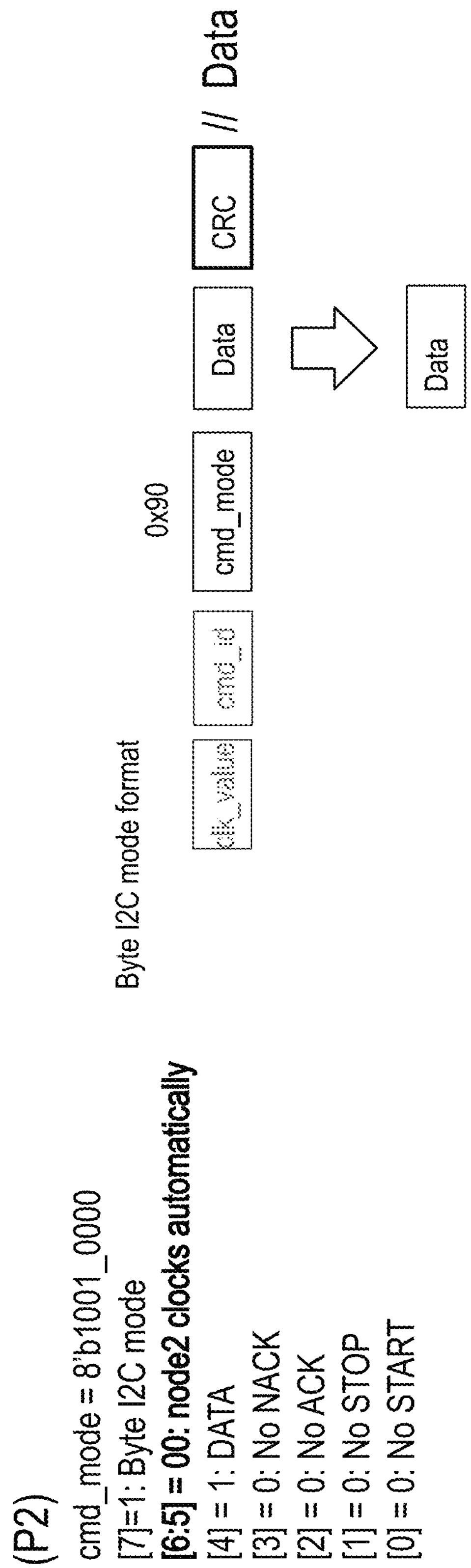
FIG. 13B is a diagram showing an example of setting the cmd-mode in the case where data and an instruction for the Slave SerDes to automatically generate a clock CLK count are transmitted in the Byte I2C mode.

FIG. 13A and FIG. 13B are each a diagram showing an example of setting cmd-mode in the case where the Slave SerDes 13 that is the node 2 automatically generates the clock CLK. FIG. 13A shows an examples of setting cmd_mode in the case where condition information and an instruction for the Slave SerDes 13 to automatically generate a clock CLK count are transmitted in the Byte I2C mode. The cmd_mode of one byte data is set to 8'b1000_0001. Each bit of the cmd_mode is set in accordance with FIG. 10B. Of these, the bit [7]=1 indicates the Byte I2C mode. The bits [6:5]=00 indicate that the node 2 automatically generates a clock CLK. The bit [4]=0 indicates that no data is included. The bit [3]=0 indicates that no NACK signal is received. The bit [2]=0 indicates that no ACK signal is received. The bit [1]=0 indicates that no STOP command is included. The bit [0]=1 indicates that a START command is included.

FIG. 13B shows an example of setting cmd_mode in the case where data and an instruction for the Slave SerDes 13 to automatically generate a clock CLK count are transmitted in the Byte I2C mode. The cmd_mode is set to 8'b1001_0000. Of these, the bit [7]=1 indicates the Byte I2C mode. The bits [6:5]=00 indicate that the node 2 automatically generates a clock CLK. The bit [4]=1 indicates that data is included. The bit [3]=0 indicates that no NACK signal is received. The bit [2]=0 indicates that no ACK signal is received. The bit [1]=0 indicates that no STOP command is included. The bit [0]=0 indicates that no START command is included.

As shown in FIG. 13A and FIG. 13B, the number of bytes of the signal transmitted from the Master SerDes 7 to the Slave SerDes 13 in the Byte I2C mode is 2 bytes or 3 bytes except for the clock frequency information clk_value and the error correction code CRC.

Figure 14A:
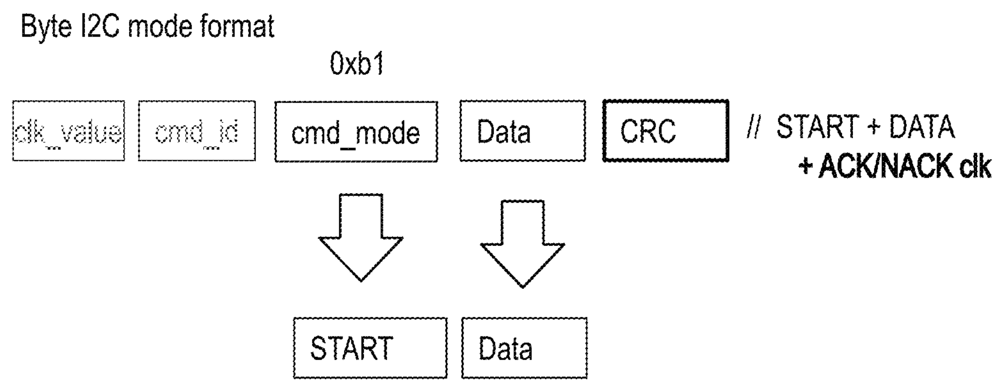
FIG. 14A is a diagram showing an example 1 of setting the cmd-mode in the case where the condition information, the data, and the specification of the clock CLK count generated by the Slave SerDes are transmitted in the Byte I2C mode.
Figure 14B:
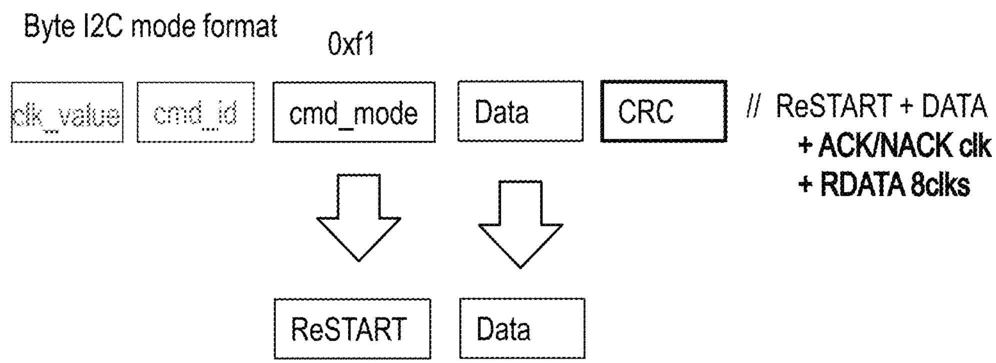
FIG. 14B is a diagram showing an example 2 of setting the cmd-mode in the case where the condition information, the data, and the specification of the clock CLK count generated by the Slave SerDes are transmitted in the Byte I2C mode.

FIG. 14A and FIG. 14B are each a diagram showing an example in which the Slave SerDes 13 that is the node 2 manually generates the clock CLK on the basis of the period count instructed by the Master SerDes 7 that is the node 1. FIG. 14A shows an example 1 of setting cmd-mode in the case where condition information, data, and specification of the clock CLK count to be generated by the Slave SerDes are transmitted in the Byte I2C mode. FIG. 14B shows an example 2 of setting cmd-mode in the case where condition information, data, and specification of the clock CLK count to be generated by the Slave SerDes are transmitted in the Byte I2C mode. The cmd_mode shown in FIG. 14A is set to 8'b1000_0001. The bits [6:5]=01 of the cmd_mode indicate that the node 2 instructs to generate a clock CLK of one period. The bit [4]=1 indicates that data is included. The other bits are the same as those in FIG. 13A.

The cmd_mode shown in FIG. 14B is set to 8'b1111_0001. The bits [6:5]=11 of the cmd_mode indicate that the node 2 instructs to generate a clock CLK of nine periods. The other bits are the same as those in FIG. 14A.

Figure 15A:
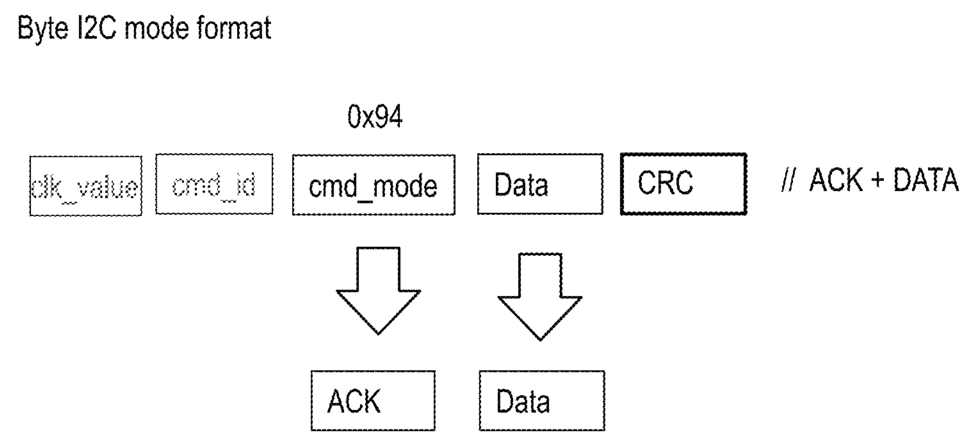
FIG. 15A is a diagram showing an example of transmitting ACK and data in the Byte I2C mode.

Similarly, FIG. 15A shows an example ACK and data are transmitted in the Byte I2C mode.

Figure 15B:
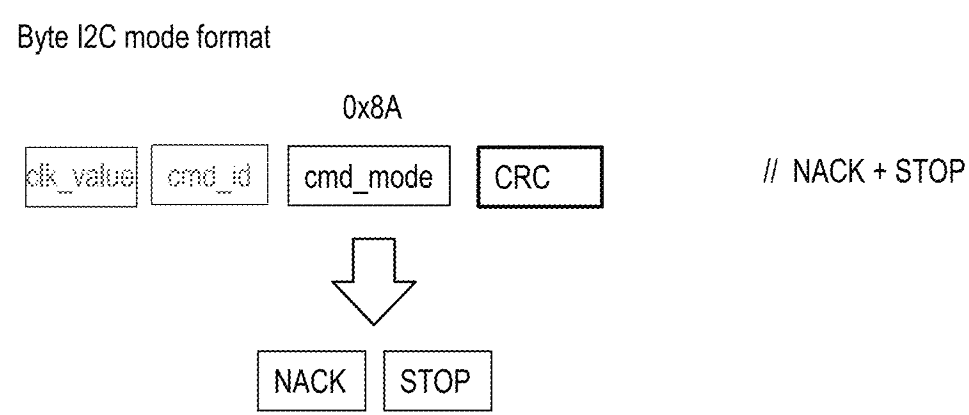
FIG. 15B is a diagram showing an example of transmitting NACK and a STOP command in the Byte I2C mode.

FIG. 15B shows an example in which NACK and a STOP command are transmitted in the Byte I2C mode.

Figure 16:
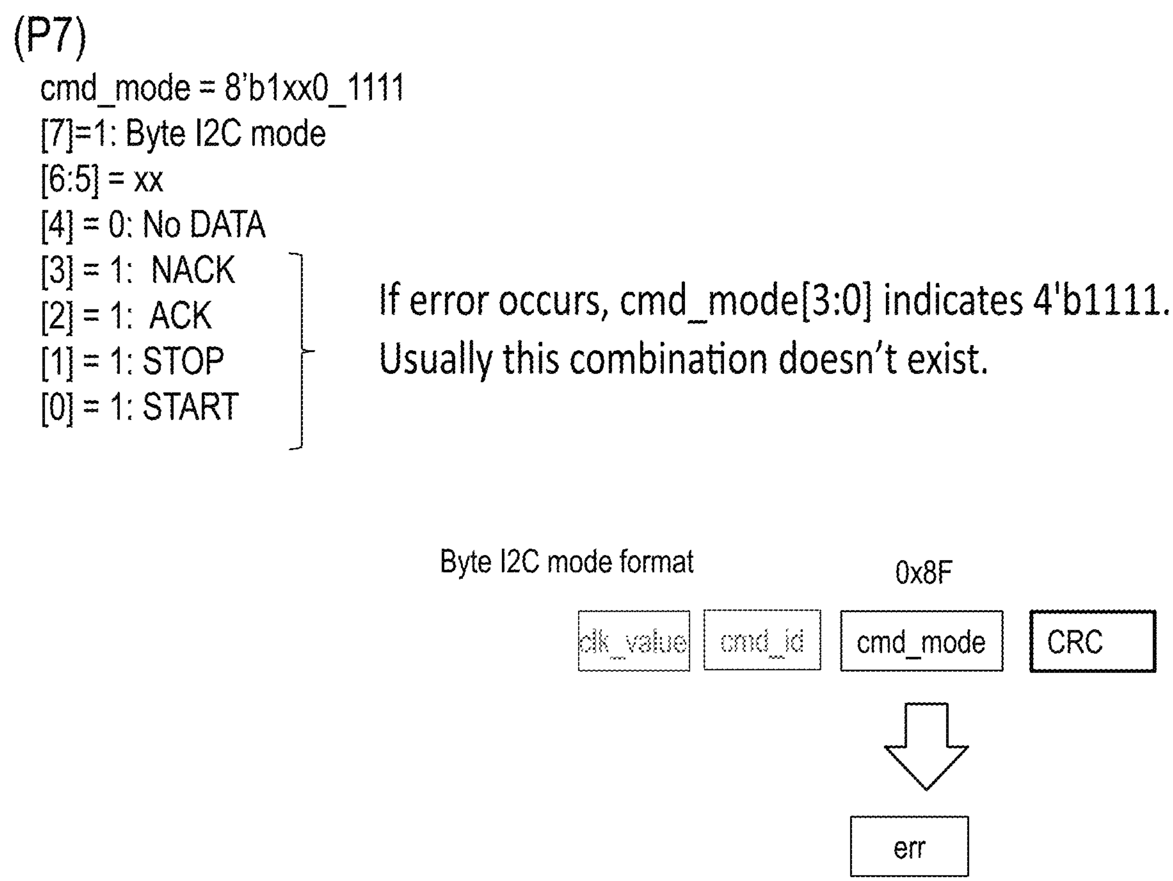
FIG. 16 is a diagram showing an example of setting the cmd_mode in the case where an error has occurred.

FIG. 16 shows an example of setting cmd_mode when an error has occurred. The cmd_mode shown in FIG. 16 is set to 8'b1xx0_1111. The bits [6:5]=xx of the cmd_mode indicate Don't care. The bits [3:0]=1111 are set. In this way, when all the lower 4 bits of the cmd_mode are set to 1, it indicates that an error has occurred during execution of the Byte I2C mode.

Figure 17:
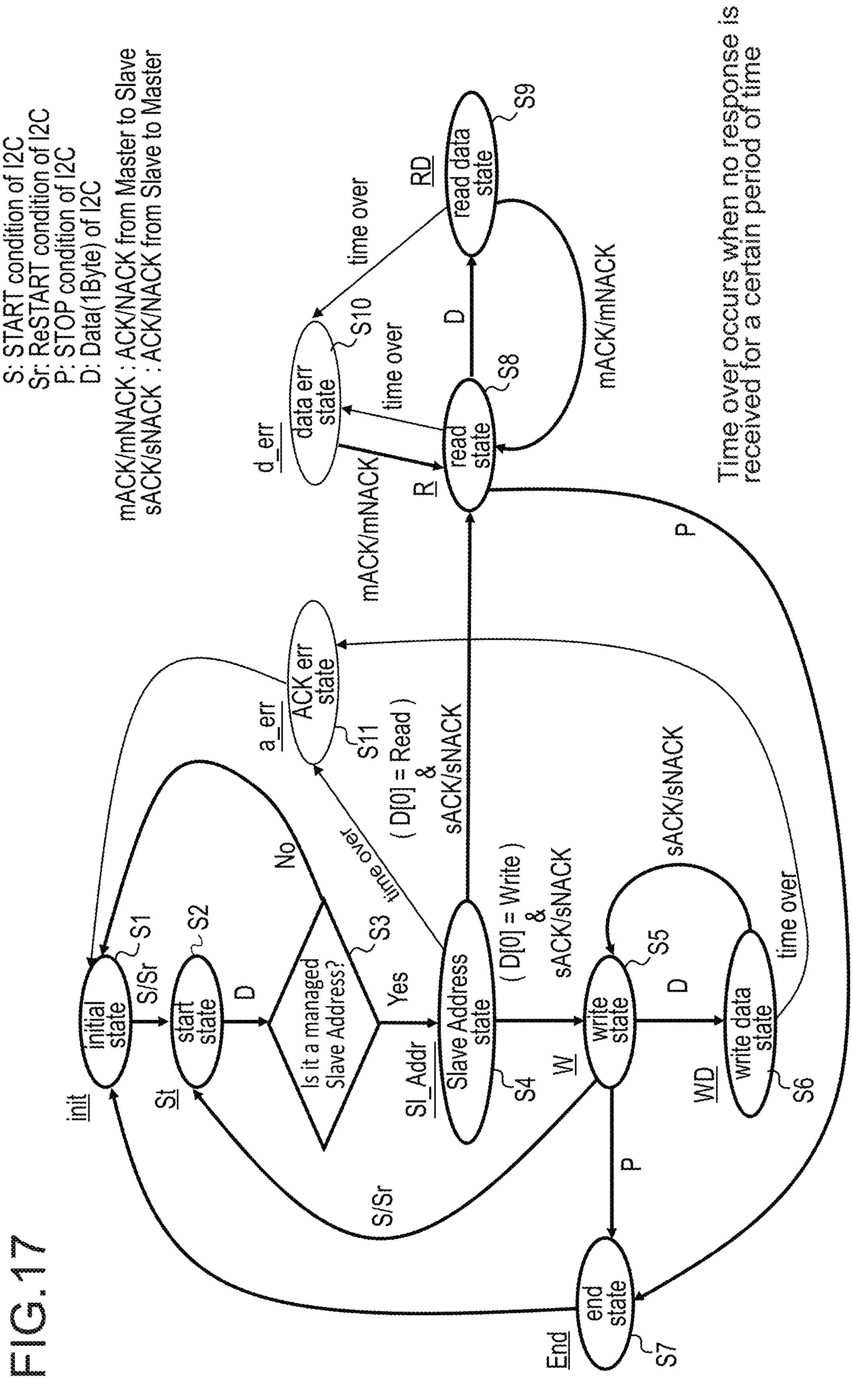
FIG. 17 is a state transition diagram of the Master SerDes that is a node 1 and the Slave SerDes that is a node 2.

FIG. 17 is a state transition diagram of the Master SerDes 7 that is the node 1 and the Slave SerDes 13 that is the node 2. The states of both the node 1 and the node 2 transition on the basis of the state transition diagram shown in FIG. 17. The state transition diagram of FIG. 17 shows the state transition in the Byte I2C mode shown in FIG. 9B. Note that, in the Bulk I2C mode shown in FIG. 9A, there is no need to consider the state transition because S (START condition) to P (STOP condition) are collectively transmitted and received. Hereinafter, the transition of the states of the node 1 and the node 2 in the Byte I2C mode will be described on the basis of FIG. 17.

The node 1 and the node 2 enter the initial state init when a power source is turned on (state S1). When an S/Sr (START/ReSTART) command of the I2C protocol from the Master 21 is received in the initial state init, the node 1 transitions to a START state ST (state S2). In the START state ST, node 1 converts the S/Sr (START/ReSTART) command of the I2C protocol received in the state S1 into a packet of the communication standard X shown in FIG. 13A and transmits the obtained packet to the node 2. When the node 2 receives the S/Sr (START/ReSTART) command from the node 1, the node 2 transitions to the Start state ST and transmits the S/Sr (START/ReSTART) command converted into the I2C protocol to the Slave 22.

When the node 1 receives, in the Start state ST, data D from the Master 21, the node 1 determines whether or not the received data is Slave address (state S3). If the received data is not Slave address, the state returns to the state S1. If the received data is Slave address, the state transitions to a Slave address state Sl_Addr (state S4). The node 1 instructs, in the Slave address state Sl_Addr, the Master 21 to perform clock stretch. The clock stretch means holding the clock from the Master 21 at a low level. During the clock stretch period, the Master 21 is unable to transmit new information to the node 1. Further, in the Slave address state Sl_Addr, the node 1 converts the Slave address of the I2C protocol into a packet of the communication standard X and transmits the obtained packet to the node 2. When the node 2 receives Slave address from the node 1, the node 2 transitions to the Slave address state Sl_Addr and transmits the Slave address converted into the I2C protocol to the Slave 22. When the node 2 receives, in the Slave address state Sl_Addr, an ACK/NACK signal from the Slave 22, the node 2 transitions to a Write state W, converts the ACK/NACK signal into the protocol of the communication standard X, and transmits the obtained signal to the node 1.

When the node 1 receives, in the Slave address state Sl_Addr, an ACK/NACK signal from the node 2, the node 1 transitions to the Write state W (State S5). In the Write state W, the Master 21 is instructed to release the clock stretch, and the ACK/NACK signal from the node 2 is converted into the I2C protocol and transmitted to the Master 21. When the node 1 receives, in the Write state W, the data D from the Master 21, the node 1 transitions to a Write data state WD (state S6). In this state, when the ACK/NACK signal is returned to the Master 21, the state returns to the Write state W. When the node 1 receives, in the Write state W, the P (STOP) command from the Master 21, the node 1 transitions to an end state End (state S7). When the P (STOP) command of the I2C protocol is converted into a packet of the communication protocol X and transmitted to the node 2 in the end state End, the state returns to the initial state init.

When the node 2 receives Slave address including a Read bit and transitions to the Slave address state Sl_Addr of the state S4 and receives ACK or NACK from the Slave 22, the node 2 transitions to a Read state R (state S8). After that, the node 2 converts ACK or NACK of the I2C protocol into a packet of the communication protocol X and transmits the obtained packet to the node 1. When the data D from the Slave is received in the Read state R, the state transitions to a Read data state RD (state S9). The node 2 translates the Read data into a packet of the I2C protocol of the communication protocol X and transmits the obtained packet to the node 1. When the node 1 receives an ACK/NACK packet from the node 2, the node 1 transitions to the Read state R and transmits ACK or NACK to the Master 21. After that, when the Read data packet is received, the state transitions to the Read data state RD, and the Read data is transmitted to the Master 21.

In the case where no ACK/NACK signal is received within the limited time in the Read data state RD, the time is over, and the state transitions to a data error state (state S10). Similarly, also in the case where the data D from the Slave is not received within the limited time in the Read state R, the time is over, and the state transitions to the data error state of the state S10. In the case where a dummy data signal is returned to the Master 21 in the data error state, the state returns to the Read state R of the state S8.

Meanwhile, in the case where no ACK/NACK signal from the Slave is received within the limited time in the Write data state WD of the state S6, the time is over, and the state transitions to an ACK error state a_err (state S11). Further, also in the case where no ACK/NACK from the Slave is received within the limited time in the Slave address state Sl_Addr of the state S4, the state transitions to the ACK error state a_err in the state S11. When predetermined error processing is performed in the ACK error state a_err, the processing returns to the state S1.

The state transitions when the Master SerDes 7 writes the Byte I2C mode are summarized as follows. When the LINK 11 in the Master SerDes 7 transitions to the Start state ST (first state) when the LINK 1 receives, from the Master 21, a signal including Start Condition. When transitioning to the Start state ST, the LINK 11 converts the Start Condition into a signal of the communication protocol X (first communication standard) and transmits the converted signal to the Slave SerDes 13. After that, when the LINK 11 receives, in the Start state ST, a signal including address information of the final destination apparatus of one byte (Slave address) from the Master 21, the LINK 11 transitions to the Slave address state Sl_Addr (second state) and holds the clock from the Master 21 at a low level. In the Slave address state Sl_Addr, the LINK 11 converts a signal including the address information into a signal of the communication protocol X and transmits the converted signal to the Slave SerDes 13. After that, when the LINK 11 receives, in the Slave address state Sl_Addr, a signal including the ACK signal or NACK signal from the Slave SerDes 13, the LINK 11 recognizes, in the case where a specific bit of the signal including the address information has a first bit value, the specific bit as writing and transitions to the Write state W (third state). In the Write state W, the LINK 11 converts the signal including the ACK signal or NACK signal received from the Slave SerDes 13 into the signal of the I2C protocol (second communication standard) and transmits the converted signal to the Master 21, and then releases the holding of the low level of the clock from the Master 21.

Further, when the LINK 11 receives, in the Write state W, a signal including one byte of write data from the Master 21, the LINK 11 transitions to the Write data state WD (fourth state). In the Write data state WD, the LINK 11 converts the received signal into a signal of the communication protocol X and transmits the converted signal to the Slave SerDes 13. After that, when the LINK 11 receives, in the Write data state WD, a signal including the ACK signal or the NACK signal from the Slave SerDes 13, the LINK 11 transitions to the Write state W, converts the received ACK/NACK signal into a signal of the I2C protocol, and transmits the converted signal to the Master 21.

Further, in the case where the LINK 11 receives, in the Slave address state Sl_Addr or the Write data state WD, no signal including an ACK signal or a NACK signal from the Slave 22 within a predetermined time period, the LINK 11 transitions to the ACK error state a_err (fifth state), and performs error processing in the ACK error state a_err.

Meanwhile, the state transitions when the Master SerDes 7 reads the Byte I2C mode are summarized as follows. When the LINK 11 in the Master SerDes 7 receives a signal including Start Condition or ReStart Condition from the Master 21, the LINK 11 transitions to the Start state ST. When transitioning to the Start state ST, the LINK 11 converts a signal including the received Start Condition or ReStart Condition into a signal of the communication protocol X and transmits the converted signal to the Slave SerDes 13. After that, when the LINK 11 receives, in the Start state ST, a signal including address information of the final destination apparatus of one byte from the Master 21, the LINK 11 transitions to the Slave address state Sl_Addr and holds the clock from the Master 21 at a low level. In the Slave address state Sl_Addr, the LINK 11 converts the signal including the address information into a signal of the communication protocol X and transmits the converted signal to the Slave SerDes 13. After that, when the LINK 11 receives, in the Slave address state Sl_Addr, a signal including an ACK signal or a NACK signal from the Slave SerDes 13, the LINK 11 recognizes, in the case where a specific bit of the signal including the address information has a second bit value, the specific bit as reading and transitions to the Read state R (sixth state). In the Read state R, the LINK 11 converts the signal including the ACK signal or NACK signal received from the Slave SerDes 13 into a signal of the I2C protocol, transmits the converted signal to the Master 21, and then releases the holding of the low level of the clock from the Master 21.

Further, when the LINK 11 receives, in the Read state R, a signal including one byte of reading data from the Slave SerDes 13, the LINK 11 transitions to the Read data state RD (the seventh state). In the Read data state RD, the LINK 11 converts the received signal into a signal of the I2C protocol and transmits the converted signal to the Master 21. After that, when the LINK 11 receives, in the Read data state RD, a signal including an ACK signal or a NACK signal from the Master 21, the LINK 11 transitions to the Read state R, converts the received signal into a signal of the communication protocol X, and transmits the converted signal to the Slave SerDes 13.

Further, when the LINK 11 receives, in the Read state R, no reading data from the Slave SerDes 13 within a predetermined time period, the LINK 11 transitions to the data error state d_err (eighth state). In the case where the LINK 11 receives, in the Read data state RD, no ACK signal or NACK signal from the Master 21 within a predetermined time period, transitions to the data error state d_err. The LINK 11 performs error processing in the data error state d_err to avoid deadlock of the entire system including the communication apparatus, the Master 21, and the Slave SerDes 13.

Meanwhile, the state transitions of the Master SerDes 7 in the Bulk I2C mode are summarized as follows. The LINK 11 in the Master SerDes 7 holds the received signal from when receiving the signal including Start Condition to when receiving the signal including Stop Condition from the Master 21, and transmits the signal including the ACK signal or NACK signal to the Master 21 for each byte of the received signal. The LINK 11 converts the received signal into a signal of the communication protocol X and transmits the converted signal to the Slave SerDes 13. The LINK 11 receives, from the Slave SerDes 13, the signal including the ACK signal or NACK signal from the Slave 22, holds the received signal, then converts the signal from the Slave SerDes 13 into a signal of the I2C protocol in response to a read request from the Master 21, and transmits the converted signal to the Master 21.

Figure 18:
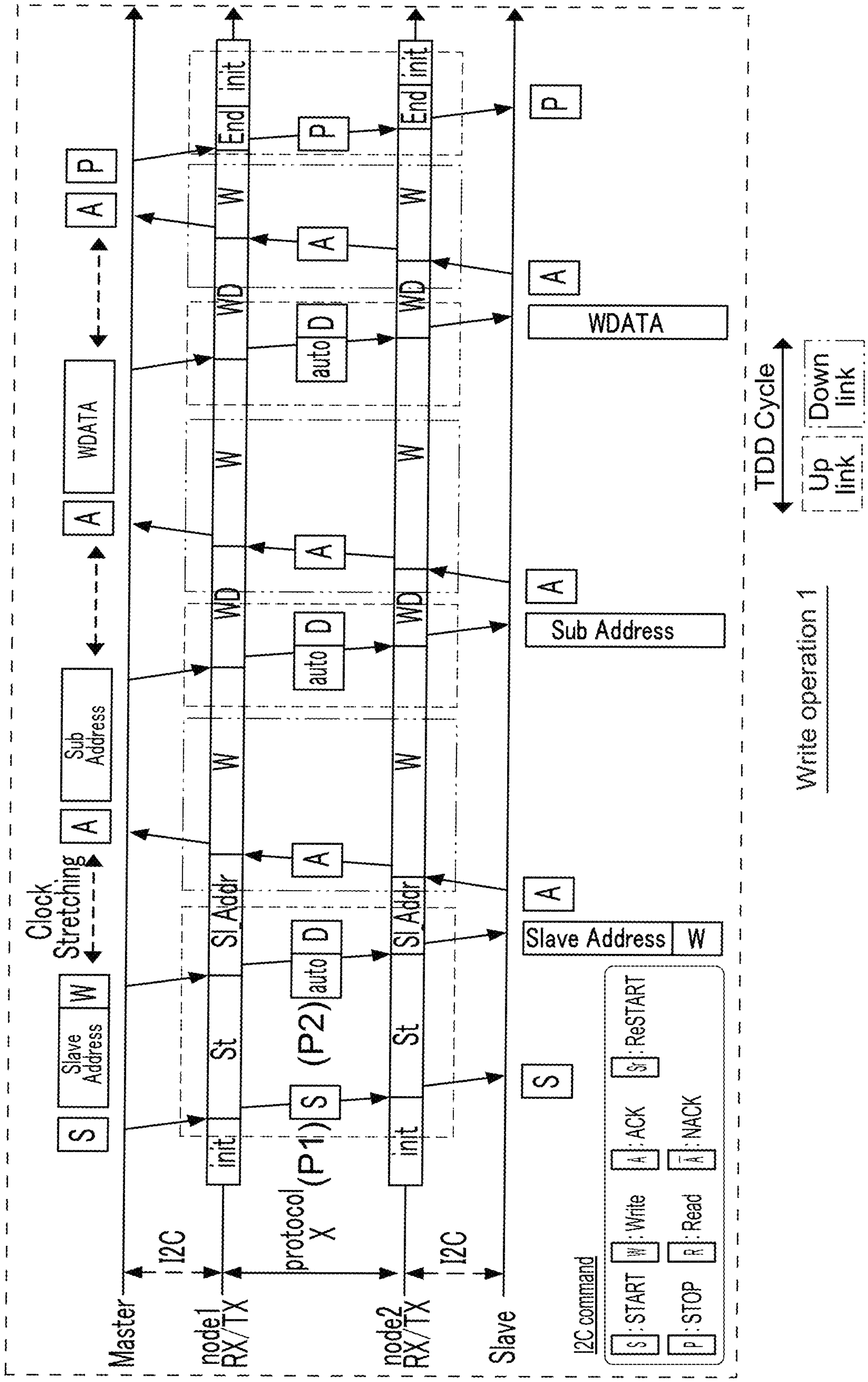
FIG. 18 is a timing chart of a basic Write model in which the Slave SerDes automatically generates a clock CLK count in the Byte I2C mode.

FIG. 18 is a timing chart of a basic Write model (hereinafter, referred to as the Write operation 1) in which the Slave SerDes automatically generates a clock CLK count in the Byte I2C mode. In the Write operation 1, the node 2 receives a signal from the node 1, understands cmd_mode

[6:5]=2'b00 in the received signal, and automatically generates a clock CLK. The node 2 is capable of transmitting Write data to the Slave 22 or receiving an ACK signal from the Slave 22 using the clock CLK.

As shown in FIG. 18, when the Slave address from the Master 21 is transmitted to the Slave 22, the Slave 22 returns an ACK signal to the Master 21. Subsequently, when the offset address from the Master 21 is transmitted to the Slave 22, the Slave 22 returns an ACK signal to the Master 21. Subsequently, when the WDATA from the Master 21 is transmitted to the Slave 22, the Slave 22 returns an ACK signal to the Master 21. After that, the transmission of WDATA and the return of the ACK signal are repeated in units of one byte until a STOP command is transmitted.

Figure 19:
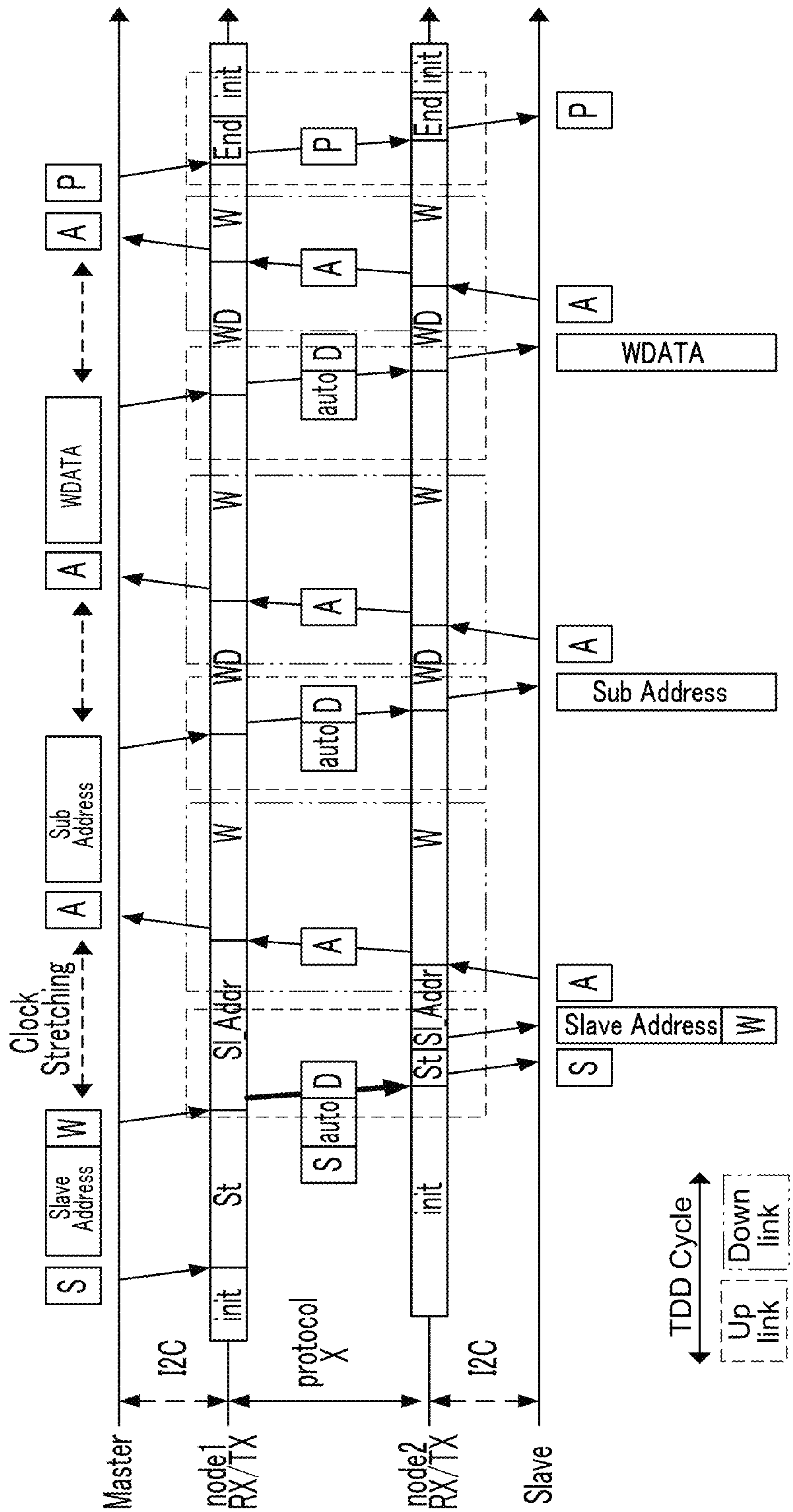
FIG. 19 is a timing chart of a Write operation 2 that is a modified example of the Write operation 1 shown in FIG. 18.

FIG. 19 is a timing chart of a Write operation 2 that is a modified example of the Write operation 1 shown in FIG. 18. In the Write operation 1 shown in FIG. 18, the node 1 transmits, in the START state St, the START command to the node 2. In the Write operation 2, the node 1 collectively transmits, in the Slave address state Sl_Addr, the START command and the data D to the node 2. As a result, it is possible to reduce the transaction of the communication protocol X as compared with the Write operation 1 shown in FIG. 18.

Figure 20:
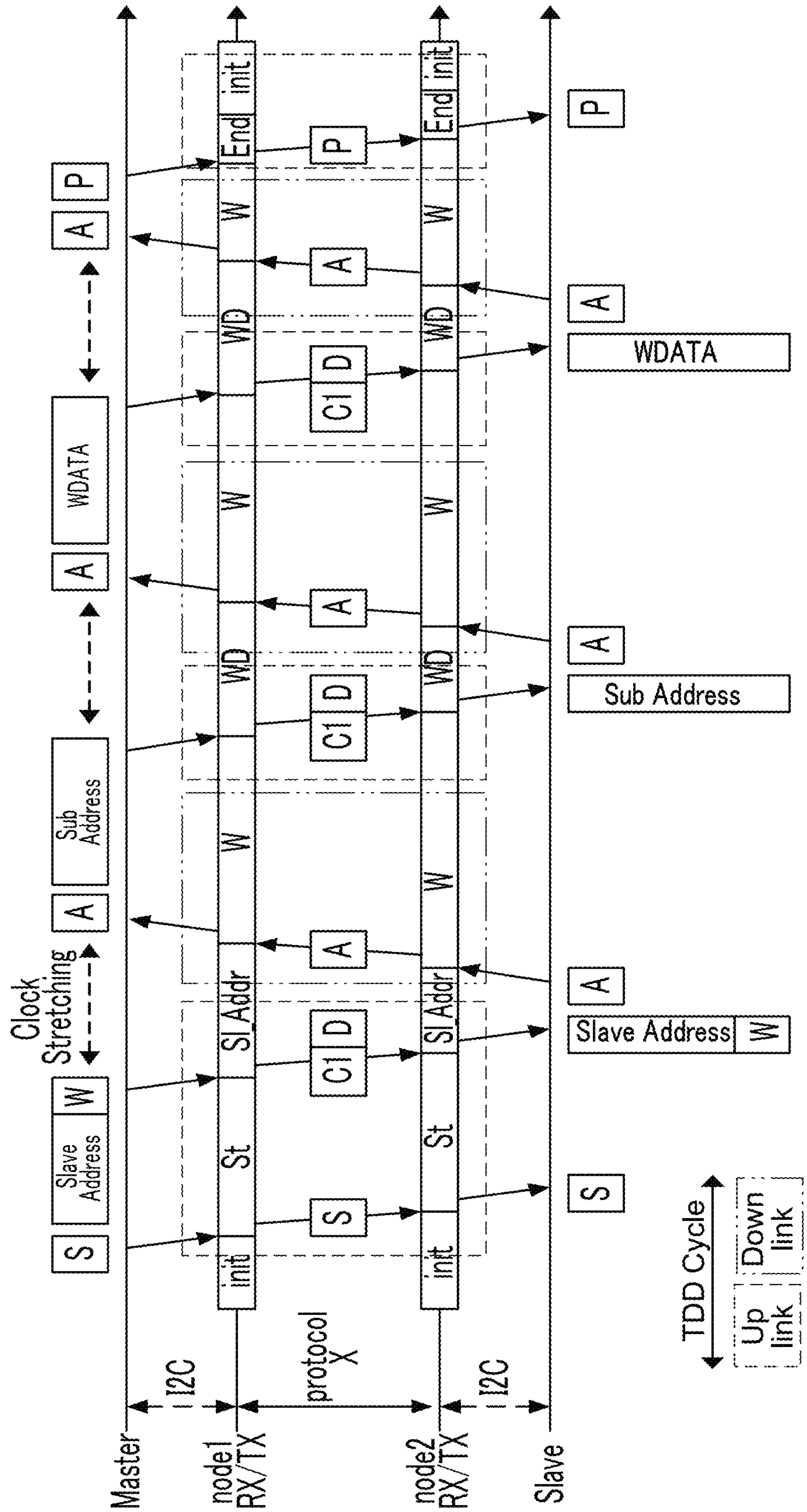
FIG. 20 is a timing chart of a basic Write operation 3 for specifying a clock CLK count in the Byte I2C mode.

FIG. 20 is a timing chart of a basic Write operation 3 for specifying the clock CLK count in the Byte I2C mode. In the Write operation 3 shown in FIG. 19, unlike the Write operations 1 and 2, the node 1 specifies, in cmd_mode, information of the period count of the clock CLK used by the node 2. In this case, one period is specified. The node 2 understands the signal cmd_mode [6:5]=2'b01 received from the node 1 and generates a clock CLK of one period for ACK at the appropriate timing for the Slave 22. The node 2 receives an ACK signal from the Slave 22 using this clock CLK. FIG. 20 is adopted in the case where, for example, the processing performance of the node 2 is low. The node 1 computes the period count of the necessary clock CLK on behalf of the node 2.

Figure 21:
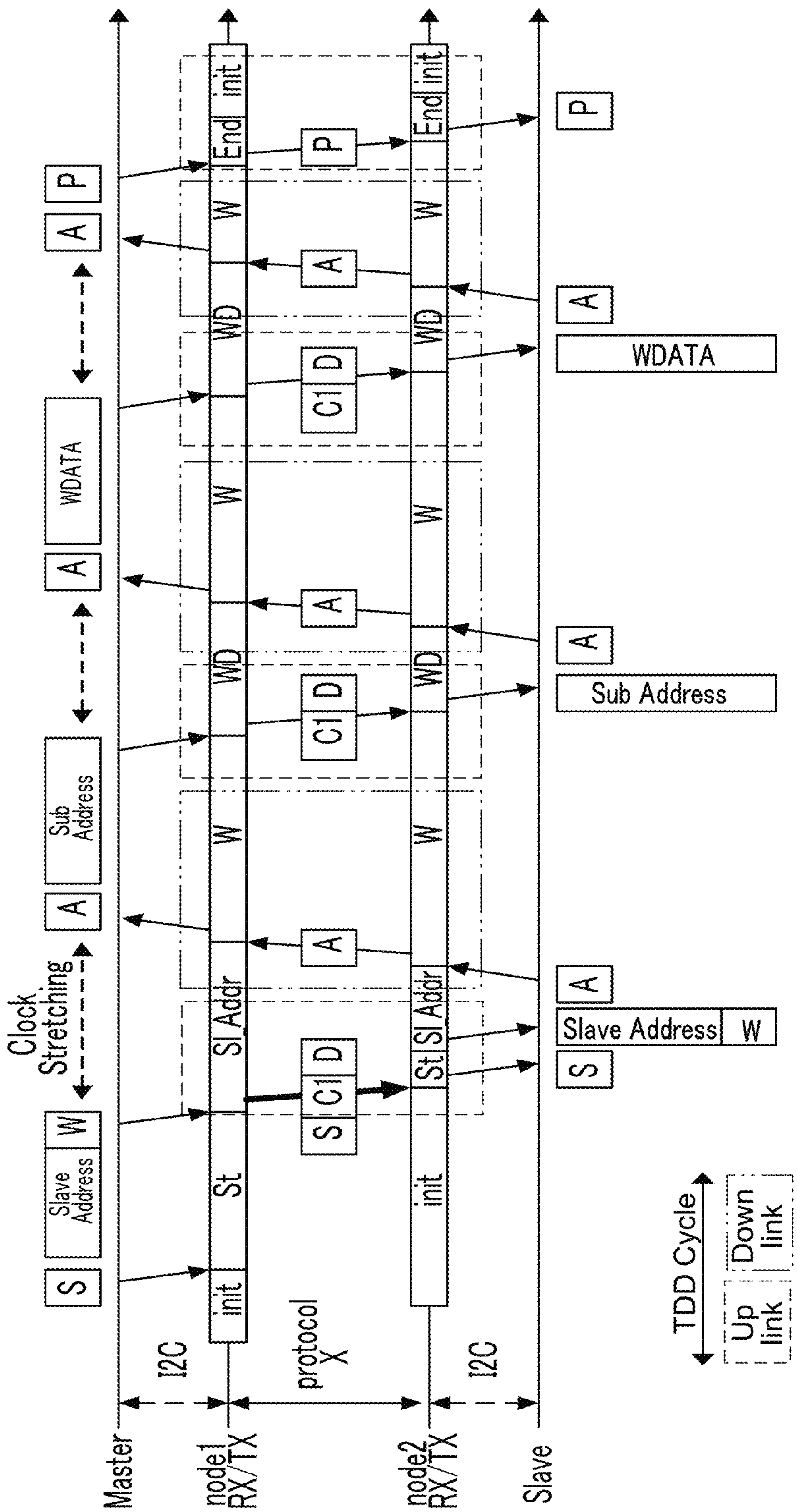
FIG. 21 is a timing chart of a Write operation 4 that is a modified example of the Write operation 3 shown in FIG. 20.

FIG. 21 is a timing chart of a Write operation 4 that is a modified example of the Write operation 3 shown in FIG. 20. In the Write operation 3 shown in FIG. 20, the node 1 transmits, in the START state St, the START command to the node 2. In the Write operation 4, the node 1 collectively transmits, in the Slave address state Sl_Addr, the START command and the data D to the node 2. As a result, it is possible to reduce the transaction of the particular protocol X as compared with the Write operation 3.

Figure 22:
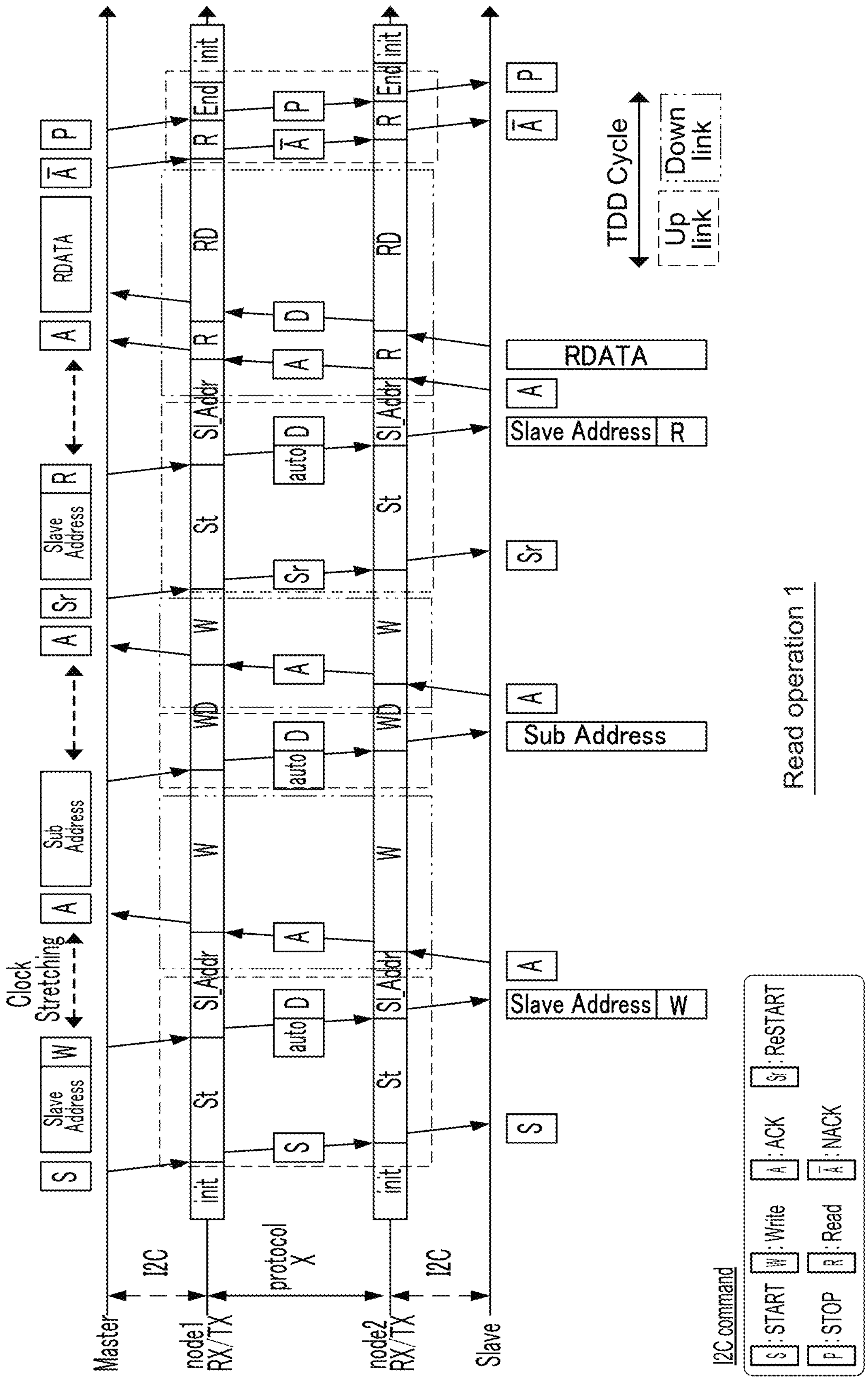
FIG. 22 is a timing chart of a basic Read model in which the Slave SerDes automatically generates a clock CLK count in the Byte I2C mode.

FIG. 22 is a timing chart of a basic Read model (hereinafter, referred to as the Read operation 1) in which the Slave SerDes automatically generates a clock CLK count in the Byte I2C mode. In the Read operation 1, the node 2 receives a signal from the node 1, understands the cmd_mode [6:5]=2'b00 in the received signal, and automatically generates a clock CLK. Thus, the node 2 receives the ACK signal from the Slave 22, or receives RDATA and transmits it to the node 1 using the clock CLK generated by itself.

As shown in FIG. 22, in the Read operation 1, first, Slave address and an offset address are transmitted to the Slave 22 in a Write command, and then the same Slave address and Read command as the previous ones are transmitted.

Figure 23:
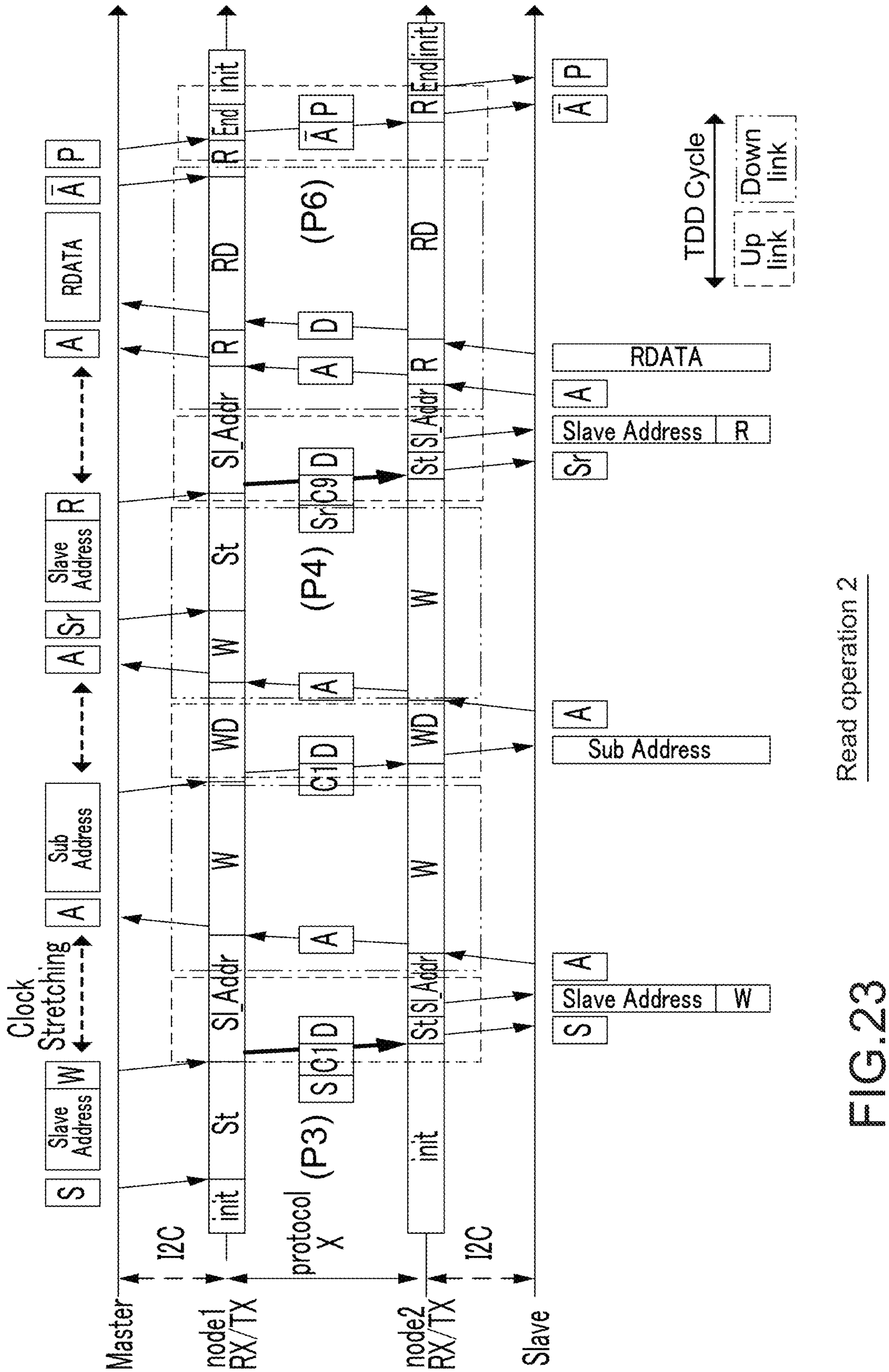
FIG. 23 is a timing chart of a Read operation 2 that is a modified example of the Read operation 1 shown in FIG. 22.

FIG. 23 is a timing chart of a Read operation 2 that is a modified example of the Read operation 1 shown in FIG. 22. In the Read operation 2, the node 1 specifies, in cmd_mode, information of the period count of the clock CLK used by the node 2. The node 2 understands the signal cmd_mode [6:5]=2'b01 received from the node 1 in the cmd_mode described as C1 in FIG. 23, and generates a clock CLK of one period for ACK at the appropriate timing for the Slave 22. The node 2 receives an ACK signal from the Slave 22 using this clock CLK. The node 2 understands the signal cmd_mode [6:5]=2'b11 received from the node 1 in the cmd_mode described as C9, and generates a clock CLK of nine periods for ACK and RDATA signals at the appropriate timing for the Slave 22. The node 2 receives ACK and RDATA signals from the Slave 22 using this clock CLK. As described above, in FIG. 23, since the performance of the node 2 is low, the node 1 calculates and notifies the period count of the clock CLK used in the node 2.

Figure 24:
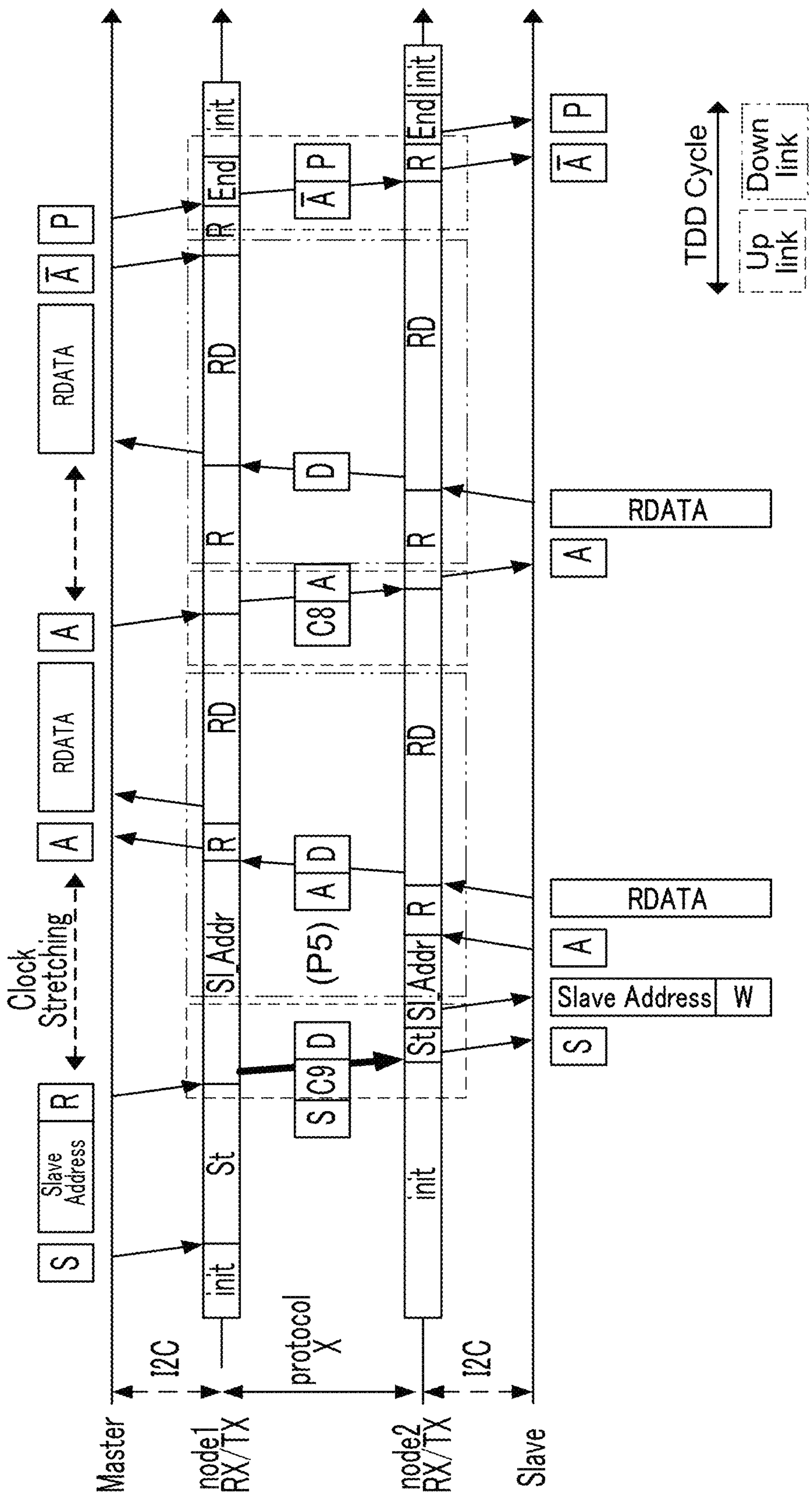
FIG. 24 is a timing chart of a Read operation 3 in the case where there is no Sub Address.

FIG. 24 is a timing chart of a Read operation 3 in the case where there is no Sub Address. In the Read operation 3, unlike the Read operations 1 and 2, there is no offset address subsequent to the Slave address. In FIG. 22 and FIG. 23, the Slave address is transmitted first in the Write command. In the Read operation 3, the Slave address is transmitted in the Read command first. When the node 2 transmits the Slave address to the Slave 22, the node 2 receives the ACK signal and the RDATA transmitted from the Slave 22 and transmits them to the node 1. The node 1 transmits, to the Master 21, the ACK signal and the RDATA from the node 2. In the cmd_mode described as C8 in FIG. 24, the node 2 understands the signal cmd_mode [6:5]=2'b10 received from the node 1, and generates the clock CLK of eight periods for the RDATA signal at the appropriate timing for the Slave 22. This clock CLK is used by the node 2 to receive the RDATA from the Slave 22.

Figure 25:
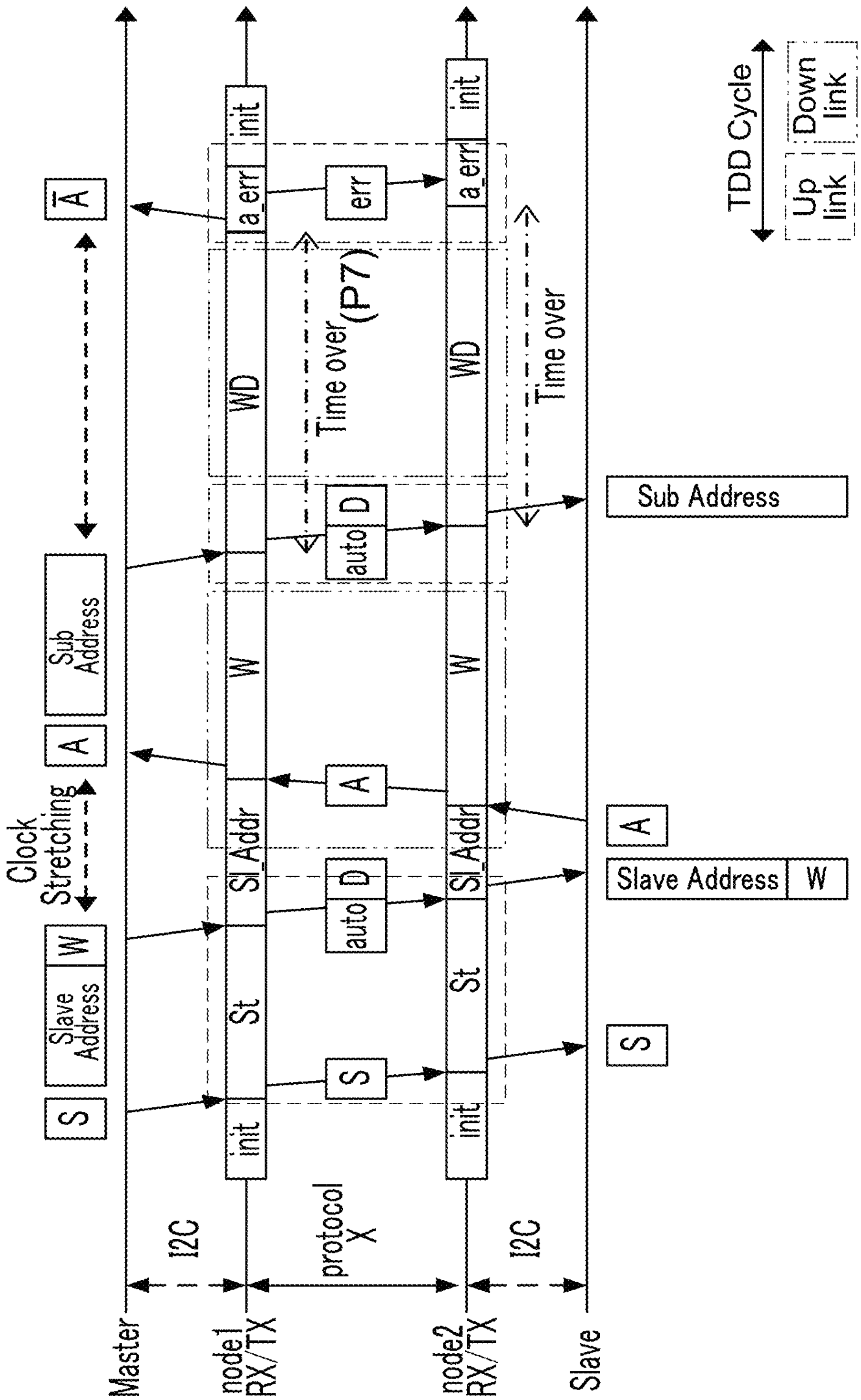
FIG. 25 is a timing chart of an Err operation 1 in the Byte I2C mode.

FIG. 25 is a timing chart of an Err operation 1 in the Byte I2C mode. The Err operation 1 is performed in the case where the ACK/NACK signal from the Slave 22 has not been received within the limited time. In the case where the node 2 has not received the ACK/NACK signal from the Slave 22, the time is over and the node 1 and the node 2 return to the initial state init after transitioning to the ACK_err state a_err and then performing the error processing. When the node 1 transitions to the ACK_err state a_err, the node 1 returns a NACK signal to the Master 21 and transfers the err packet to the node 2. At this time, the node 1 may register, in an err register, being the ACK_err state a_err.

Figure 26:
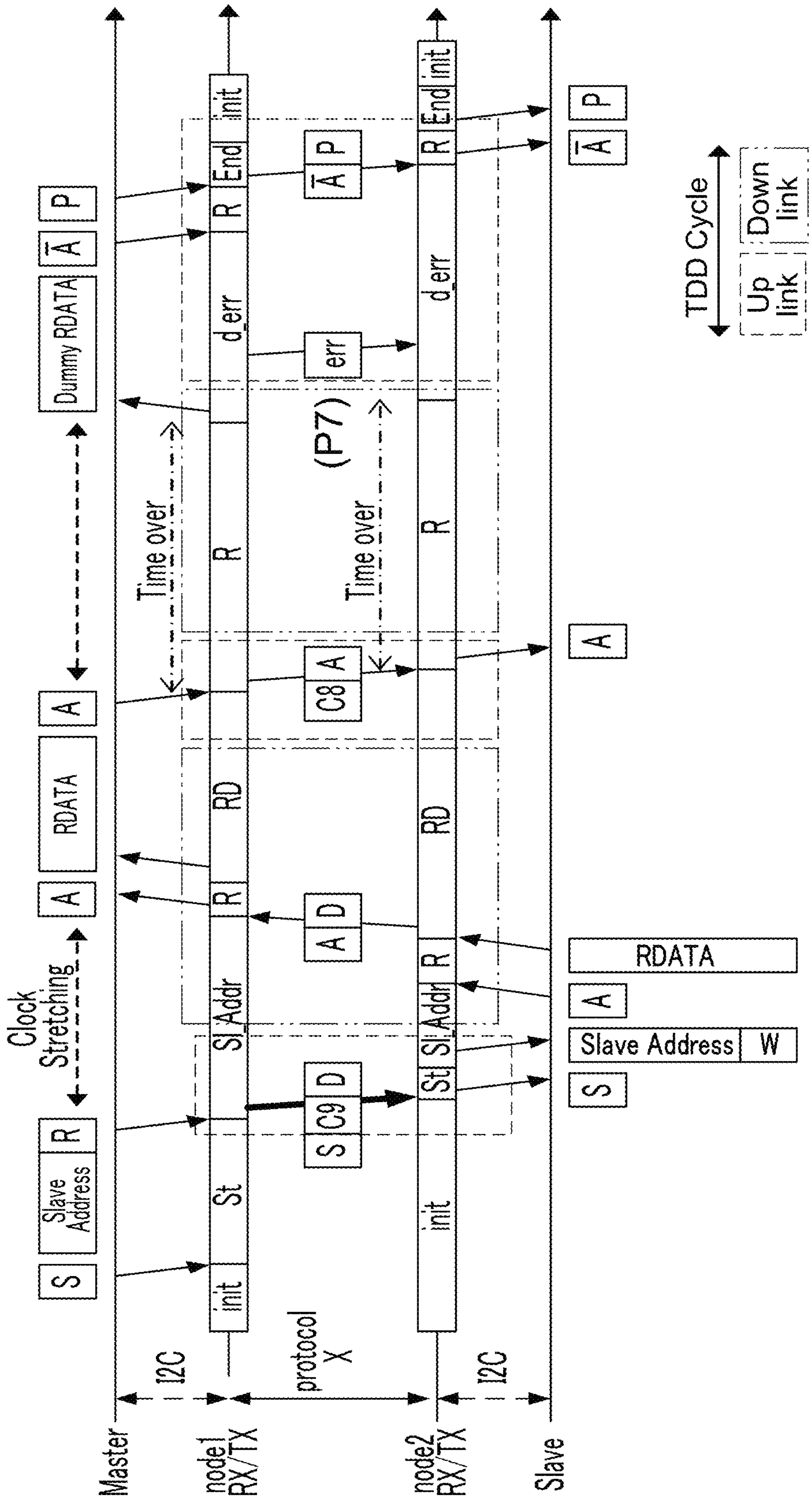
FIG. 26 is a timing chart of an Err operation 2 in the Byte I2C mode.

FIG. 26 is a timing chart of the Err operation 2 in the Byte I2C mode. The Err operation 2 is performed in the case where the RDATA from the Slave 22 has not been received or a part of the RDATA is insufficient. In the case where the node 2 has not received the RDATA from the Slave 22 within the limited time or a part of the RDATA is insufficient, the time is over and the node 1 and the node 2 transition to the data_err state d_err. When the node 1 transitions to the data_err state d_err, the node 1 returns dummy RDATA to the Master 21 and transfers an err packet to the node 2. At this time, the node 1 may register the data_err state d_err in the err register.

Since the Master 21 is capable of recognizing that RDATA has been received after the time is over, the Master 21 is capable of determining, by reading the err register of the node 1 as necessary, whether the RDATA after the time is over is dummy data or normal data.

The above is the detailed operation of the Byte I2C mode. Subsequently, the detailed operation of the Bulk I2C mode will be described.

(Detailed Operation of Bulk I2C Mode)

Figure 7:
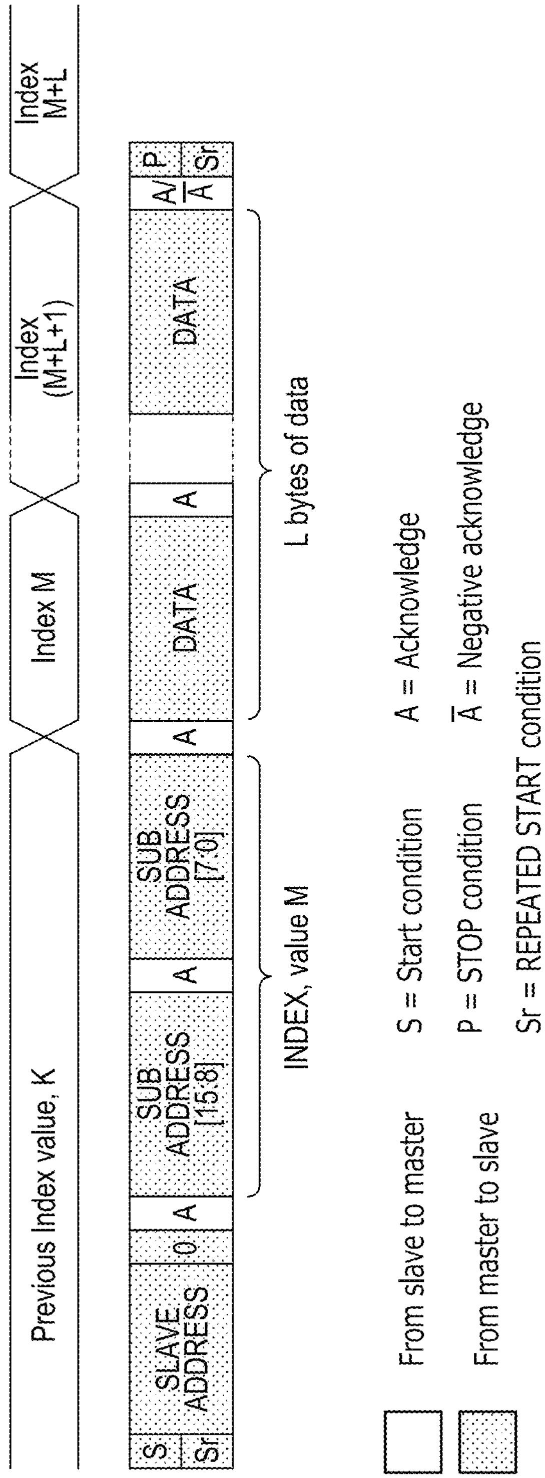
FIG. 7 is a diagram showing an I2C communication protocol at the time of Random Write.

Hereinafter, a case where the Random Write is performed from the Master 21 to the Slave 22 will be described. In the case where the Master 21 performs Random Write to the Slave 22, the Master 21 transmits a command set to the Master SerDes 7 via I2C communication first. The I2C communication protocol at the time of Random Write is as shown in FIG. 7 described above, and the Master 21 transmits a command set to the Master SerDes 7 in accordance with this protocol.

Figure 27:
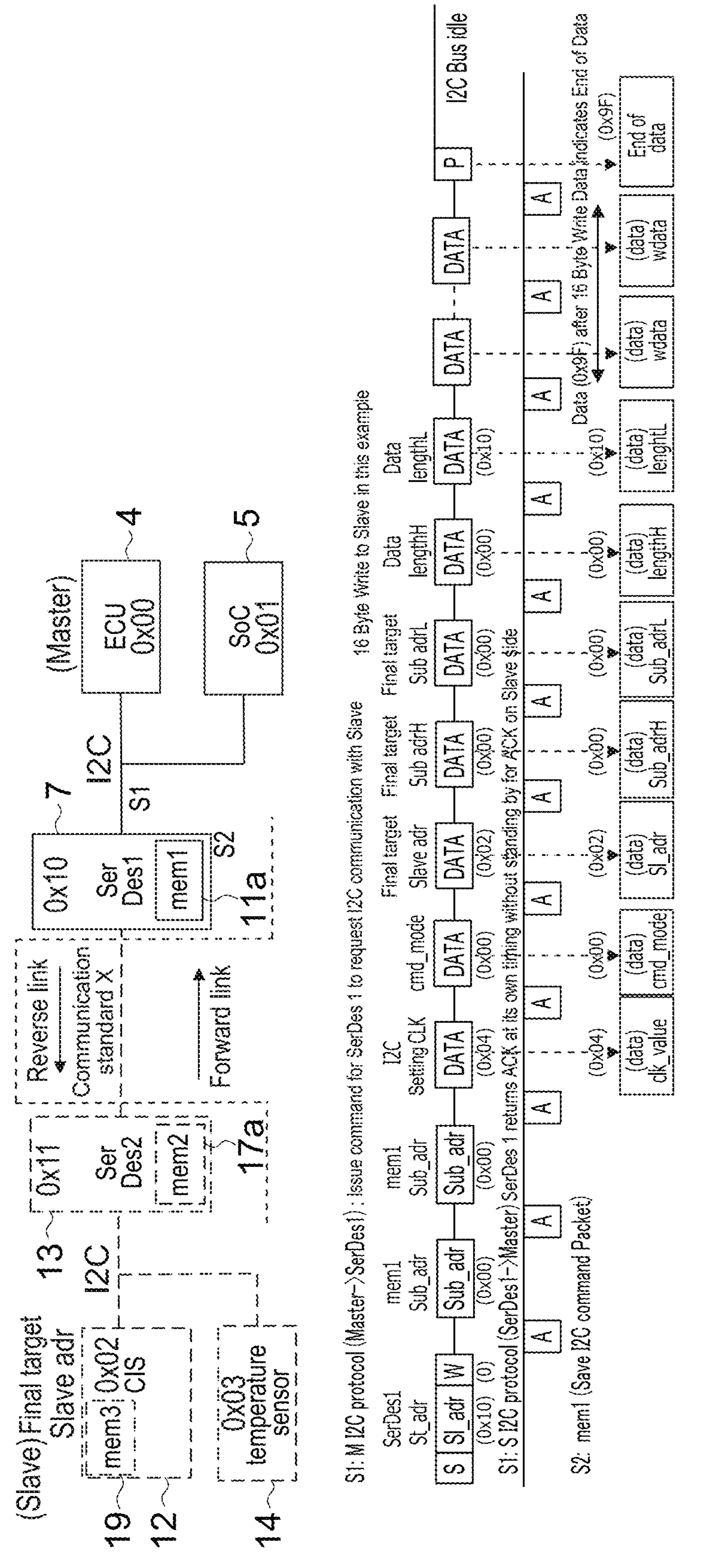
FIG. 27 is a diagram showing a signal transmitted and received between the Master and the Master SerDes in the Bulk I2C mode.

FIG. 27 is a diagram showing a signal transmitted and received between the Master 21 and the Master SerDes 7 in the case where Random Write is performed from the Master 21 to the Slave 22 in the Bulk I2C mode. The signal of the I2C protocol from the Master 21 to the Master SerDes 7 is referred to herein as the M I2C protocol. As shown in FIG. 27, the M I2C protocol includes S (START condition), SerDes 1 St_adr, W, mem 1 Sub_adr, mem 1 Sub_adr, I2C setting CLK, Cmd_mode, final target Slave adr, final target Sub adrH, final target Sub adrL, Data lengthH, Data lengthL, Data×2, and P (STOP condition). Details of these pieces of information will be described below.

The data in the I2C protocol transmitted from the Master 21 is stored in the table 1 in the mem 1 of the Master SerDes 7. FIG. 28 is a diagram showing an example of the data stored in the table 1 in the mem 1 in the Bulk I2C mode. As the data, CLK_value, which is a setting value of the I2C setting clock CLK, is stored at the address of the mem 1 indicated by Sub_Adr transmitted by the M I2C protocol, and the subsequent pieces of data transmitted by the M I2C protocol are stored at the incremented addresses of the mem 1. CLK_value is one byte of information indicating the SCL frequency as described above, and the Slave 22 performs I2C communication with the Slave SerDes 13 at the operation frequency specified by CLK_value.

Cmd_mode of Sub_Adr [1] is one byte of information indicating the content of the command received from the Master 21 by the Master SerDes 7.

Slave Adr of Sub_Adr [2] in the table 1 of FIG. 28 is one byte of information indicating the address (e.g., 0x02 for the image sensor 12) of the Slave 22 to be written or read.

Sub_adrH of Sub_Adr [3] is the upper one byte of information of the address indicating which Sub_adr of the mem 19 (mem 3) in the image sensor 12 is accessed or which Sub_adr of a mem 20 in the temperature sensor 14 is accessed.

Sub_adrL of Sub_Adr [4] is the lower one byte of information of the address indicating which Sub_adr of the mem 19 (mem 3) in the image sensor 12 is accessed or which Sub_adr of the mem 20 in the temperature sensor 14 is accessed.

LengthH of Sub_Adr [5] is the upper one byte of information of the data length of WDATA (Data[N−2:7]). LengthL of Sub_Adr [6] is the lower one byte of information of the data length of WDATA (Data[N−2:7]).

WDATA of Sub_Adr [N−2:7] is data to be written to the Slave 22. One byte of data is stored for each bit of Sub_Adr.

As End of Data of Sub_Adr [N−1], 0x9F is written when P (STOP condition) is received from the Master 21. An initial value such as 0x00 has been written at default.

Figure 29:
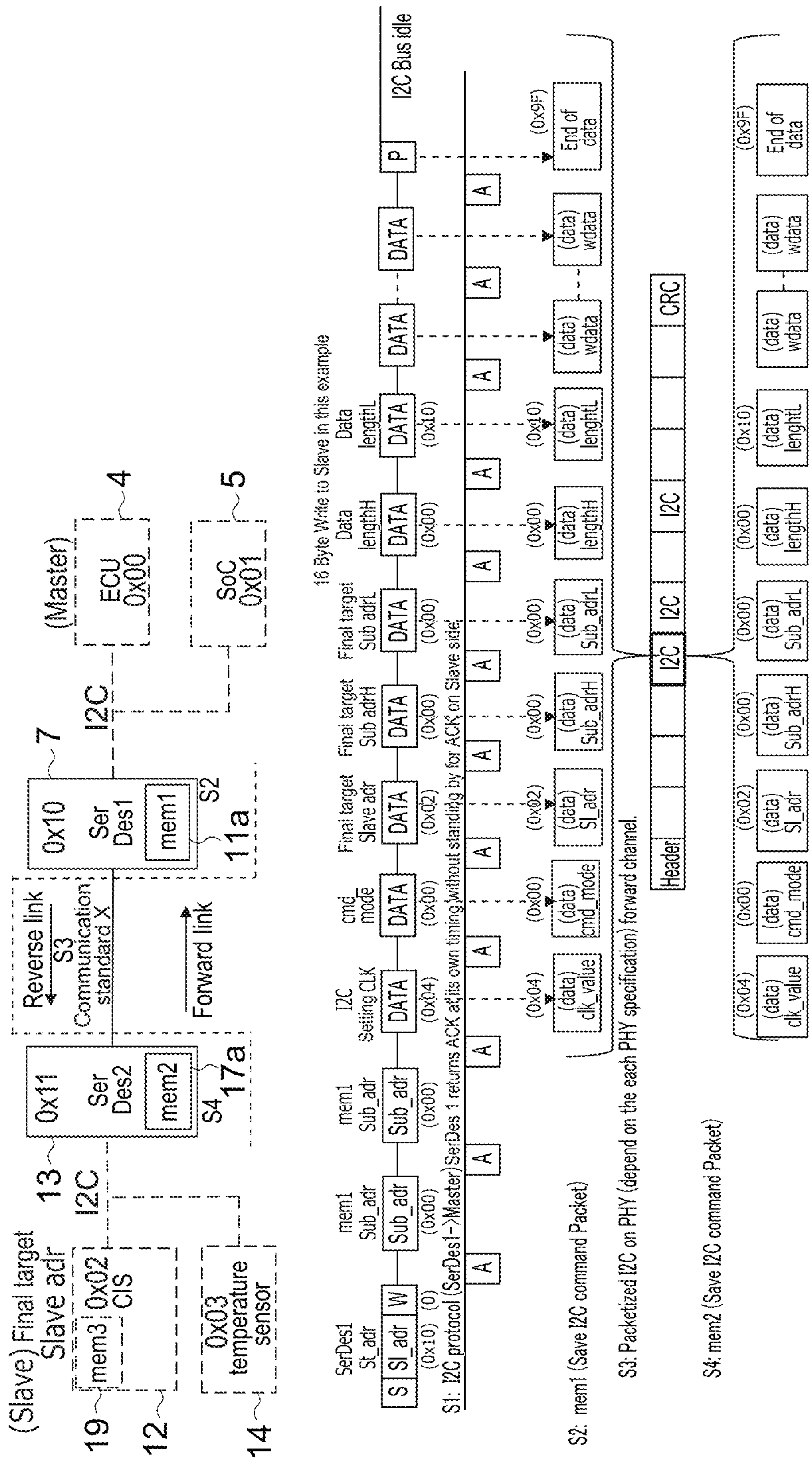
FIG. 29 is a diagram showing processing of transmitting a Random Write Command from the Master SerDes to the Slave SerDes in the Bulk I2C mode over the communication standard X.

FIG. 29 follows FIG. 27, and is a diagram showing processing of transmitting a Random Write Command from the Master SerDes 7 to the Slave SerDes 13 in the Bulk I2C mode over the communication standard X. The I2C protocol and the mem 1 (Save I2C command Packet) (Steps S1 and S2) in FIG. 29 are the same as those described with reference to FIG. 27.

The Master SerDes 7 reads the data of the table 1 shown in FIG. 28, converts the read data into a signal of the communication standard X protocol, and transmits the obtained signal to the Slave SerDes 13 by a Packetized I2C on PHY (depend on the each PHY specification) forward channel (Step S3).

In the case where Cmd_mode=0x00, Cmd_mode [7]=0, which indicates "end determination for each End of data". For this reason, when the LINK 11 of the Master SerDes 7 receives "End of data (0x9F)", the LINK 11 writes "End of data (0x9F)" to the table 1 shown in FIG. 28, reads the table 1 shown in FIG. 28, and transmits it to the Slave SerDes 13 via the Rv.Tx 10.

In the case where Cmd_mode=0x80, when End of data and cmd_done are written, the data in the mem 1 (the table 1 shown in FIG. 28) is collectively I2C-command-converted and transmitted to the Slave SerDes 13 via the Rv.Tx 10.

The Slave SerDes 13 extracts the I2C command packet from the received signal of the communication standard X protocol and writes it to the table 3 in the mem 2. This is called the mem 2 (Save I2C command Packet) in FIG. 29 (Step S4). FIG. 30 is a diagram showing an example of the table 3 in the mem 2 during the Random Write operation in the Bulk I2C mode. The same information as the table 1 shown in FIG. 28 is written to the table 3.

The Slave SerDes 13 performs protocol-conversion on the received data of Reverse link and restores the original stored data of the mem 1 in the mem 2. The Slave SerDes 13 determines that the I2C command packet has been restored by the restoration of End of data.

Figure 31:
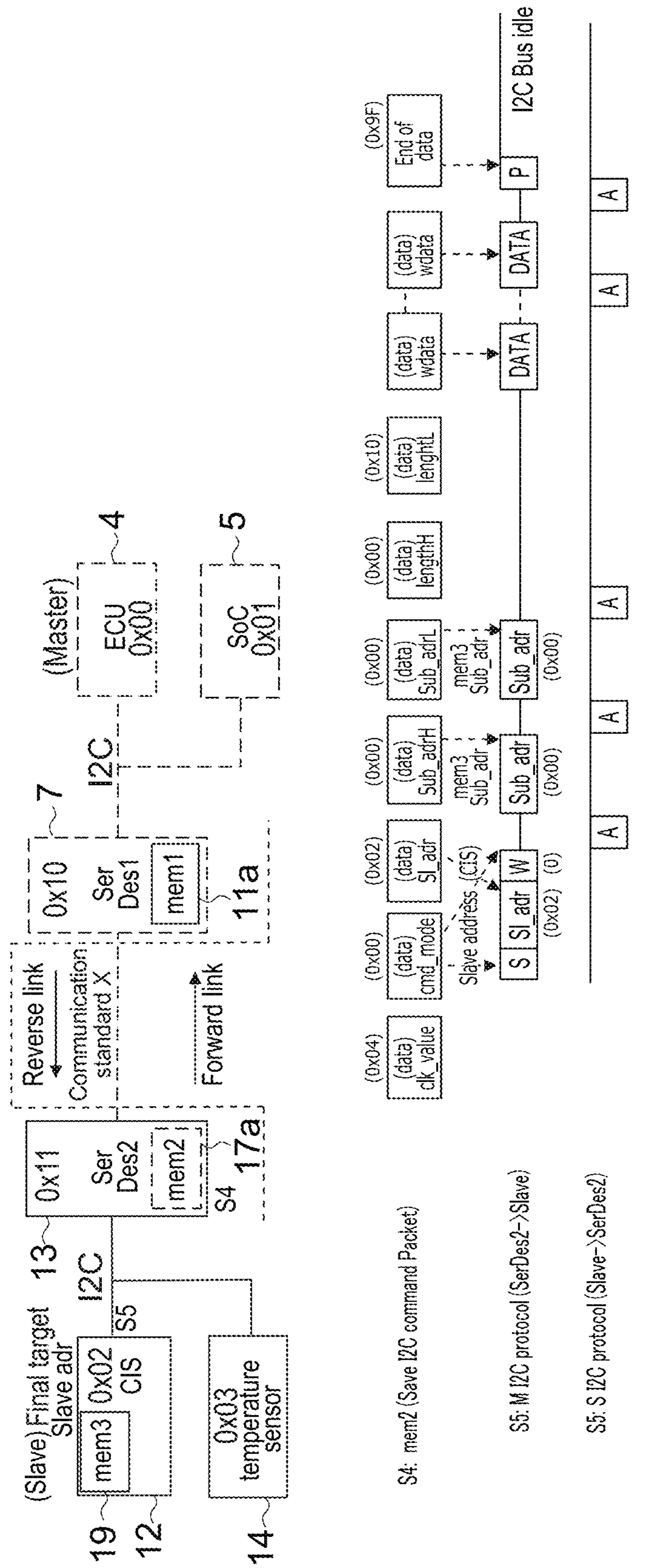
FIG. 31 is a diagram showing processing in which the Slave SerDes and the Slave transmit and receive data to/from each other through I2C communication in the Bulk I2C mode.
Figure 32:
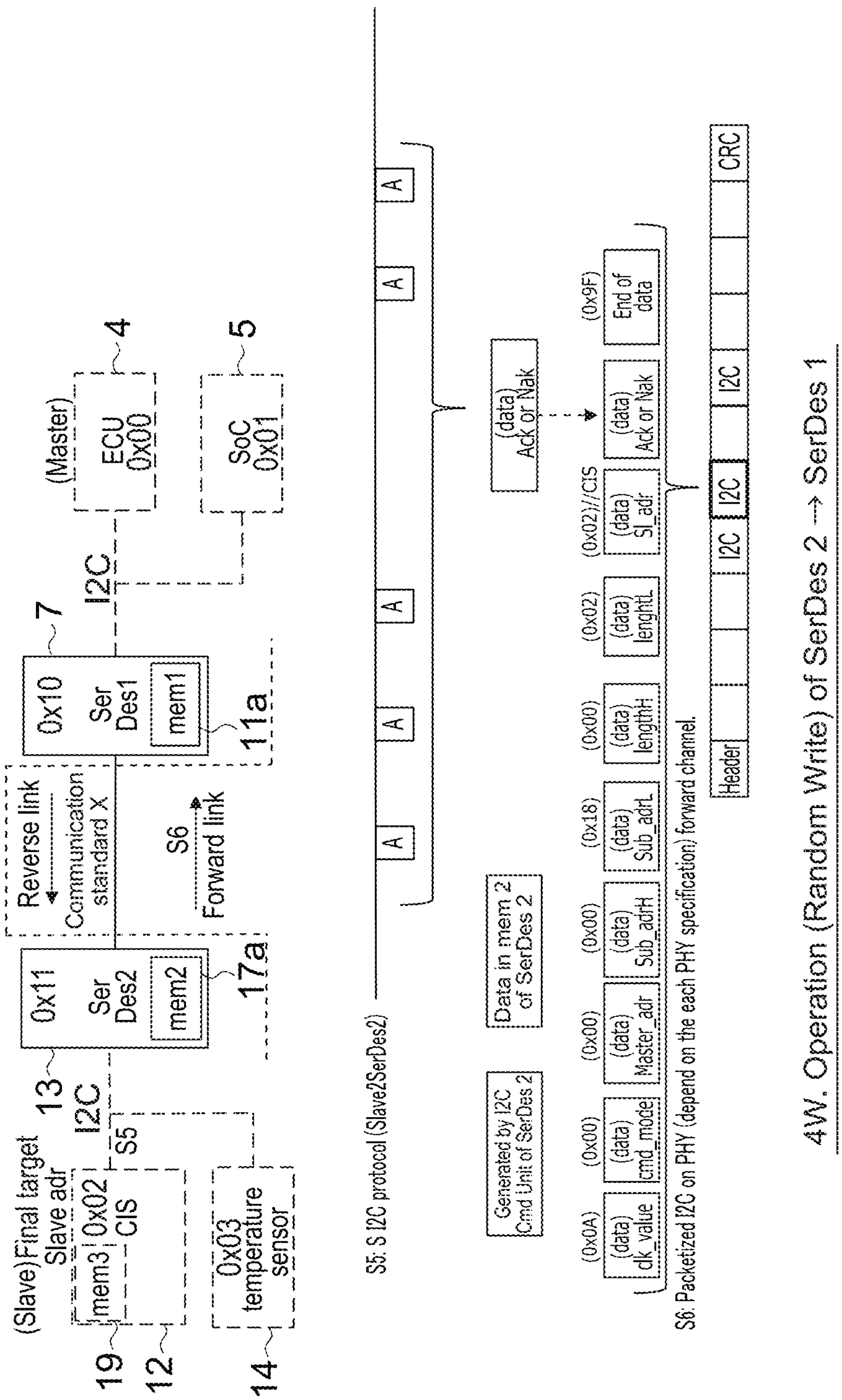
FIG. 32 is a diagram showing processing of replying from the Slave SerDes to the Master SerDes in response to a Random Write Command over the communication protocol X in the Bulk I2C mode.

FIG. 31 and FIG. 32 are diagrams that follow FIG. 29, and are each a diagram showing processing of transmitting data from the Slave SerDes 13 to the Slave 22 through I2C communication. The mem 2 (Save I2C command Packet) (Step S4) shown in FIG. 31 and FIG. 32 is the one described with reference to FIG. 29. FIG. 31 shows processing in which the Slave SerDes 13 and the Slave 22 transmit and receive data to/from each other through I2C communication in the Bulk I2C mode.

When the Slave SerDes 13 writes End of data to the table 3 in the mem 2 shown in FIG. 30, the Slave SerDes 13 reads the table 3, performs format conversion thereon into a signal of the I2C protocol, and transmits the obtained signal to the Slave 22 via the I2C 13*a* over the M I2C protocol (Step S5).

(data) Cmd_mode (0x00) indicates that S (START condition) is issued and a W (Write) command or R (Read) command is generated in accordance with the value of Cmd_mode [0] after the next Sl_adr is issued.

(data) Sl_adr (0x02) indicates that "0x02" is specified as the Sl_adr described above. Since "0x02" is specified, the image sensor 12 is selected. (data) Sub_adrH (0x00) indicates that "0x00" is specified as the higher bits of the address of the mem 3 (the target to be accessed finally) in the image sensor 12. (data) Sub_adrL (0x00) indicates that "0x00" is specified as the lower bits of the address of the mem 3 (the target to be accessed finally) in the image sensor 12. (data) WDATA×2 indicates 16 bytes of data.

The Slave 22 sequentially returns an ACK signal, which indicates that the signal has been normally received, to the Slave SerDes 13 over the S I2C protocol (Step S5).

Note that while data is transmitted and received from the Slave SerDes 13 to the Slave 22 through I2C communication, the same information as that shown in FIG. 30 is stored in the table 3 in the mem 2.

The Slave SerDes 13 writes ACK to Sub_Adr=N in the table 3 in the case where Cmd_mode [6]=0 and all signals returned from the Slave 22 are ACK signals, and writes NACK to Sub_Adr=N in the table 3 in the case where there is/are one or more NACK signal(s).

The Slave SerDes 13 writes ACK to Sub_Adr=N in the table 3 in the case where Cmd_mode [6]=1 and all signals returned from the Slave 22 are ACK signals, and performs rewriting in the case where there is/are one or more NACK signal(s). In the case where the second signal is also a NACK signal, NACK is written to Sub_Adr=N in the table 3. FIG. 33 shows the storage area state of the mem 2 before releasing the storage area in response to a Random Write Command in the Bulk I2C mode, in which the I2C communication between the Slave SerDes 13 and the Slave 22 is completed and ACK or NACK is written to Sub_Adr=N.

As a method of generating ACK or NACK to be written to Sub_Adr=N of the table 3 in the mem 2, for example, the logical product of the ACK signal and the NACK signal returned from the Slave 22 may be taken.

FIG. 32 follows FIG. 31, and is a diagram showing processing of replying from the Slave SerDes 13 to the Master SerDes 7 in the Bulk I2C mode over the communication protocol X in response to the Random Write Command. The S I2C protocol (Step S5) in FIG. 32 is the one described in FIG. 31.

The Slave SerDes 13 performs protocol-conversion on the I2C communication result with the Slave 22 into a signal of the communication standard X protocol, and transmits the obtained signal to the Master SerDes 7 by the Packetized I2C on PHY (depend on the each PHY specification) forward channel (Step S6). When the Slave SerDes 13 writes ACK or NACK to Sub_Adr=N of the table 3 in the mem 2, the Slave SerDes 13 reads the table 3 (from 0 to N in Sub_Adr) and transmits necessary information (in this embodiment, Data [7:0] in the case where Sub_Adr is 2 and N, including Cmd_ID in the case where Cmd_mode is extended to 2 bytes) to the Master SerDes 7. When the transmission is completed, the Slave SerDes 13 releases the storage area of the mem 2 shown in FIG. 33.

Here, since the mem 1 and the mem 2 occupy the same memory area (Sub_Adr=0 to N−1), the Slave SerDes 13 knows Sub_Adr (which is free in the mem 2 and ACK/NACK has been written to) of the mem 1 to be written next. Further, the Slave SerDes 13 understands that in the case where the Slave SerDes 13 has performing writing on the Slave 22, there is a need to return two bytes (Slave adr that I2C communication has been performed and the result of I2C communication) to the Master SerDes 7.

Figure 34:
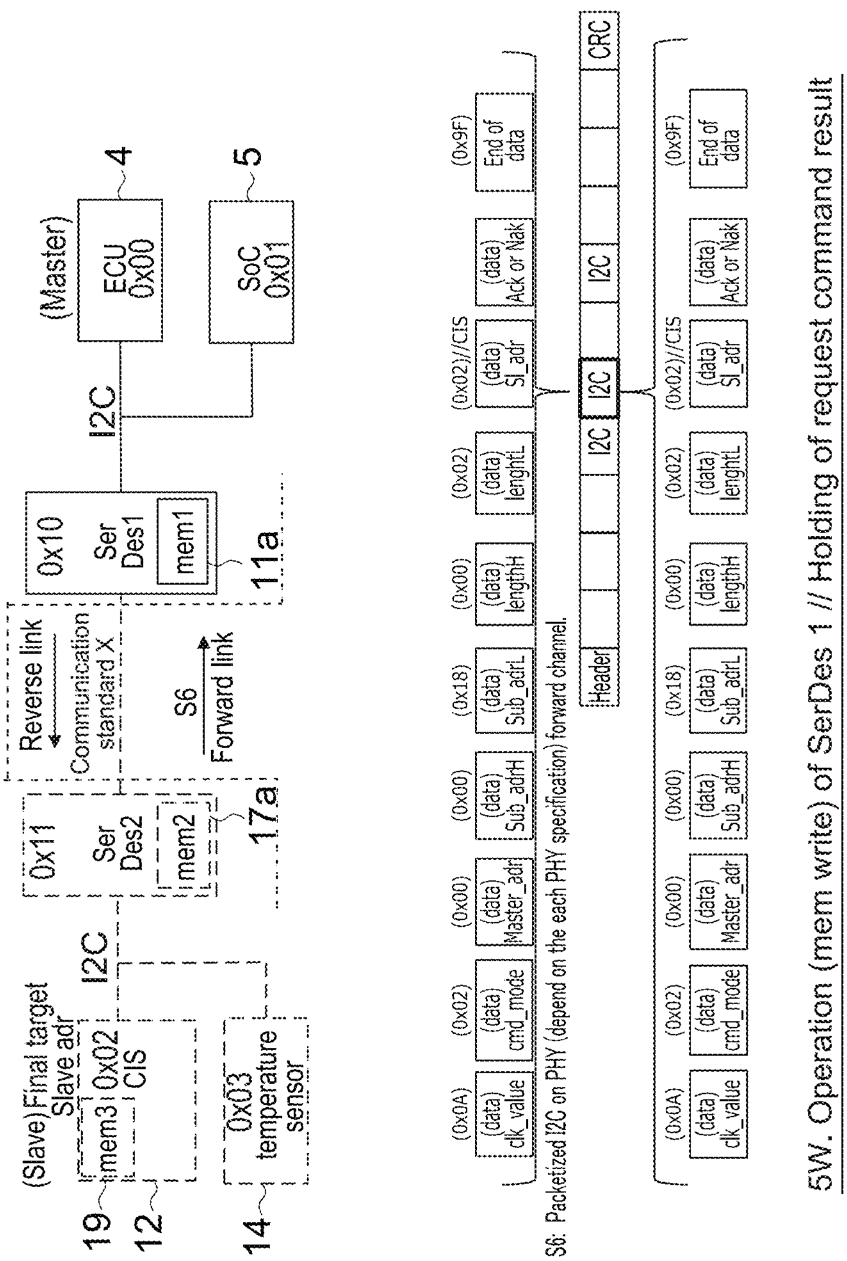
FIG. 34 is a diagram showing an operation of the Master SerDes in the Bulk I2C mode.

FIG. 34 follows FIG. 32, and is a diagram showing the operation of the Master SerDes 7 in the Bulk I2C mode. The Packetized I2C on PHY (depend on the each PHY specification) forward channel (Step S6) shown in FIG. 34 is the one described in FIG. 32. The Master SerDes 7 extracts the I2C command packet from the signal of the communication standard X protocol received from the Slave SerDes 13, and writes it from N to N+9 of the Sub_Adr of the table 1 in the mem 1.

FIG. 35 is a diagram showing the table 1 in the mem 1 after receiving the reply data from the Slave SerDes in response to the Random Write Command in the Bulk I2C mode. The sub_Adr N to N+6 and N+9 of the table 1 store the I2C command packets generated by the I2C Cmd Unit in the Slave SerDes 13 shown in FIG. 32. Further, the sub_Adr N+7 and N+8 of the table 1 shown in FIG. 35 store Slave adr of sub_Adr (2) in the mem 2 and the content that is obtained by reading ACK or NACK of sub_Adr (N) and transferred.

Figure 36:
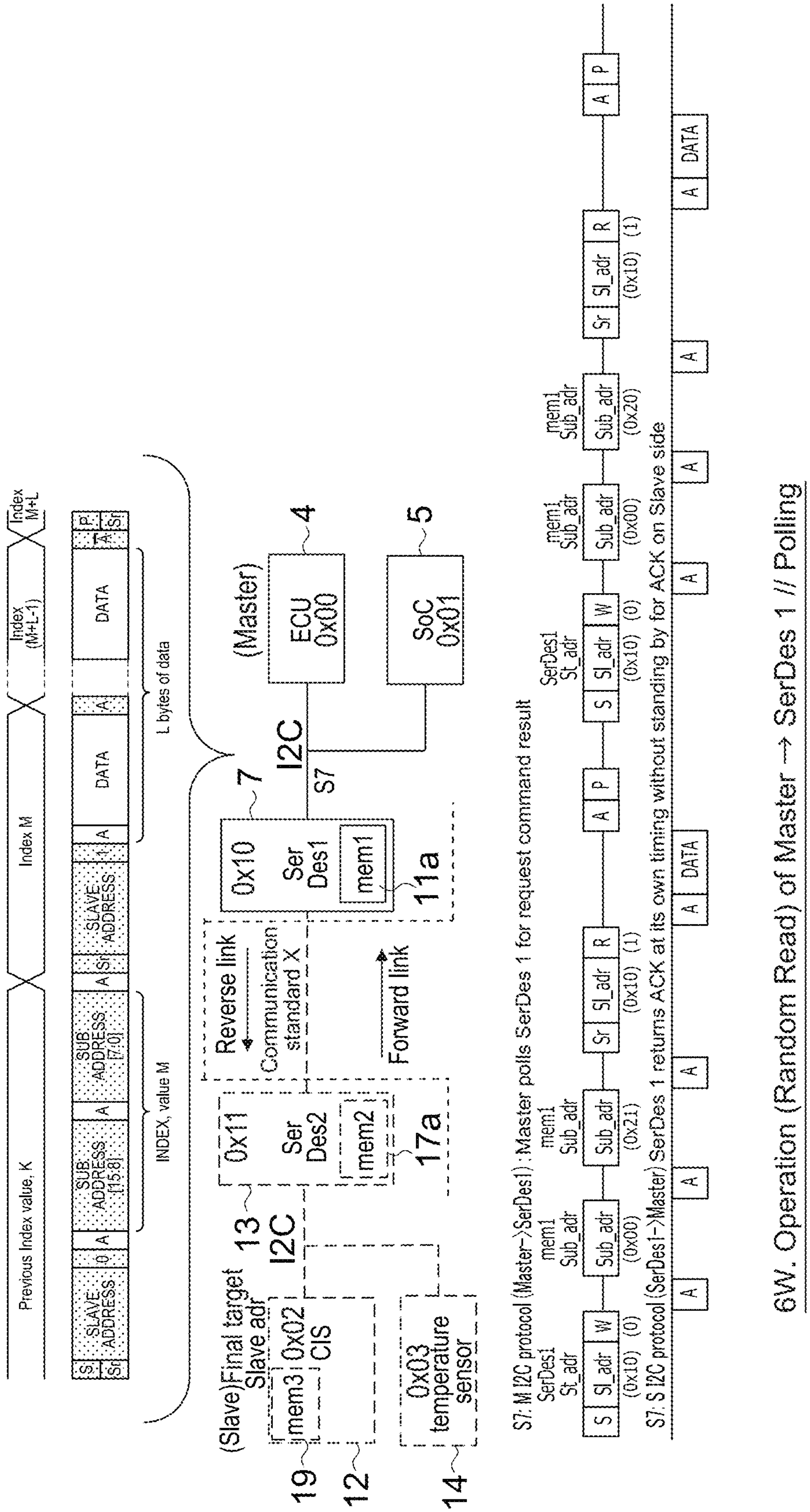
FIG. 36 is a diagram showing processing in the case where the Master polls the Master SerDes for the Random Write Command in the Bulk I2C mode and reads the result.

FIG. 36 is a diagram showing processing in the case where the Master 21 polls the Master SerDes 7 for the Random Write Command in the Bulk I2C mode and reads the execution result. The Master 21 polls the Master SerDes 7 for the request command result over the M I2C protocol (Step S7). The Master 21 polls Sub_Adr=N+9 of the table 1 and reads Sub_Adr=N+8 in the case of 0x9F to determine whether it is ACK or NACK.

For example, if "16-byte write to the Slave 22" requested by the Master SerDes 7 is completed, End of Data (0x9F) and the resulting ACK (0x81) can be read. Note that in this example, the determination of polling by referring to the result of End of Data is performed by one-byte reading, and ACK or NACK is read by one-byte reading again. However, the polling result and the I2C communication result to the Slave 22 may be determined by two-bytes reading at a time. If NACK is returned, the Master 21 is capable of checking, by reading Slave adr of Sub_adr (N+7), whether the corresponding Slave 22 has transmitted the NACK.

FIG. 35 is a diagram showing an example of stored data in the mem 1. The Master 21 knows the access point of the mem 1 of the Master SerDes 7 because the Master 21 has issued a write command to the Master SerDes 7 by itself. Similarly, the Master SerDes 7 knows the access point of the mem 1 because the Master SerDes 7 stores data in the mem 1 by itself. For example, in the case where writing is performed on the Slave 22 and the reply is 2B, Header has 7 bytes+2B bytes+EoD (1 byte)=10 bytes and the following Sub_Adr has N+10=34.

Figure 37:
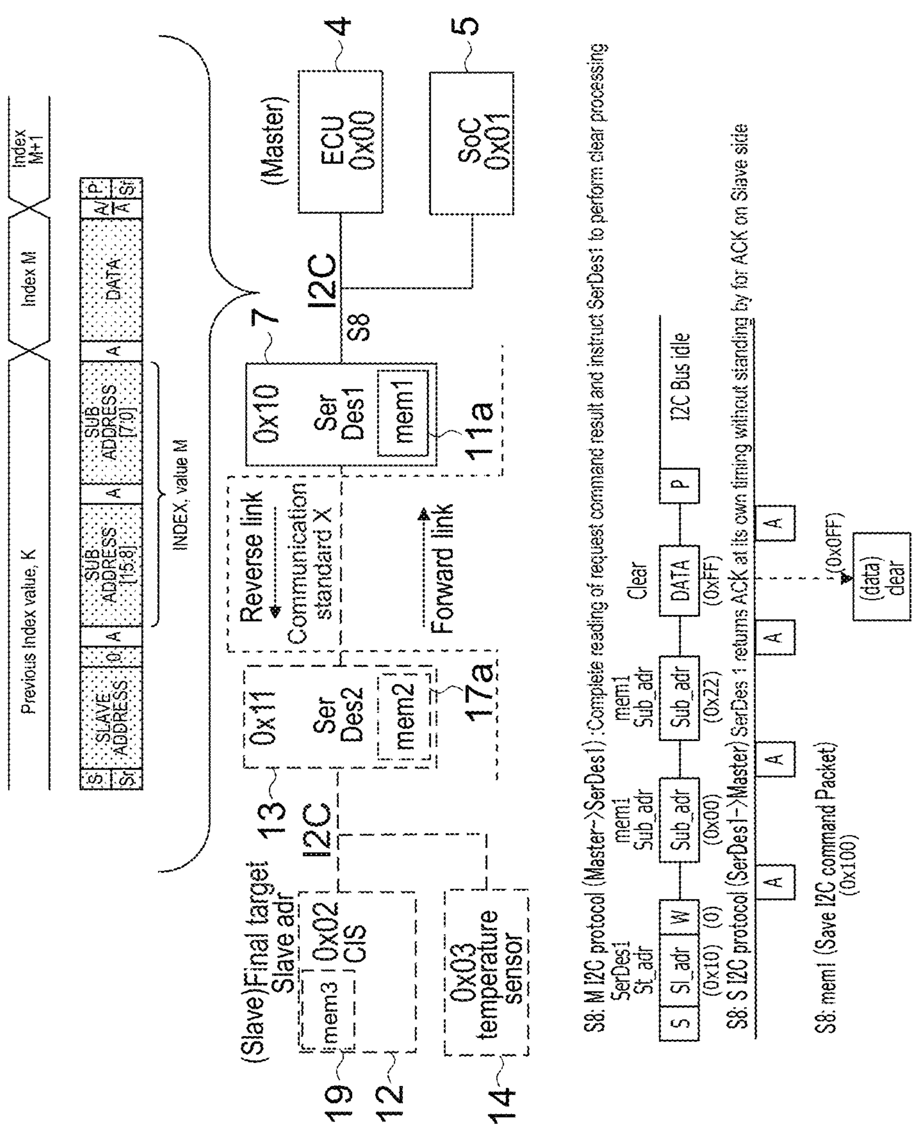
FIG. 37 is a diagram showing transmission of a signal for the Master to release, in the Bulk I2C mode, the storage area of the mem 1 for the Master SerDes as Random Write operation finishing processing.

FIG. 37 is a diagram showing transmission of a signal for releasing the storage area of the mem 1 as Random Write operation finishing processing to the Master SerDes 7 by the Master 21 in the Bulk I2C mode. FIG. 38 is a diagram showing the stored data in the mem 1 before releasing the storage area in response to the Random Write Command. The Master 21 performs M I2C protocol processing, S I2C protocol processing, and mem 1 (Save I2C command packet) processing, reads Sub_Adr=N+8 of the table 1, and writes, in the case where it is ACK, writes Clear to Sub_Adr=N+10 of the table 1 in the mem 1 as shown in FIG. 38 (Step S8). When this Clear is written, the Master SerDes 7 releases the memory area of the table 1 in the mem 1.

When 0xFF is written to Sub_adr (N+10) in the mem 1, the Master SerDes 7 releases the storage area of the mem 1 that has been used, as the finishing processing of the request command. Alternatively, in accordance with the write command for initializing the memory area used by the Master 21, the storage area of the mem 1 may be released.

Figure 39:
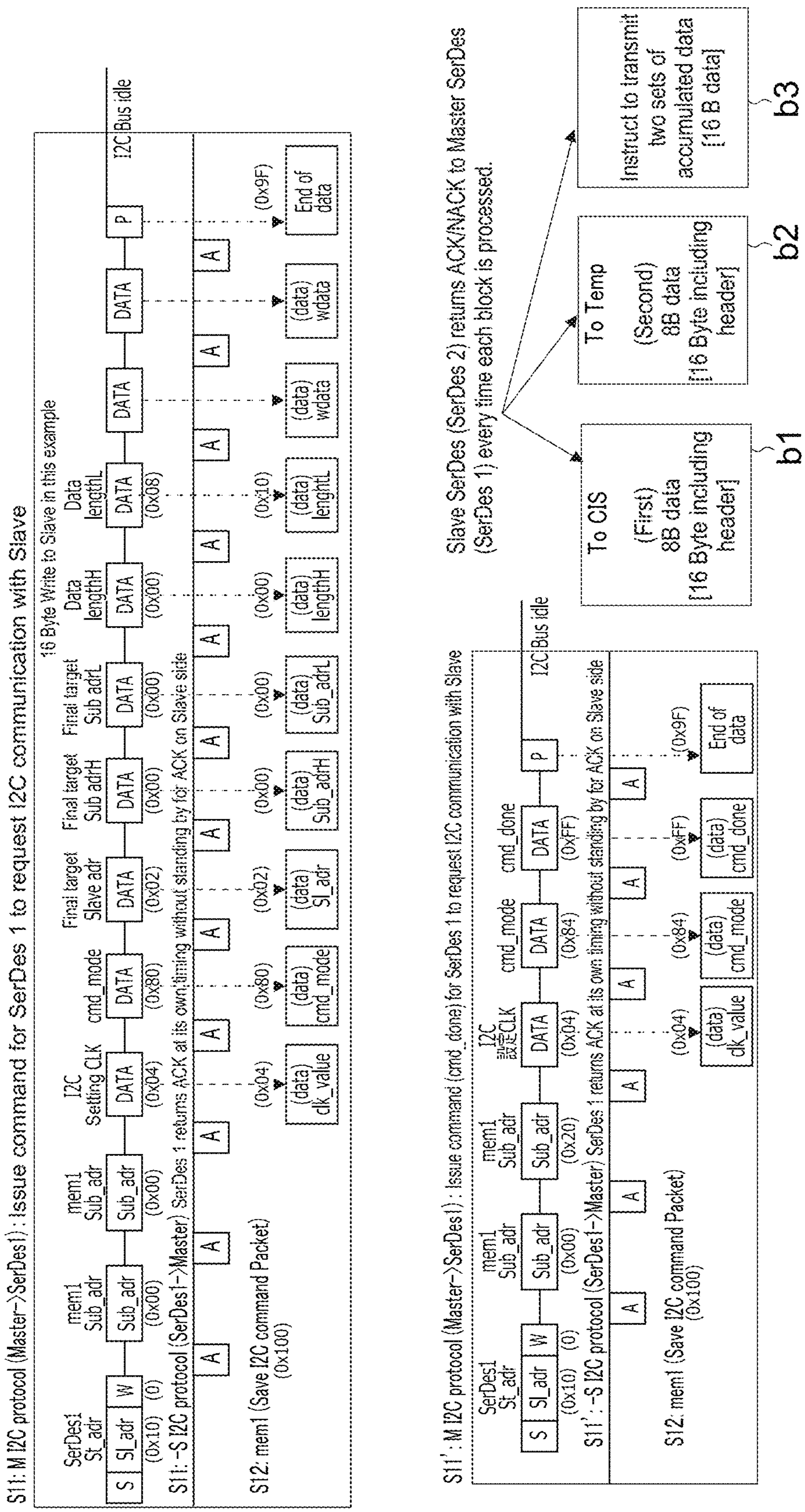
FIG. 39 is a diagram showing batch command transmission by a Cmd_mode[7]=1 in the Bulk I2C mode.
Figure 40:
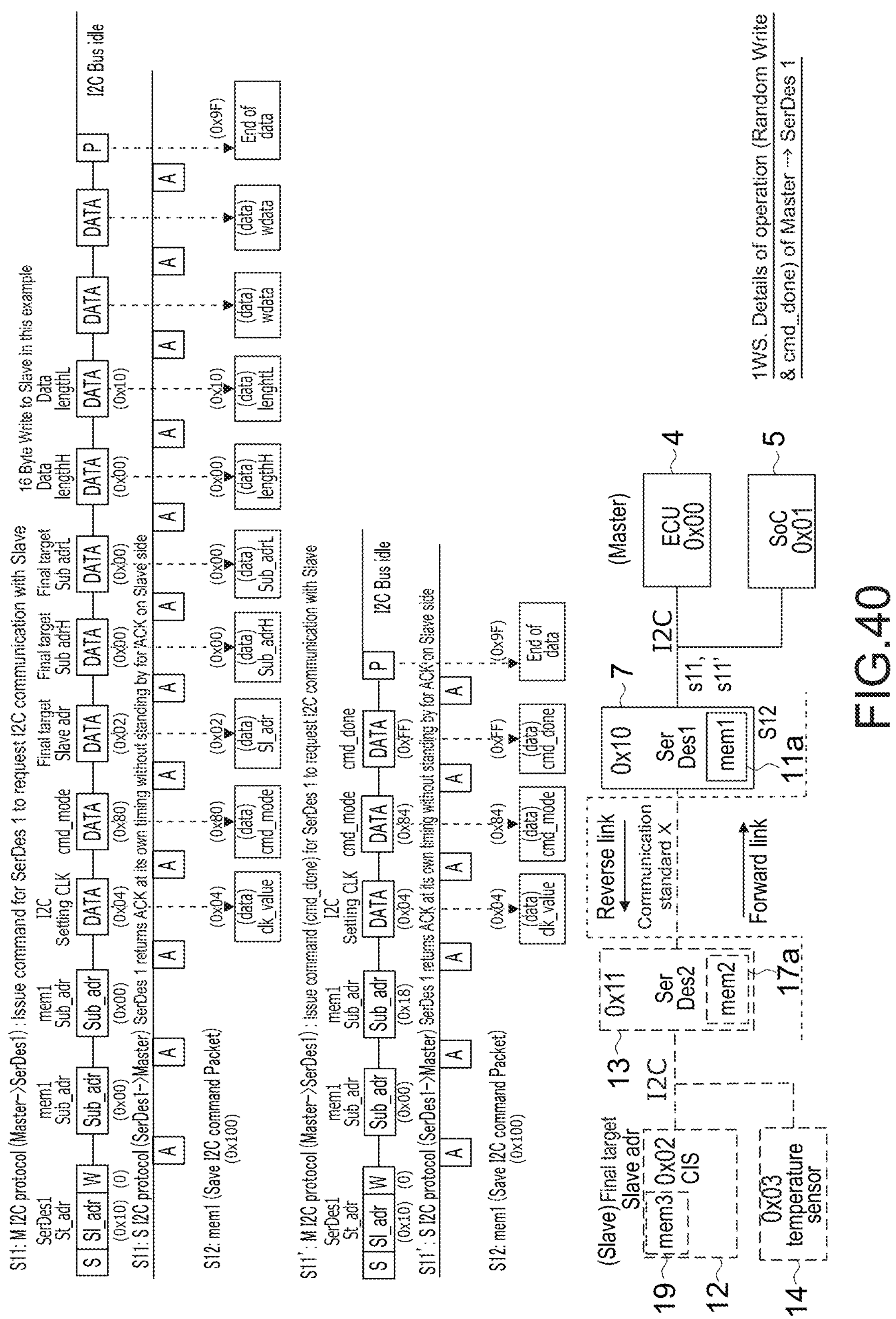
FIG. 40 is a diagram following FIG. 39.
Figure 41:
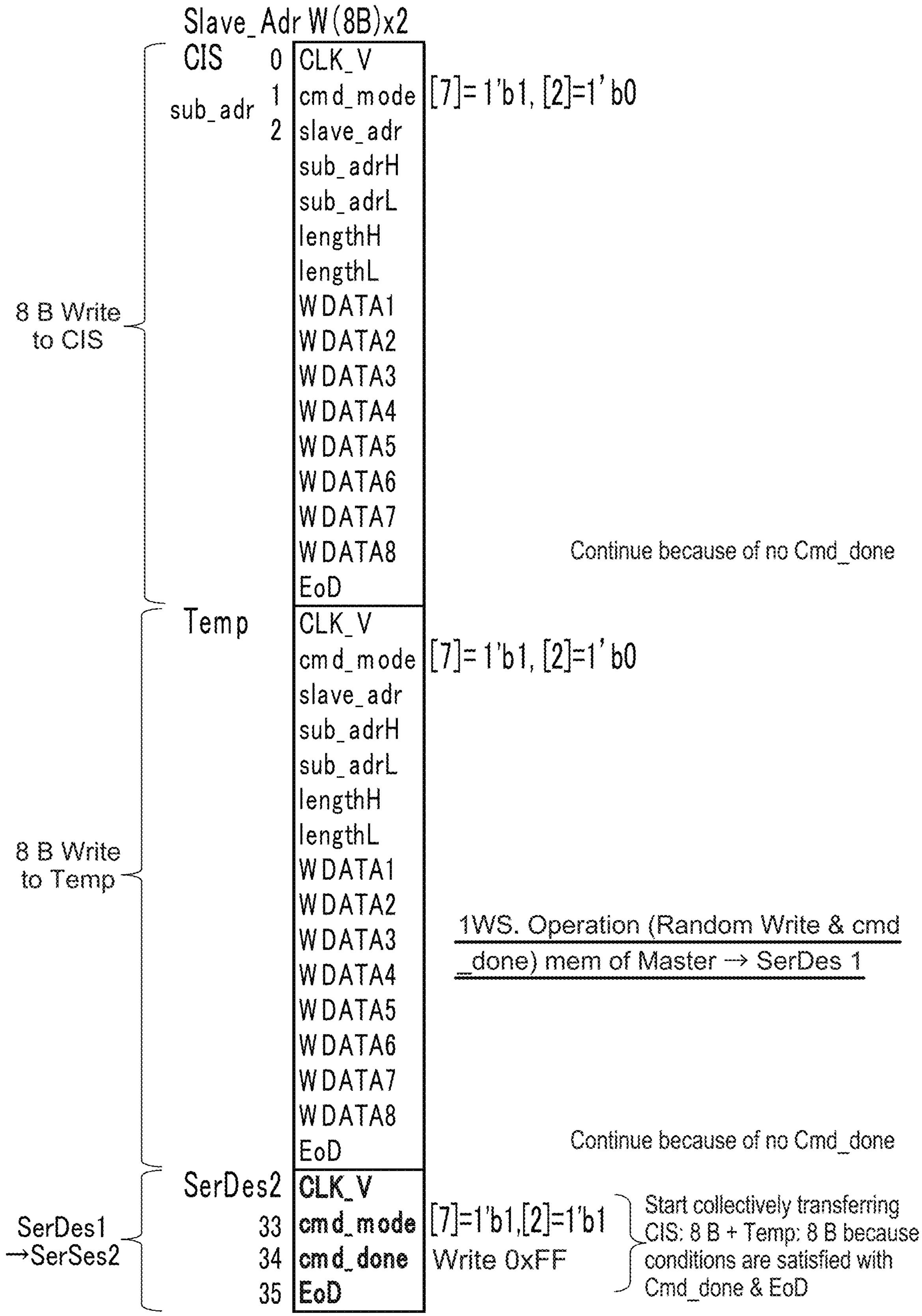
FIG. 41 is a diagram showing detailed stored data of the table 1 in the mem 1 at the time of batch command transmission by the Cmd_mode[7]=1 in the Bulk I2C mode.

FIG. 39 to FIG. 41 are each a diagram showing the I2C command batch transmission operation. FIG. 39 and FIG. 40 are each a diagram showing the batch command transmission by Cmd_mode [7]=1 in the Bulk I2C mode. FIG. 41 is a diagram showing detailed stored data of the table 1 in the mem 1 during batch command transmission by the Cmd_mode [7]=1 in the Bulk I2C mode. The I2C command batch transmission operation is a write operation in the case where Cmd_mode [2:0]=000 and Cmd_mode [7]=1. Specifically, a case where the Master 21 collectively writes 8 bytes of data for the image sensor 12 (Sl_adr=0x02) and the temperature sensor 14 (Sl_adr=0x03) is shown.

In FIG. 39, a Block b1 represents the Write operation of 8 bytes of data for the image sensor 12 (Sl_adr=0x02) and a Block b2 represents the Write operation of 8 bytes of data for the temperature sensor 14 (Sl_adr=0x03). A Block b3 represents end of the batch operation by cmd_done and P (STOP condition).

More specifically, as shown in FIG. 39 and FIG. 40, as the operation of b1, the Master 21 issues a command for the Master SerDes 7 to request the I2C communication with the Slave 22 over the M I2C protocol first (Step S11). When the Master SerDes 7 receives data from the Master 21, the Master SerDes 7 returns ACK at its own timing over the S I2C protocol (Step S11).

Since this request command indicates the I2C command batch operation of Cmd_mode [2:0]=000 and Cmd_mode

[7]=1, the transfer to the Slave SerDes 13 is not started even if End of Data is stored in the mem 1. The subsequent operation of b2 is the same except that the Slave_adr of b1 differs from the temperature sensor 14 (Sl_adr=0x03). The final b3 indicates that Cmd_code [2]=1 is a special code, and the subsequent Data indicates a special code. In this example, by continuously receiving the special cmd_done (0xFF) and STOP condition indicating the end of the command (Step S12), the Master SerDes 7 collectively transmits the received data (FIG. 41) stored in the mem 1 to the Slave SerDes 13 as the I2C command batch transmission.

Note that in this embodiment, in the case where Cmd_mode [7]=1 is set by the Master 21, Cmd_mode [7]=0 must not be set until 0xFF is written to cmd_done thereafter.

FIG. 42 to FIG. 52 each show a Random Read operation (Read operation when Cmd_mode [3:0]=0001 and [7]=0). The Random Read operation differs greatly from the Random Write operation as follows.

Figure 44:
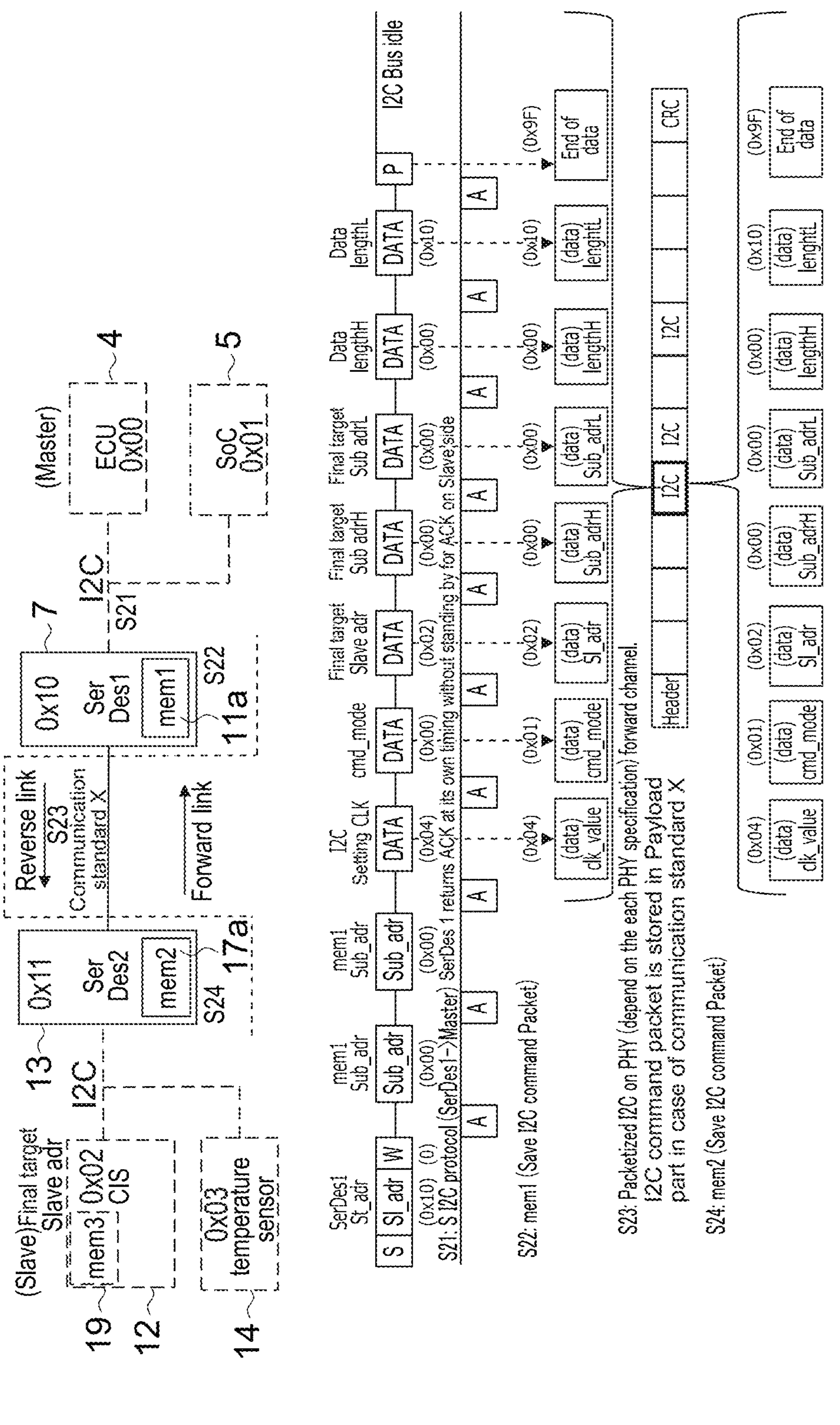
FIG. 44 is a diagram showing processing of transmitting, in the Bulk I2C mode, the Random Read command from the Master SerDes to the Slave SerDes over the communication protocol X.

As shown in FIG. 42 to FIG. 45, in the Read operation, the Master 21 writes a Read request to the Master SerDes 7 first (FIG. 42 and FIG. 43), and the Master SerDes 7 writes this Read request to the Slave SerDes 13 (FIG. 44 and FIG. 45).

Figure 46A:
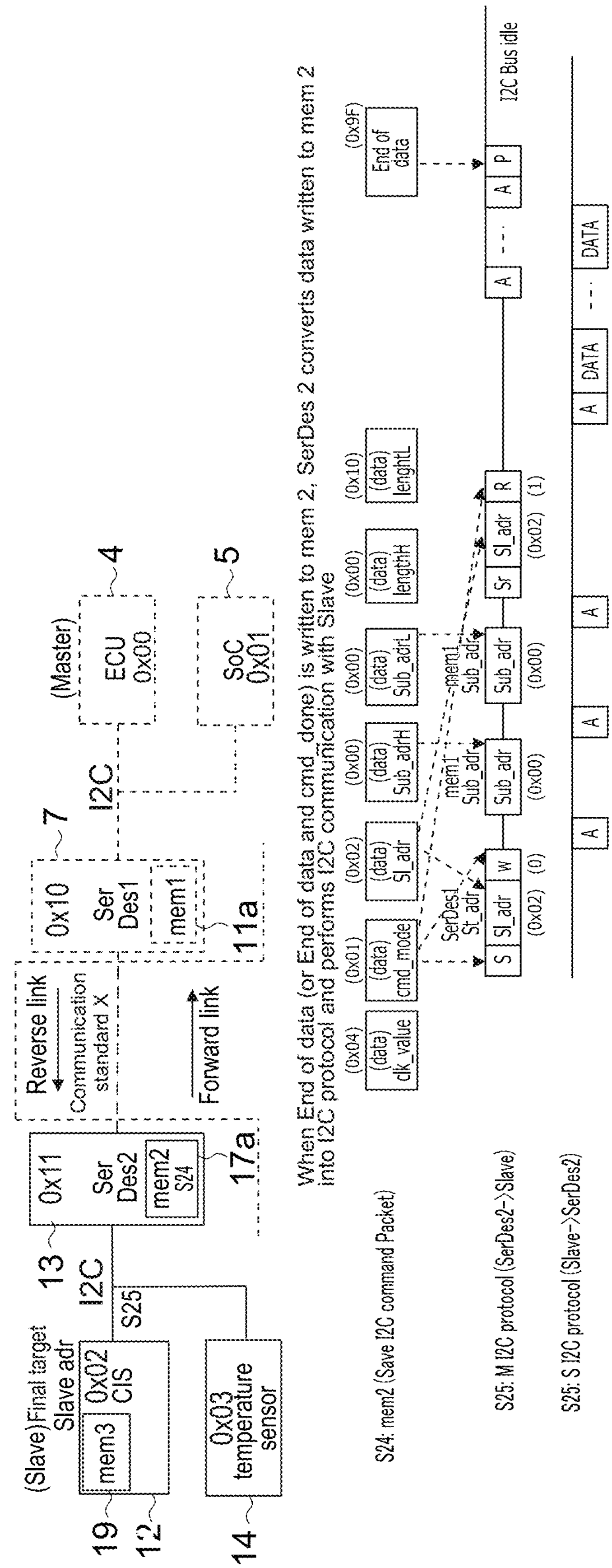
FIG. 46A is a diagram showing processing of transmitting and receiving the random read command from the Slave SerDes to the Slave in the Bulk I2C mode.

After that, as shown in the processing of the M I2C protocol in Step S25 of FIG. 46A and FIG. 47, the processing target being the mem 3 of the image sensor 12 is written to “S”, “SL_adr”, “W”, and “Sub_adr”, and then, reading is performed from the processing target by “Sr”, “SL_adr”, and “R”.

Figure 42:
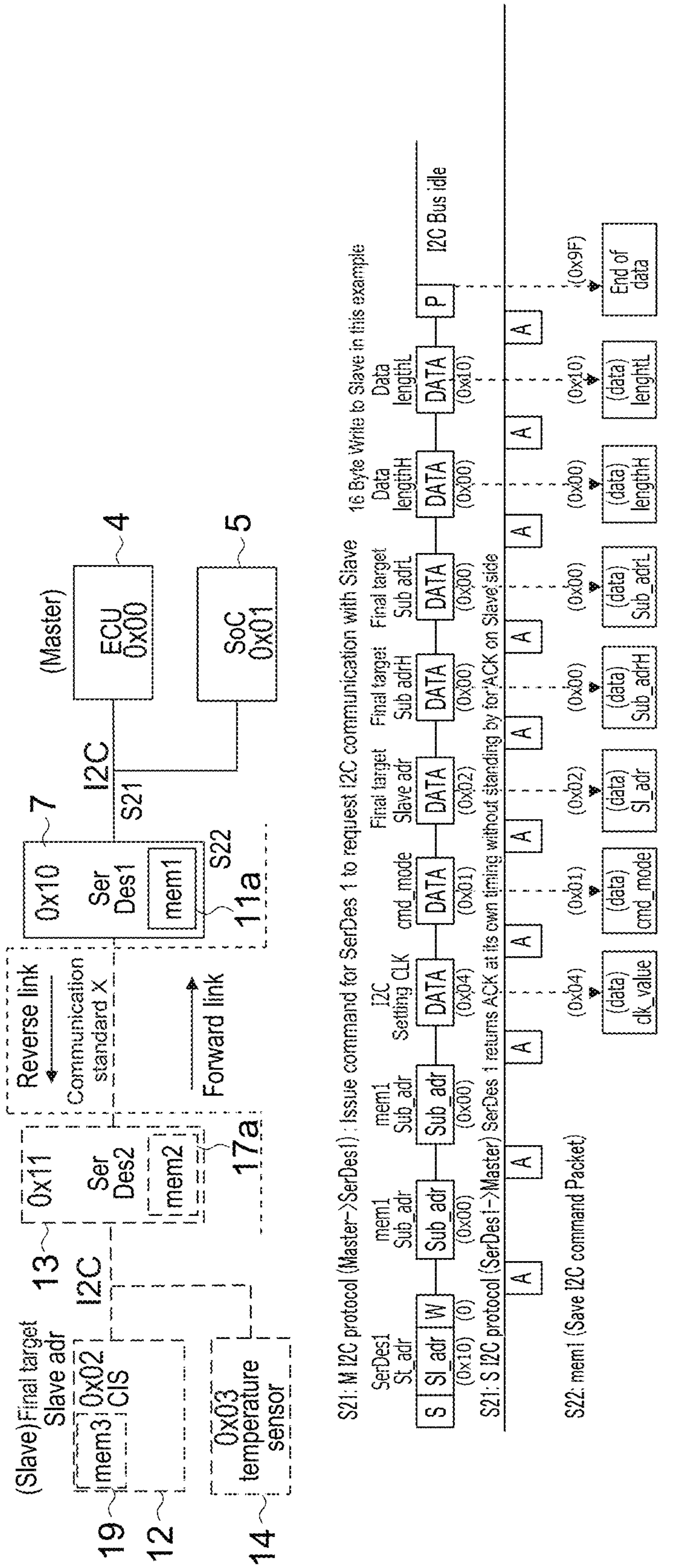
FIG. 42 is a diagram showing a Random Read operation in the Bulk I2C mode.

The processing procedure of the Random Read will be described below in order on the basis of FIG. 42 to FIG. 52. FIG. 42 shows the procedure of transmitting the I2C command packet from the Master 21 to the Master SerDes 7 in the Bulk I2C mode. First, as shown in Step S21 of FIG. 42, processing of the M I2C protocol is performed. Here, the Master 21 issues a command for the Master SerDes 7 to request the I2C communication with the Slave 22. The command set transmitted from the Master 21 includes SerDes 1 St_adr, mem 1 Sub_adr, mem 1 Sub_adr, I2C setting CLK, Cmd_mode, final target Slave adr, final target Sub_adrH, final target Sub_adr, Data lengthH, Data lengthL, and P (STOP condition).

Every time the Master SerDes 7 receives an information unit from the Master 21, the Master SerDes 7 returns an ACK signal to the Master 21 over the S I2C protocol (Step S21). Further, the Master SerDes 7 stores the received I2C command packet in the mem 1 (Step S22). FIG. 43 is a diagram showing the stored data of the table 1 in the mem 1 at the time of the Random Read operation in the Bulk I2C mode. In the mem 1, (data) CLK_value, (data) Cmd_mode, (data) Sl_adr, (data) Sub_adrH, (data) Sub_adrL, (data) length, (data) lengthL, and End of data are stored as shown in FIG. 43.

FIG. 44 is a diagram showing processing of transmitting a Random Read command from the Master SerDes 7 to the Slave SerDes 13 in the Bulk I2C mode over the communication protocol X, which is performed following the processing shown in FIG. 42. The Master SerDes 7 performs protocol-conversion on the data in the mem 1 by the Packetized I2C on PHY (depend on the each PHY specification) forward channel and transmits it to the Slave SerDes 13 (Step S23). More specifically, when Cmd_mode=0x00 and End of data is stored in the mem 1, the data in the mem 1 is collectively I2C-command-converted, and transmitted to the Slave SerDes 13 by the reserve link. Meanwhile, when Cmd_mode=0x10, End of data is stored in the mem 1, and cmd_done is written, the data in the mem 1 is collectively I2C-command-converted and transmitted to the Slave SerDes 13 by the reserve link. The Slave SerDes 13 performs protocol-conversion on the received data of the reserve link and stores the original stored data of the mem 1 in the mem 2 (Step S24). The Slave SerDes 13 determines that the restoration of the I2C command packet is completed when End of data is restored. FIG. 45 is a diagram showing an example of the stored data in the mem 2 when the Random Read operation is performed in the Bulk I2C mode.

FIG. 46A is a diagram showing processing of transmitting the random read command from the Slave SerDes 13 to the Slave 22 in the Bulk I2C mode, which is performed following the processing shown in FIG. 44. The Slave SerDes 13 transmits the I2C command packet to the Slave 22 in the M I2C protocol (Step S25). For each of the received information units, the Slave 22 returns the ACK signal to the Slave SerDes 13 over the S I2C protocol and sequentially transmits RDATA to the Slave SerDes 13 starting from the address specified by Sub_adrH and Sub_adrL. FIG. 47 is a diagram showing the stored data of the table 3 in the mem 2 after the Random Read operation in the Bulk I2C mode. As shown in FIG. 47, the Slave SerDes 13 transmits an ACK signal indicating that RDATA has been received to the Slave 22 byte by byte and stores RDATA from the Slave 22 in the mem 2.

Figure 46B:
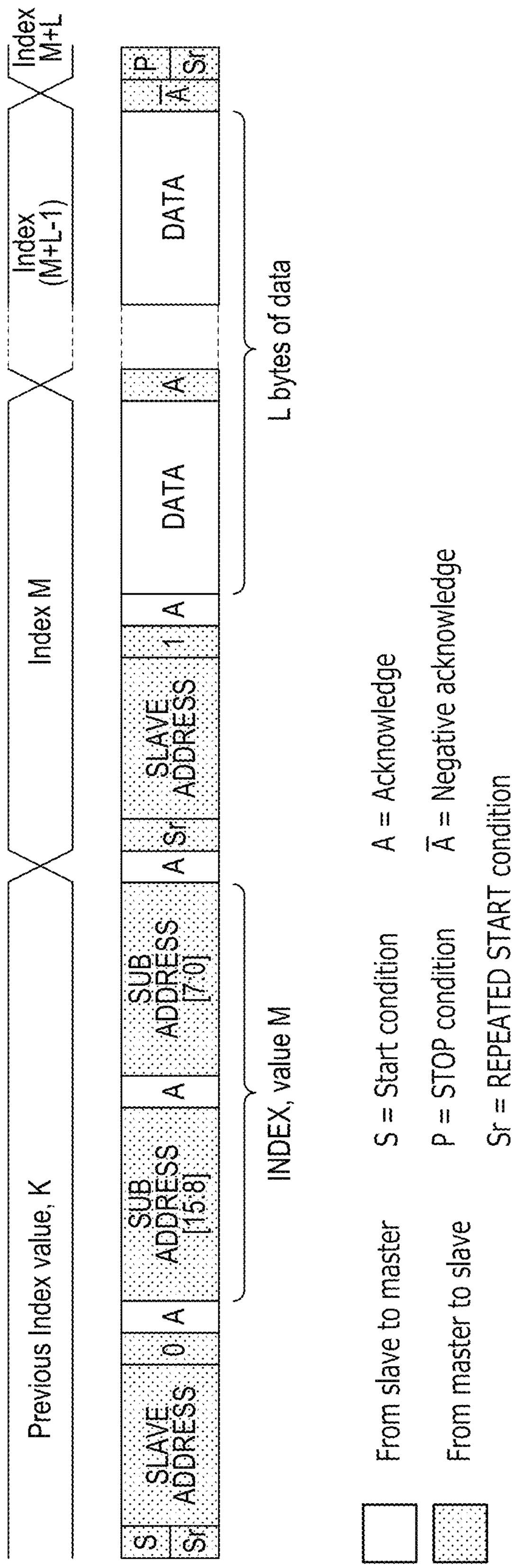
FIG. 46B is a diagram showing an I2C communication protocol at the time of the Random Read operation.

It can be seen that the Slave SerDes 13 and the Slave 22 in FIG. 46A perform communication by a protocol conforming to the I2C communication protocol during the Random Read operation shown in FIG. 46B.

Figure 48:
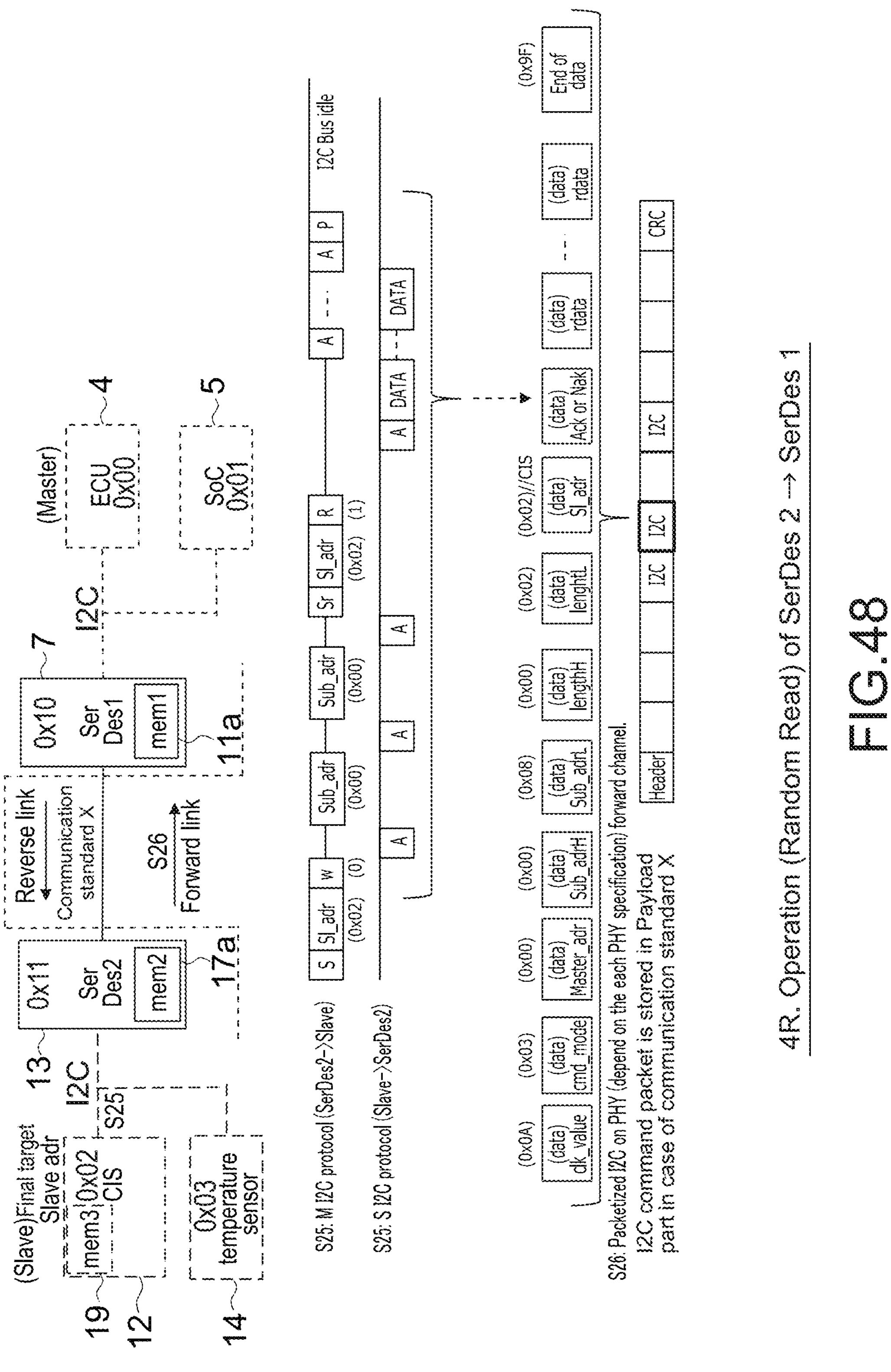
FIG. 48 is a diagram showing processing of replying in response to the Read command from the Slave SerDes to the Master SerDes over the communication standard X over the Bulk I2C mode.

FIG. 48 is a diagram showing processing of replying in response to the Read command from the Slave SerDes 13 to the Master SerDes 7 over the communication standard X in the Bulk I2C mode, which is performed following the processing shown in FIG. 46. The Slave SerDes 13 transmits RDATA over the packetized I2C on PHY (depend on the each PHY specification) forward channel (Step S26). More specifically, the Slave SerDes 13 converts the I2C communication result (RDATA, ACK)+End of data with the Slave 22 and transmits it to the Master SerDes 7 in the forward link. FIG. 47 shows the stored data of the table 3 in the mem 2 after the Random Read operation.

Figure 49:
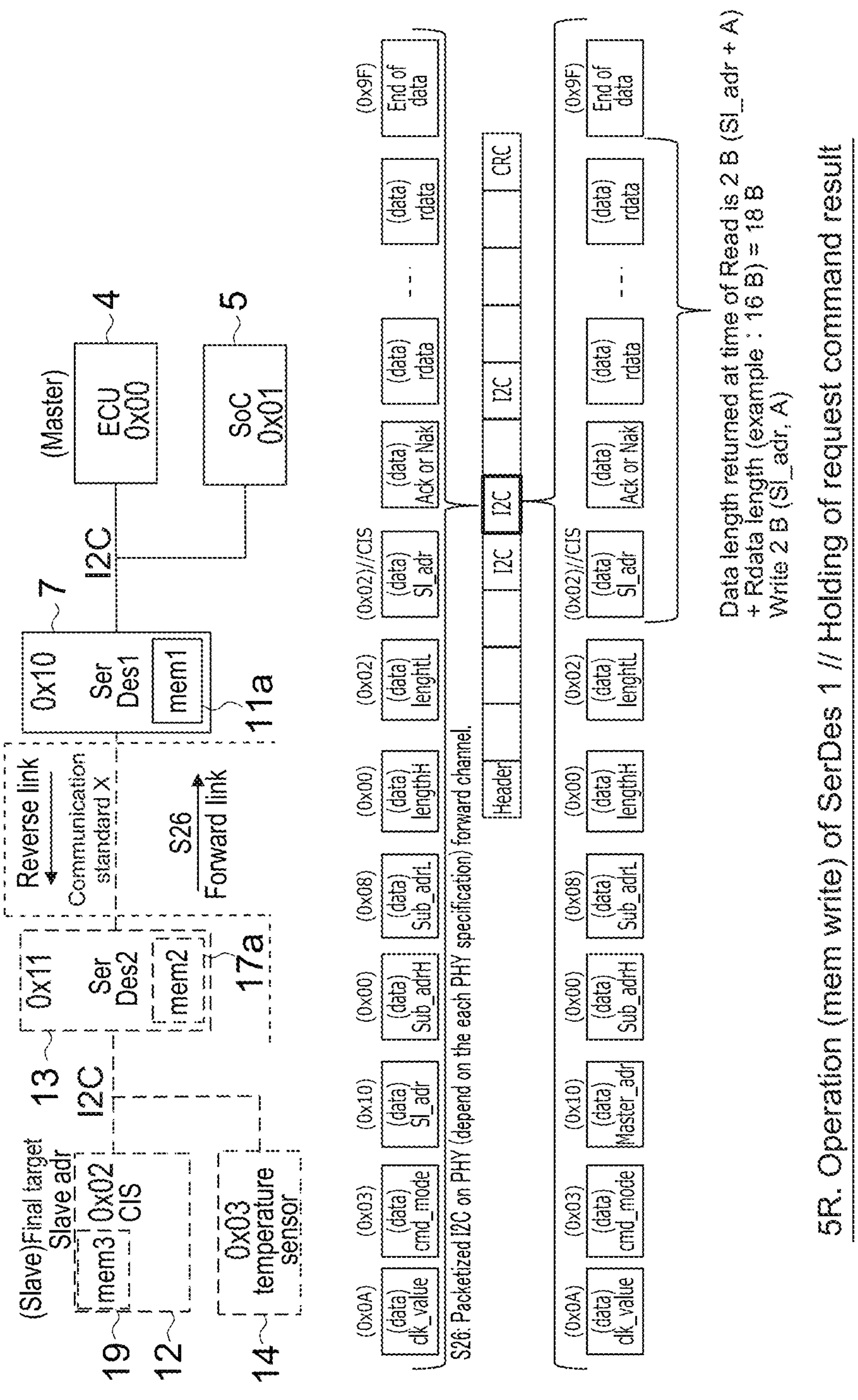
FIG. 49 is a diagram showing processing of the Master SerDes when receiving reply from the Slave SerDes in response to the Random Read Command in the Bulk I2C mode.

FIG. 49 is a diagram showing the processing of the Master SerDes 7 when a reply in response to the Random Read Command from the Slave SerDes 13 is received in the Bulk I2C mode, which is performed following the processing shown in FIG. 48. The Master SerDes 7 performs protocol-conversion on the received data of the forward link and stores the received data including the I2C communication result (ACK/NACK) with the Slave 22 in the mem 1. FIG. 50 is a diagram showing an example of the data in the mem 1 after receiving the reply data from the Slave SerDes 13 in response to the Random Read Command in the Bulk I2C mode.

Figure 51:
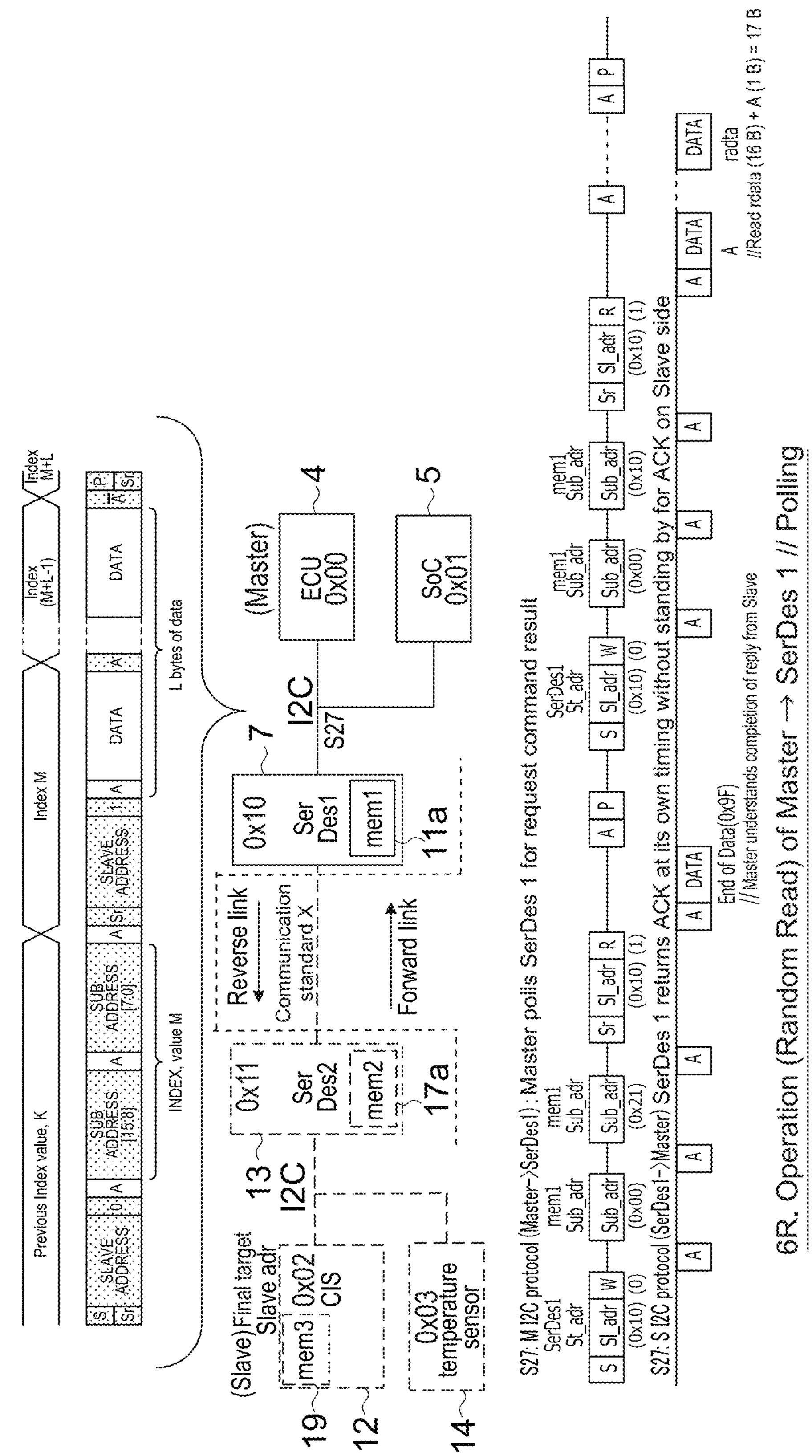
FIG. 51 is a diagram showing processing in the case where the Master polls the Master SerDes for the Random Read Command in the Bulk I2C mode and reads the result.

FIG. 51 is a diagram showing the processing in the case where the Master 21 polls the Master SerDes 7 for the Random Read Command in the Bulk I2C mode and reads the execution result. The Master 21 polls the Master SerDes 7 for the request command result in the M I2C protocol (Step S27). The Master 21 performs polling at its own timing without standing by for ACK on the Slave 22 side, and the Master SerDes 7 returns ACK or RDATA that is the polling result to the Master 21 (Step S27).

If the result of “16-byte read to the Slave 22” requested for the Master SerDes 7 by the Master 21 is finished, End of data (0x9F) and the resulting ACK (0x81) can be read. If the result of reading End of data is other than 0x9F, polling continues. In this example, the polling determination is performed by referring to the result of End of data by one-byte reading, and RDATA (16 bytes)+ACK/NACK are read by 17-byte reading again. However, by performing 18-byte reading at a time, the polling result and the I2C communication result to the Slave 22 may be determined. If the result is NACK, the Master 21 is capable of checking whether or not the NACK is from the corresponding Slave 22, by reading Slave adr of Sub_Adr (15).

FIG. 52 is a diagram showing an example of the stored data of the table 1 in the mem 1 before releasing the storage area in response to the Random Read Command in the Bulk I2C mode.

In FIG. 46A, the processing in which the Slave SerDes 13 performs random read on the Slave 22 has been described. However, as shown in FIG. 53A, random read must always be performed when the mem 3 in the Slave 22 is accessed for the first time, but current read may be performed for the second and subsequent times.

The Slave SerDes 13 performs, when End of data or cmd_done is written to the mem 2, I2C-protocol-conversion on the data written to the mem 2 and performs I2C communication with the Slave 22. In the case where current read is performed (Cmd_mode [3:0]=1001), Sub_adrH and Sub_adrL in the mem 2 shown in FIG. 54 are not used. For this reason, the number of bytes of the I2C command protocol transmitted from the Slave SerDes 13 to the Slave 22 is reduced by two bytes.

Figure 53A:
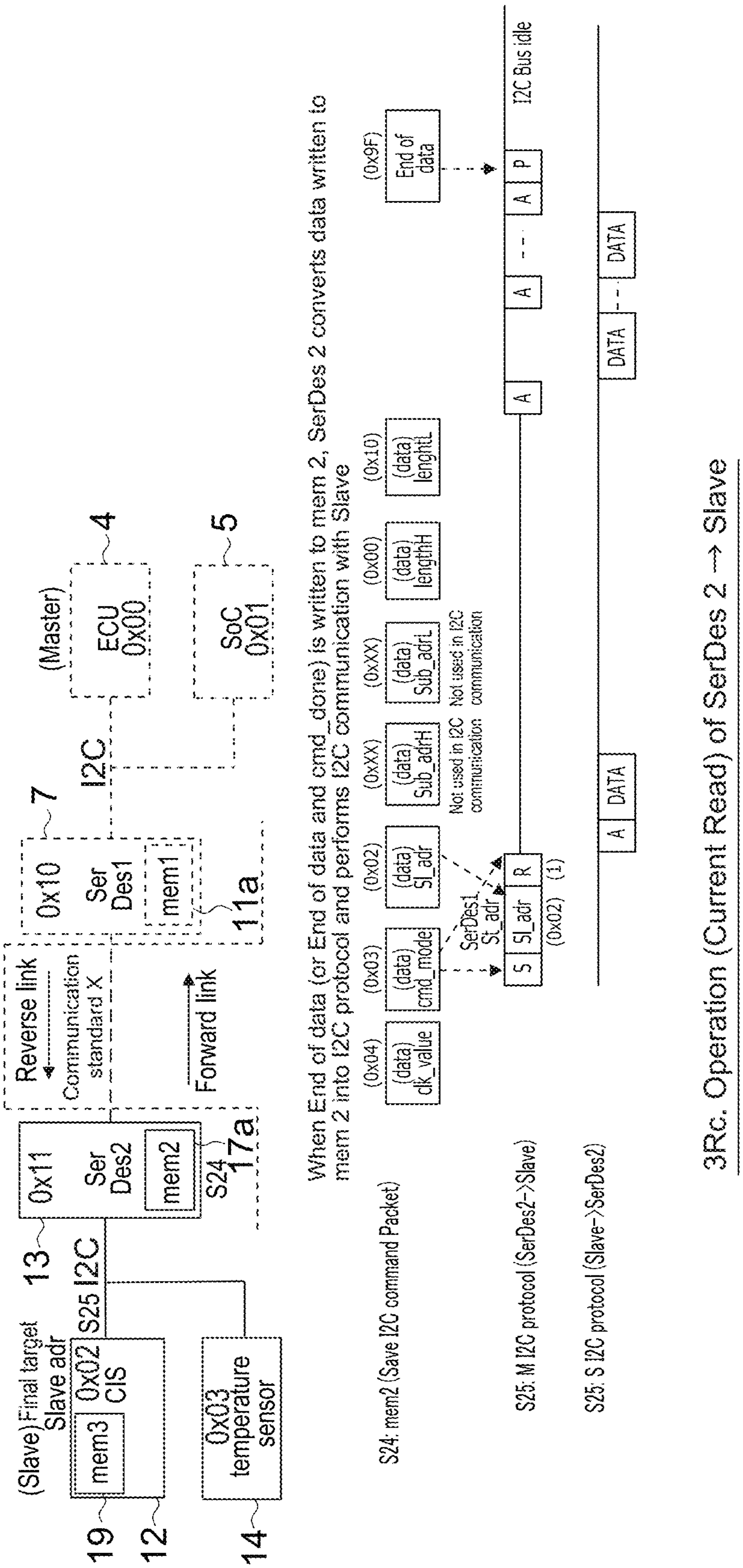
FIG. 53A is a diagram showing processing on the Slave SerDes side in the case where Current read is performed in the Bulk I2C mode.
Figure 53B:
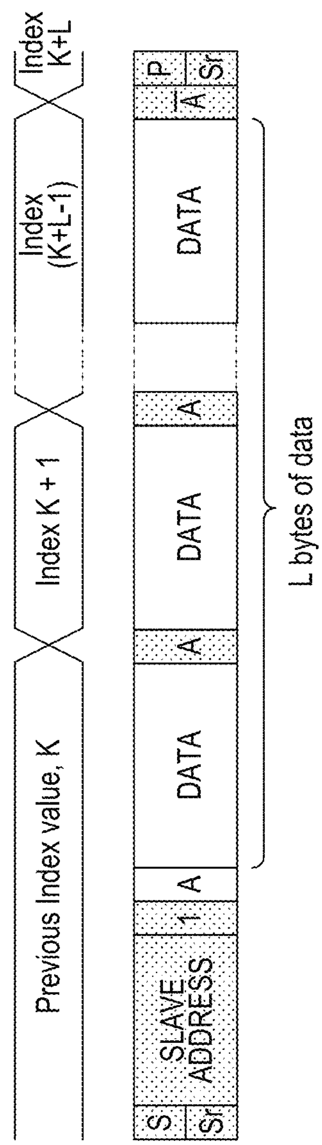
FIG. 53B is a diagram showing an I2C communication protocol in the case where the Current read is performed.

It can be seen that the Slave SerDes 13 and the Slave 22 in FIG. 53A communicate with each other over a protocol conforming to the I2C communication protocol shown in FIG. 53B.

(Error Command Format)

Figure 55:
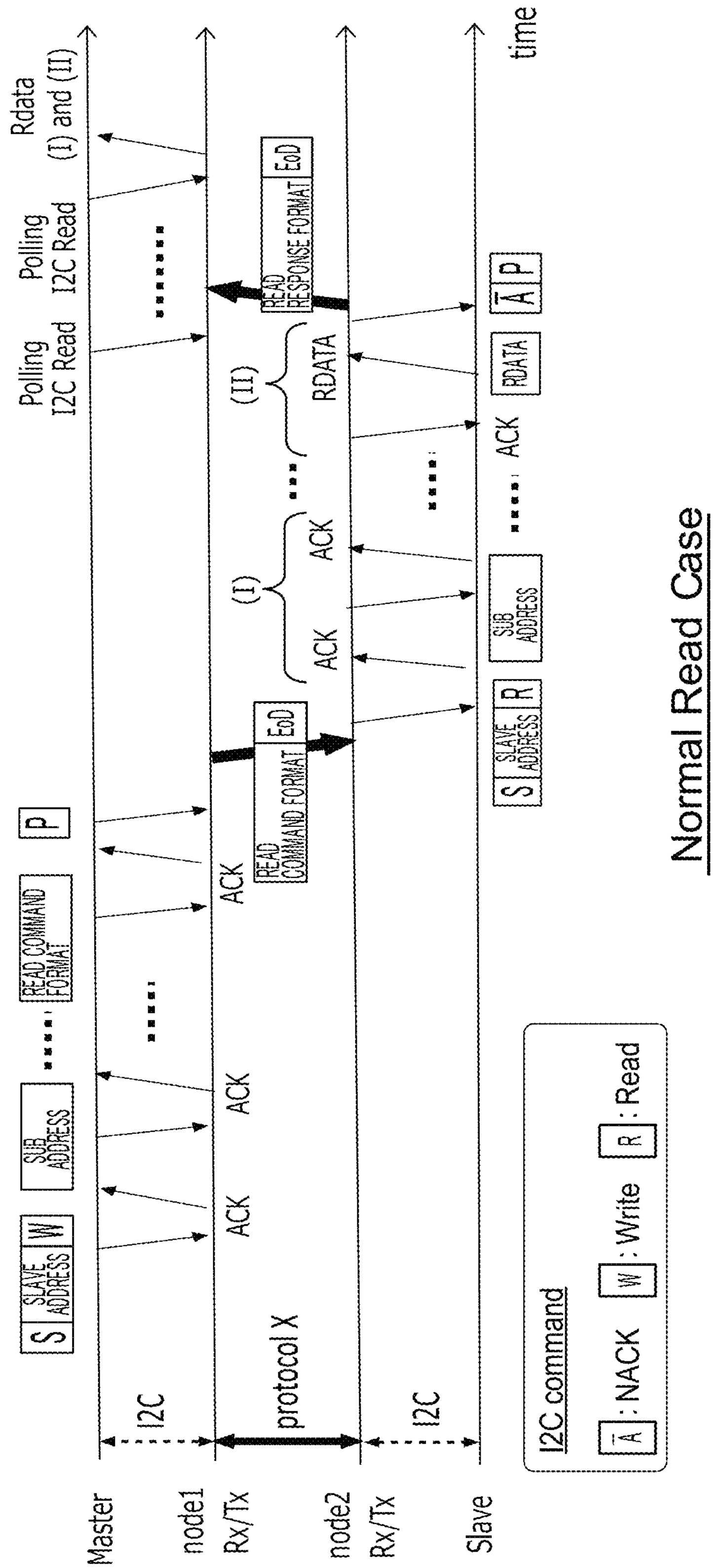
FIG. 55 is a timing chart of a Read operation in the normal state of the Bulk I2C mode.
Figure 56:
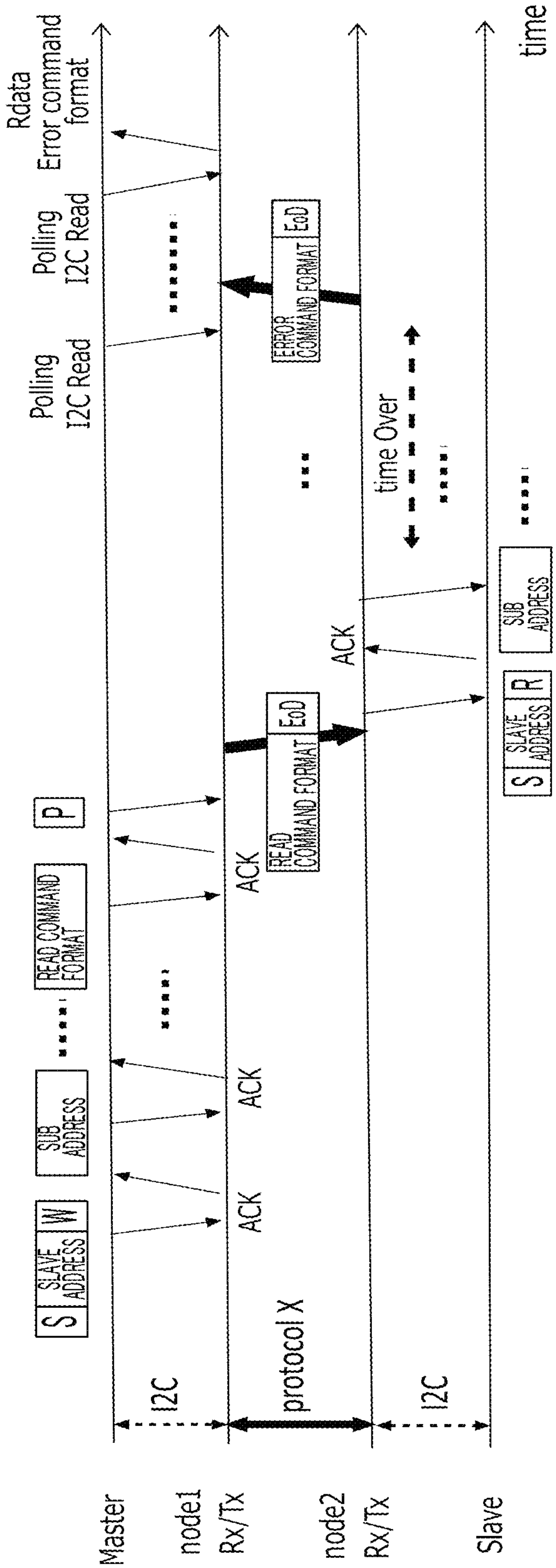
FIG. 56 is a diagram showing an example in which an ACK/NACK signal is not transmitted from the Slave during the limited time in the Bulk I2C mode.

As shown in FIG. 11B described above, in the case where the error command format is provided in the command format, data transmission in the error command format is performed if an error has occurred when the Bulk I2C mode is selected. FIG. 55 is a timing chart of the Read operation in the normal state of the Bulk I2C mode, and FIG. 56 is a timing chart in the case where an error has occurred during Read in the Bulk I2C mode (hereinafter, referred to as the Read error case 1).

As shown in FIG. 55, in the normal state, the node 2 transmits Slave address and offset address to the Slave 22, and then receives RDATA from the Slave 22 and transmits it to the node 1. FIG. 56 shows an example in which an ACK/NACK signal has not been received from the Slave 22 within the limited time after the node 2 transmits the offset address to the Slave 22. In this case, when the time is over, the node 2 forcibly terminates the communication with the Slave 22, transmits the error command format to the node 1, and performs initialization processing. The Master 21 determines that an error has occurred during the I2C communication, by reading the error command format received by the node 1.

FIG. 57 is a diagram showing the stored data of the table 3 in the mem 2 when the Slave SerDes 13 that is the node 2 in the Bulk I2C mode transmits the error command format. The value of the Read command format of SubAdr [0:7] is the same as that in the table 3 of FIG. 45. SubAdr [8:N−1] of the table 3 in FIG. 45 is a Read response format while SubAdr [8:N−1] in FIG. 57 is an error command format. RDATA is written to SubAdr [10:N−2] in FIG. 45 while SubAdr [10:N−2] in FIG. 57 is Don't care. Further, End of Data of the error command format is written to SubAdr [N−1] in FIG. 57.

FIG. 58 is a diagram showing the stored data of the table 1 in the mem 1 when the Master SerDes 7 that is the node 1 in the Bulk I2C mode transmits the error command format. The value of the Read command format of SubAdr [0:7] is the same as that of the table 1 in FIG. 50. SubAdr [8:N−1] of the table 1 in FIG. 50 is a Read response format while SubAdr [8:N−1] in FIG. 58 is an error command format. RDATA is written to SubAdr [N−3:N−2] in FIG. 45 while SubAdr [N−3:N−2] in FIG. 58 is Don't care. Since End of Data of the error command format is written to SubAdr [N−] in FIG. 58, the Master 21 is capable of performing the same polling processing between the normal time and the error time.

Figure 59:
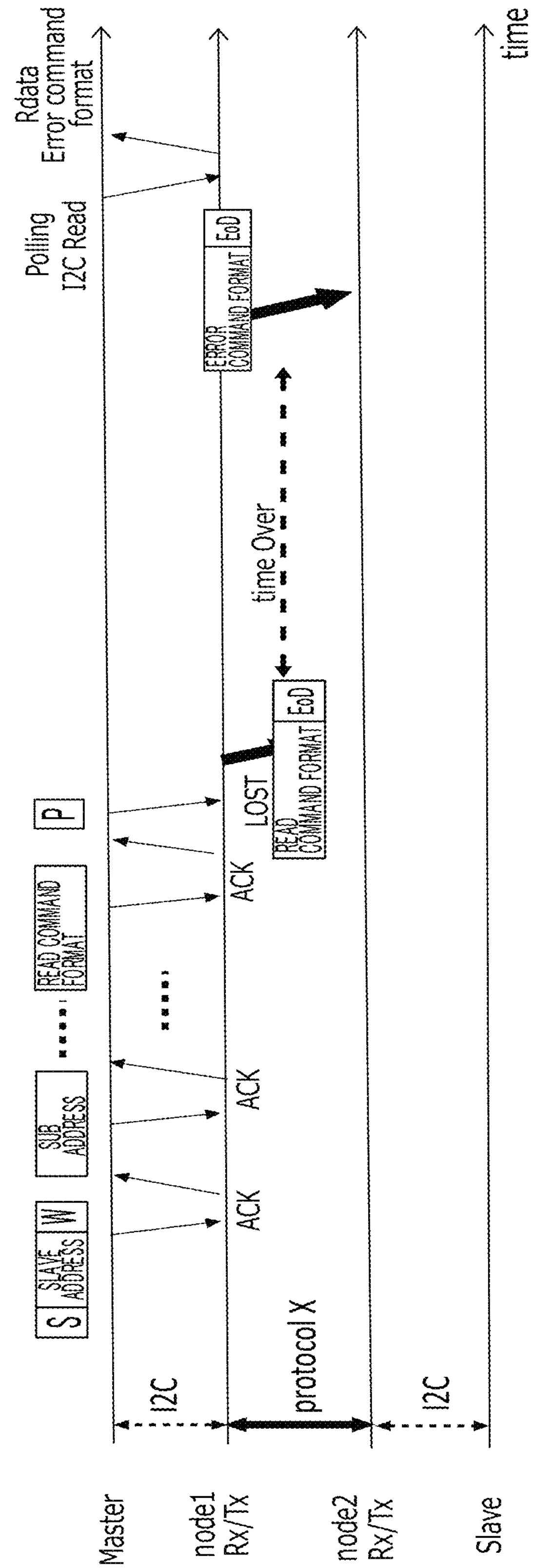
FIG. 59 is a timing chart of the case where an error has occurred during Read in the Bulk I2C mode (hereinafter, the Read error case 2)

FIG. 59 is a timing chart of the case where an error has occurred during Read in the Bulk I2C mode (hereinafter, referred to as the Read error case 2). FIG. 59 shows a case where the Read command format cannot be transmitted from the node 1 to the node 2. The node 1 transmits an error command format to the node 2 to notify that an error has occurred because the node 1 cannot transmit the Read command format to the node 2 within the limited time. The Master 21 determines that an error has occurred during I2C communication by reading the error command format of the node 1. When the node 2 receives the error command format, the node 2 performs initialization processing as necessary.

FIG. 60 is a diagram showing the stored data of the table 1 in the mem 1 of the node 1 (the Master SerDes 7) in the Read error case 2. The Read command format of SubAdr [0:7] is the same as the Read command format of SubAdr [0:7] of the table 1 in FIG. 50. SubAdr [8:N−1] in FIG. 50 is a Read response format while SubAdr [8:N−1] in FIG. 60 is an error command format. SubAdr [10:N−2] in the error command format is Don't care, and End of Data of the error command format is written to SubAdr [N−1]. For this reason, the Master 21 is capable of performing the same polling processing between the normal time and the error time.

FIG. 61 is a diagram showing the stored data of the table 1 in the mem 1 of the node 1 in a Write error case. The Write command format of SubAdr [0:N−1] is the same as the Write command format of SubAdr [0:N−1] of the table 1 in FIG. 35. SubAdr [N:N+9] in FIG. 35 is in an ACK/NACK format while SubAdr [N:N+9] in FIG. 61 is the error command format. SubAdr [N+2:N+8] in the error command format is Don't care, and End of Data of the error command format is written to SubAdr [N+9]. For this reason, the Master 21 is capable performing the same polling processing between the normal time and the error time.

Figure 62:
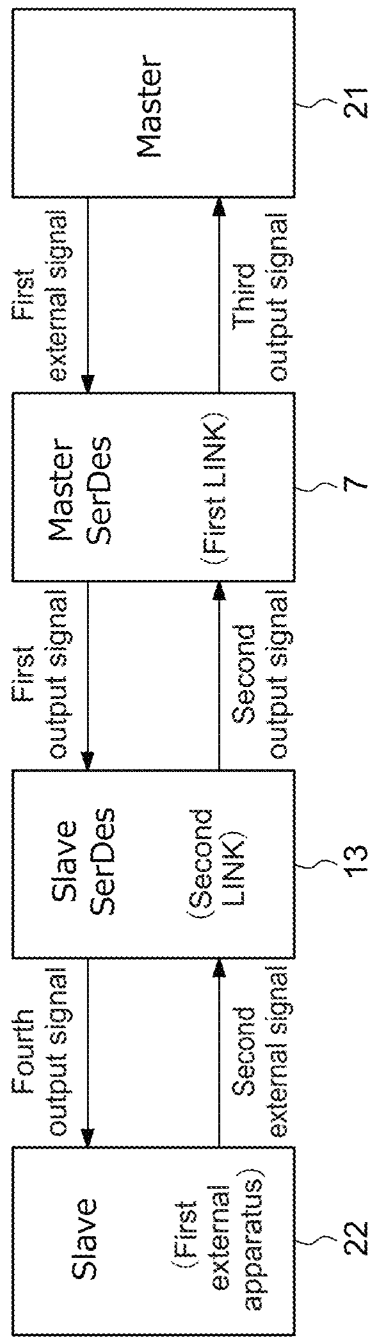
FIG. 62 is an equivalent block diagram of a communication system according to this embodiment.

FIG. 62 is an equivalent block diagram of the communication system 3 according to this embodiment. In the communication system 3 shown in FIG. 62, when data communication is performed between a first external apparatus corresponding to the Master 21 and a second external apparatus corresponding to the Slave 22, the Master SerDes 7 and the Slave SerDes 13 are provided between the Master 21 and the Slave 22 to relay data communication between the Master 21 and the Slave 22. The Master SerDes 7 includes a first LINK (the LINK 11). The Slave SerDes 13 includes a second LINK (the LINK 17). The first LINK generates, on the basis of the first external signal from the Master 21, a first output signal and outputs the generated signal to the Slave SerDes 13, and generates, on the basis of the second output signal from the Slave SerDes 13, a third output signal and outputs the generated signal to the Master 21. The second LINK generates, on the basis of the second external signal from the Slave 22, a second output signal and outputs the generated signal to the Master SerDes 7, and generates, on the basis of the first output signal output from the Master SerDes 7, a fourth output signal and outputs the generated signal to the Slave.

The first LINK is capable of alternatively selecting a first mode in which an ACK signal representing an affirmative response or a NACK signal representing a negative response is received every time a predetermined number of bytes of information (e.g., one byte or two bytes) is transmitted and a second mode in which an ACK signal or a NACK signal is received every time bulk information that is a mass of a plurality of bytes of information is transmitted. Each of the first output signal and the second external signal includes command information indicating the content of the command transmitted from the first external apparatus.

By configuring the communication system 3 as shown in FIG. 62, it is possible to perform data communication between the Master 21 and the Slave 22 at high speed.

Between the Master SerDes 7 and the Slave SerDes 13, for example, it is possible to perform data communication at high speed by a TDD method or an FDD (Frequency Division Duplexing) method.

As described above, in this embodiment, the Master SerDes 7 and the Slave SerDes 13 are disposed between the Master 21 and the Slave 22, and various type of information can be serially transmitted between the Master SerDes 7 and the Slave SerDes 13 at high speed using the communication standard X. The communication standard X may employ an FDD method or a TDD method. Between the Master SerDes 7 and the Slave SerDes 13, one of the Byte I2C mode (first mode) in which an ACK/NACK signal is received every time one-byte or two-byte information is transmitted and the Bulk I2C mode (second mode) in which an ACK/NACK signal is received every time bulk information that is a mass of a plurality of bytes of information is transmitted can be selected. In the case where the Byte I2C mode is selected, it is possible to perform I2C communication using the TDD method in a format similar to the I2C communication using the FDD method. Further, in the case where the Bulk I2C mode is selected, when the Master SerDes 7 receives a command that the Master 21 transmits to the Slave 22, the Master 21 is capable of returning ACK to the Master 21 at its own determination without standing by for ACK from the Slave 22. This allows the Master 21 to quickly receive ACK and quickly perform processing after receiving ACK. That is, the Master 21 is capable of shortening the period for stretching the clock until ACK is received, thereby improving the processing efficiency of the Master 21.

Note that the present technology may take the following configurations.

(1) A communication apparatus, including:

a LINK for performing protocol-conversion on a signal from a Master and outputting the converted signal to a Slave SerDes and for performing protocol-conversion on a signal from the Slave SerDes and outputting the converted signal to the Master, in which the LINK is capable of alternatively selecting a first mode and a second mode when transmitting the signal from the Master to the Slave SerDes, in the first mode, the LINK repeats processing of converting the signal transmitted from the Master into a signal of a first communication standard in units of one byte, receiving a signal of the first communication standard including one of an ACK signal representing an affirmative response and a NACK signal representing a negative response after transmitting the converted signal to the Slave SerDes, converting the received signal into a signal of a second communication standard, and transmitting the converted signal to the Master, in the second mode, the LINK transmits, to the Master, a signal including one of the ACK signal and the NACK signal every time a signal of a plurality of bytes transmitted from the Master is received byte by byte, collectively transmits the converted signal to the Slave SerDes after the conversion of the signal of a plurality of bytes received from the Master is completed, then, receives a signal of the first communication standard including one of the ACK signal and the NACK signal from the Slave SerDes and holds the received signal, and then, converts, in response to a read request from the Master, the signal of the first communication standard into a signal of the second communication standard and transmits the converted signal to the Master, a signal to be transmitted to the Slave SerDes includes command information indicating content transmitted from the Master, and a signal to be transmitted to the Master includes command information indicating content transmitted from the Slave SerDes.

(2) The communication apparatus according to (1), in which the number of bytes of the signal to be transmitted to the Slave SerDes in the first mode is one of 2 bytes and 3 bytes except for clock frequency information and error correction code.

(3) The communication apparatus according to (1) or (2), in which in the first mode, the LINK transitions to a first state upon receiving a signal including a Start Condition from the Master, converts, when transitioning to the first state, the Start Condition into a signal of the first communication standard and transmits the obtained signal to the Slave SerDes, then, transitions to a second state upon receiving, in the first state, a signal including address information of a final destination apparatus of one byte from the Master, and holds a clock from the Master at a low level, converts, in the second state, a signal including the address information into a signal of the first communication standard and transmits the obtained signal to the Slave SerDes, then, upon receiving, in the second state, a signal including one of the ACK signal and the NACK signal from the Slave SerDes, recognizes, where a specific bit of the signal including the address information has a first bit value, the specific bit as writing and transitions to a third state, and converts, in the third state, the signal including one of the ACK signal and the NACK signal received from the Slave SerDes into a signal of the second communication standard, transmits the obtained signal to the Master, and then, releases the holding of the low level of the clock from the Master.

(4) The communication apparatus according to (3), in which in the first mode, the LINK transitions to a fourth state upon receiving, in the third state, a signal including writing data of one byte from the Master, converts, in the fourth state, the received signal into a signal of the first communication standard, and transmits the obtained signal to the Slave SerDes, and then, upon receiving, in the fourth state, a signal including one of the ACK signal and the NACK signal from the Slave SerDes, converts the received signal into a signal of the second communication standard and transmits the obtained signal to the Master.

(5) The communication apparatus according to (4), in which in the first mode, the LINK transitions to a fifth state where the signal including one of the ACK signal and the NACK signal is not received from the Slave SerDes within a predetermined time period in one of the second state and the fourth state, and performs error processing in the fifth state.

(6) The communication apparatus according to (1) or (2), in which in the first mode, the LINK transitions to the first state upon receiving a signal including one of a Start Condition and a ReStart Condition from the Master, converts, when transitioning to the first state, the signal including one of the Start Condition and the ReStart Condition into a signal of the first communication standard and transmits the obtained signal to the Slave SerDes, then, transitions to the second state upon receiving, in the first state, a signal including address information of a final destination apparatus of one byte from the Master, and holds a clock from the Master at a low level, converts, in the second state, a signal including the address information into a signal of the first communication standard and transmits the obtained signal to the Slave SerDes, then, upon receiving, in the second state, a signal including one of the ACK signal and the NACK signal from the Slave SerDes, recognizes, where a specific bit of the signal including the address information has a second bit value, the specific bit as reading and transition to a sixth state, and converts, in the sixth state, the signal including one of the ACK signal and the NACK signal received from the Slave SerDes into a signal of the second communication standard, transmits the obtained signal to the Master, and then, releases the holding of the low level of the clock from the Master.

(7) The communication apparatus according to (6), in which in the first mode, the LINK transitions to a seventh state upon receiving, in the sixth state, a signal including reading data of one byte from the Slave SerDes, converts, in the seventh state, the received signal into a signal of the second communication standard, and transmits the obtained signal to the Master, and then, transitions to the sixth state upon receiving, in the seventh state, a signal including one of the ACK signal and the NACK signal from the Master, converts the received signal into a signal of the first communication standard, and transmits the obtained signal to the Slave SerDes.

(8) The communication apparatus according to (7), in which in the first mode, the LINK transitions to an eighth state where the reading data is not received from the Slave SerDes within the predetermined time period in the sixth state, transitions to the eighth state where the one of the ACK signal and the NACK signal is not received from the Master within the predetermined time period in the seventh state, and performs error processing in the eighth state to avoid deadlock of an entire system including the communication apparatus, the Master, and the Slave SerDes.

(9) The communication apparatus according to any one of (1) to (8), in which in the second mode, the LINK holds the received signal from when receiving the signal including the Start Condition to when receiving a signal including a Stop Condition, and transmits a signal including one of the ACK signal and the NACK signal to the Master byte by byte of the received signal, converts the received signal into a signal of the first communication standard, and transmits the converted signal to the Slave SerDes, and receives a signal including one of the ACK signal and the NACK signal from the Slave SerDes and holds the received signal, then converts, in accordance with a reading request from the Master, the signal from the Slave SerDes into a signal of the second communication standard, and transmits the obtained signal to the Master.

(10) The communication apparatus according to any one of (1) to (9), in which the command information includes at least one of first information for selecting one of the first mode and the second mode, second information for alternatively selecting, where the first mode is selected, whether one of the Slave SerDes and the communication apparatus generates a clock signal for transmitting and receiving data by its own determination or one of the Slave SerDes and the communication apparatus explicitly designates the clock signal to be used, third information indicating, where the first mode is selected, whether or not one of writing data and reading data is included, fourth information indicating, where the first mode is selected, whether or not the NACK signal is received, fifth information indicating, where the first mode is selected, whether or not the ACK signal is received, sixth information indicating, where the first mode is selected, whether or not a Stop Condition instructing to stop transmission of information is included, or seventh information indicating, where the first mode is selected, whether or not one of a Start Condition instructing to start transmission of information and a Repeated Start Condition instructing to resume transmission of information is included.

(11) The communication apparatus according to (10), in which in the first mode, the LINK transmits the signal including the seventh information to the Slave SerDes, and then transmits the signal including the address information of the final destination apparatus to the Slave SerDes.

(12) The communication apparatus according to (10), in which in the first mode, the LINK transmits a signal obtained by combining the seventh information and the address information of the final destination apparatus to the Slave SerDes.

(13) The communication apparatus according to any one of (1) to (12), in which each of the signal to the Slave SerDes and the signal to the Master includes, in addition to the command information, at least one of an error correction code, data, clock frequency information, or information indicating a type of a command to be transmitted and received.

(14) The communication apparatus according to any one of (1) to (13), in which the signal to the Slave SerDes includes at least one of final destination address information for identifying the final destination apparatus of the signal transmitted from the Master, sub-address information of the final destination apparatus, or data-length information indicating a length of data transmitted from the Master.

(15) The communication apparatus according to any one of (1) to (14), in which the command information includes, where the second mode is selected, command-format information defined by the first communication standard, and the command-format information includes an error command format.

(16) The communication apparatus according to any one of (1) to (15), in which the command information includes, where the second mode is selected, data-end-determination-condition information for specifying a condition for determining an end of the signal transmitted from the Master.

(17) The communication apparatus according to any one of (1) to (16), in which each of the signal to the Slave SerDes and the signal from the Slave SerDes includes a command obtained by performing protocol conversion on a command of I2C (Inter-Integrated Circuit) communication into a command of the first communication standard.

(18) The communication apparatus according to (17), in which the protocol conversion by the LINK is protocol conversion of TDD (Time Division Duplex).

(19) A communication apparatus, including:

a LINK for performing protocol-conversion on a signal from a Master SerDes and outputting the converted signal to a Slave and for performing protocol-conversion on a signal from the Slave and outputting the converted signal to the Master SerDes, in which the LINK is capable of alternatively selecting a first mode and a second mode when transmitting the signal from the Master SerDes to the Slave, in the first mode, the LINK repeats processing of converting a signal of a first communication standard transmitted from the Master SerDes into a signal of a second communication standard in units of the received signal, receiving a signal of the second communication standard including one of an ACK signal representing an affirmative response and a NACK signal representing a negative response after transmitting the converted signal to the Slave, converting the received signal into a signal of the first communication standard, and transmitting the converted signal to the Master SerDes, in the second mode, the LINK converts, upon receiving a signal of a plurality of bytes of the first communication standard transmitted from the Master SerDes, the received signal into a signal of the second communication standard, and transmits the converted signal to the Slave byte by byte, receives, every time the converted signal is transmitted to the Slave byte by byte, a signal of the second communication standard including one of the ACK signal and the NACK signal from the Slave and holds the received signal, and transmits, after finishing transmitting the signal from the Master SerDes to the Slave, a signal of the first communication standard corresponding to the held signal to the Master SerDes, a signal from the Master SerDes includes command information indicating content transmitted from the Master SerDes, and a signal from the Slave includes command information indicating content transmitted from the Slave.

(20) A communication system, including:

a Master SerDes that includes a first LINK; and a Slave SerDes that includes a second LINK, in which the first LINK is capable of alternatively selecting a first mode and a second mode when transmitting the signal from a Master to the Slave SerDes, in the first mode, the first LINK repeats processing of converting the signal transmitted from the Master into a signal of a first communication standard in units of one byte, receiving a signal of the first communication standard including one of an ACK signal representing an affirmative response and a NACK signal representing a negative response after transmitting the converted signal to the Slave SerDes, converting the received signal into a signal of a second communication standard, and transmitting the converted signal to the Master, in the second mode, the first LINK transmits, to the Master, a signal including one of the ACK signal and the NACK signal every time a signal of a plurality of bytes transmitted from the Master is received byte by byte, collectively transmits the converted signal to the Slave SerDes after the conversion of the signal of a plurality of bytes received from the Master is completed, then, receives a signal of the first communication standard including one of the ACK signal and the NACK signal from the Slave SerDes and holds the received signal, and then, converts, in response to a read request from the Master, the signal of the first communication standard into a signal of the second communication standard and transmits the converted signal to the Master, a signal to be transmitted to the Slave SerDes includes command information indicating content transmitted from the Master, a signal to be transmitted to the Master includes command information indicating content transmitted from the Slave SerDes, the second LINK is capable of alternatively selecting a first mode and a second mode when transmitting the signal from the Master SerDes to the Slave, in the first mode, the second LINK repeats processing of converting a signal of a first communication standard transmitted from the Master SerDes into a signal of a second communication standard in units of the received signal, receiving a signal of the second communication standard including one of an ACK signal representing an affirmative response and a NACK signal representing a negative response transmitted from the Slave after transmitting the converted signal to the Slave, converting the received signal into a signal of the first communication standard, and transmitting the converted signal to the Master SerDes, in the second mode, the second LINK converts, upon receiving a signal of a plurality of bytes of the first communication standard transmitted from the Master SerDes, the received signal into a signal of the second communication standard, and transmits the converted signal to the Slave byte by byte, receives, every time the converted signal is transmitted to the Slave byte by byte, a signal of the second communication standard including one of the ACK signal and the NACK signal from the Slave and holds the received signal, and transmits, after finishing transmitting the signal from the Master SerDes to the Slave, a signal of the first communication standard corresponding to the held signal to the Master SerDes, a signal from the Master SerDes includes command information indicating content transmitted from the Master SerDes, and a signal from the Slave includes command information indicating content transmitted from the Slave.

Embodiments of the present disclosure are not limited to the individual embodiments described above, but also include various modifications that may be conceived by those skilled in the art, and the effects of the present disclosure are not limited to the content described above. In other words, various additions, modifications, and partial deletions may be made without departing from the conceptual idea and essence of the present disclosure, which is derived from the content defined in the claims and the equivalents thereof.

It should be understood by those skilled in the art that various modifications, combinations, sub-combinations and alterations may occur depending on design requirements and other factors insofar as they are within the scope of the appended claims or the equivalents thereof.

What is claimed is:

1. A communication apparatus, comprising:

a memory storing program code; and a processor configured to execute the program code to perform operations comprising:

a LINK for performing protocol-conversion on a signal from a Master and outputting the converted signal to a Slave Serializer/Deserializer (SerDes) and for performing protocol-conversion on a signal from the Slave SerDes and outputting the converted signal to the Master, wherein the LINK is configured for alternatively selecting a first mode and a second mode when transmitting the signal from the Master to the Slave SerDes, in the first mode, the LINK repeats processing of converting the signal transmitted from the Master into a signal of a first communication standard in units of one byte, receiving a signal of the first communication standard including one of an acknowledgement (ACK) signal representing an affirmative response and a non-acknowledgement (NACK) signal representing a negative response after transmitting the converted signal to the Slave SerDes, converting the received signal into a signal of a second communication standard, and transmitting the converted signal to the Master, in the second mode, the LINK transmits, to the Master, a signal including one of the ACK signal and the NACK signal every time a signal of a plurality of bytes transmitted from the Master is received byte by byte, collectively transmits the converted signal to the Slave SerDes after the conversion of the signal of a plurality of bytes received from the Master is completed, then, receives a signal of the first communication standard including one of the ACK signal and the NACK signal from the Slave SerDes and holds the received signal, and then, converts, in response to a read request from the Master, the signal of the first communication standard into a signal of the second communication standard and transmits the converted signal to the Master, a signal to be transmitted to the Slave SerDes includes command information indicating content transmitted from the Master, and a signal to be transmitted to the Master includes command information indicating content transmitted from the Slave SerDes.

2. The communication apparatus according to claim 1, wherein a number of bytes of the signal to be transmitted to the Slave SerDes in the first mode is one of 2 bytes and 3 bytes except for clock frequency information and error correction code.

3. The communication apparatus according to claim 1, wherein in the first mode, the LINK transitions to a first state upon receiving a signal including a Start Condition from the Master, converts, when transitioning to the first state, the Start Condition into a signal of the first communication standard and transmits the obtained signal to the Slave SerDes, then, transitions to a second state upon receiving, in the first state, a signal including address information of a final destination apparatus of one byte from the Master, and holds a clock from the Master at a low level, converts, in the second state, a signal including the address information into a signal of the first communication standard and transmits the obtained signal to the Slave SerDes, then, upon receiving, in the second state, a signal including one of the ACK signal and the NACK signal from the Slave SerDes, recognizes, where a specific bit of the signal including the address information has a first bit value, the specific bit as writing and transitions to a third state, and converts, in the third state, the signal including one of the ACK signal and the NACK signal received from the Slave SerDes into a signal of the second communication standard, transmits the obtained signal to the Master, and then, releases the holding of the low level of the clock from the Master.

4. The communication apparatus according to claim 3, wherein in the first mode, the LINK transitions to a fourth state upon receiving, in the third state, a signal including writing data of one byte from the Master, converts, in the fourth state, the received signal into a signal of the first communication standard, and transmits the obtained signal to the Slave SerDes, and then, upon receiving, in the fourth state, a signal including one of the ACK signal and the NACK signal from the Slave SerDes, converts the received signal into a signal of the second communication standard and transmits the obtained signal to the Master.

5. The communication apparatus according to claim 4, wherein in the first mode, the LINK transitions to a fifth state where the signal including one of the ACK signal and the NACK signal is not received from the Slave SerDes within a predetermined time period in one of the second state and the fourth state, and performs error processing in the fifth state.

6. The communication apparatus according to claim 1, wherein in the first mode, the LINK transitions to the first state upon receiving a signal including one of a Start Condition and a ReStart Condition from the Master, converts, when transitioning to the first state, the signal including one of the Start Condition and the ReStart Condition into a signal of the first communication standard and transmits the obtained signal to the Slave SerDes, then, transitions to the second state upon receiving, in the first state, a signal including address information of a final destination apparatus of one byte from the Master, and holds a clock from the Master at a low level, converts, in the second state, a signal including the address information into a signal of the first communication standard and transmits the obtained signal to the Slave SerDes, then, upon receiving, in the second state, a signal including one of the ACK signal and the NACK signal from the Slave SerDes, recognizes, where a specific bit of the signal including the address information has a second bit value, the specific bit as reading and transition to a sixth state, and converts, in the sixth state, the signal including one of the ACK signal and the NACK signal received from the Slave SerDes into a signal of the second communication standard, transmits the obtained signal to the Master, and then, releases the holding of the low level of the clock from the Master.

7. The communication apparatus according to claim 6, wherein in the first mode, the LINK transitions to a seventh state upon receiving, in the sixth state, a signal including reading data of one byte from the Slave SerDes, converts, in the seventh state, the received signal into a signal of the second communication standard, and transmits the obtained signal to the Master, and then, transitions to the sixth state upon receiving, in the seventh state, a signal including one of the ACK signal and the NACK signal from the Master, converts the received signal into a signal of the first communication standard, and transmits the obtained signal to the Slave SerDes.

8. The communication apparatus according to claim 7, wherein in the first mode, the LINK transitions to an eighth state where the reading data is not received from the Slave SerDes within the predetermined time period in the sixth state, transitions to the eighth state where the one of the ACK signal and the NACK signal is not received from the Master within the predetermined time period in the seventh state, and performs error processing in the eighth state to avoid deadlock of an entire system including the communication apparatus, the Master, and the Slave SerDes.

9. The communication apparatus according to claim 1, wherein in the second mode, the LINK holds the received signal from when receiving the signal including the Start Condition to when receiving a signal including a Stop Condition, and transmits a signal including one of the ACK signal and the NACK signal to the Master byte by byte of the received signal, converts the received signal into a signal of the first communication standard, and transmits the converted signal to the Slave SerDes, and receives a signal including one of the ACK signal and the NACK signal from the Slave SerDes and holds the received signal, then converts, in accordance with a reading request from the Master, the signal from the Slave SerDes into a signal of the second communication standard, and transmits the obtained signal to the Master.

10. The communication apparatus according to claim 1, wherein the command information includes at least one of first information for selecting one of the first mode and the second mode, second information for alternatively selecting, where the first mode is selected, whether one of the Slave SerDes and the communication apparatus generates a clock signal for transmitting and receiving data by its own determination or one of the Slave SerDes and the communication apparatus explicitly designates the clock signal to be used, third information indicating, where the first mode is selected, whether or not one of writing data and reading data is included, fourth information indicating, where the first mode is selected, whether or not the NACK signal is received, fifth information indicating, where the first mode is selected, whether or not the ACK signal is received, sixth information indicating, where the first mode is selected, whether or not a Stop Condition instructing to stop transmission of information is included, or seventh information indicating, where the first mode is selected, whether or not one of a Start Condition instructing to start transmission of information and a Repeated Start Condition instructing to resume transmission of information is included.

11. The communication apparatus according to claim 10, wherein in the first mode, the LINK transmits the signal including the seventh information to the Slave SerDes, and then transmits the signal including the address information of the final destination apparatus to the Slave SerDes.

12. The communication apparatus according to claim 10, wherein in the first mode, the LINK transmits a signal obtained by combining the seventh information and the address information of the final destination apparatus to the Slave SerDes.

13. The communication apparatus according to claim 1, wherein each of the signal to the Slave SerDes and the signal to the Master includes, in addition to the command information, at least one of an error correction code, data, clock frequency information, or information indicating a type of a command to be transmitted and received.

14. The communication apparatus according to claim 1, wherein the signal to the Slave SerDes includes at least one of final destination address information for identifying the final destination apparatus of the signal transmitted from the Master, sub-address information of the final destination apparatus, or data-length information indicating a length of data transmitted from the Master.

15. The communication apparatus according to claim 1, wherein the command information includes, where the second mode is selected, command-format information defined by the first communication standard, and the command-format information includes an error command format.

16. The communication apparatus according to claim 1, wherein the command information includes, where the second mode is selected, data-end-determination-condition information for specifying a condition for determining an end of the signal transmitted from the Master.

17. The communication apparatus according to claim 1, wherein each of the signal to the Slave SerDes and the signal from the Slave SerDes includes a command obtained by performing protocol conversion on a command of I2C (Inter-Integrated Circuit) communication into a command of the first communication standard.

18. The communication apparatus according to claim 17, wherein the protocol conversion by the LINK is protocol conversion of TDD (Time Division Duplex).

19. A communication apparatus, comprising:

a memory storing program code; and a processor configured to execute the program code to perform operations comprising:

a LINK for performing protocol-conversion on a signal from a Master SerDes and outputting the converted signal to a Slave and for performing protocol-conversion on a signal from the Slave and outputting the converted signal to the Master Serializer/Deserializer (SerDes), wherein the LINK is configured for alternatively selecting a first mode and a second mode when transmitting the signal from the Master SerDes to the Slave, in the first mode, the LINK repeats processing of converting a signal of a first communication standard transmitted from the Master SerDes into a signal of a second communication standard in units of the received signal, receiving a signal of the second communication standard including one of an acknowledgement (ACK) signal representing an affirmative response and a non-acknowledgement) (NACK) signal representing a negative response after transmitting the converted signal to the Slave, converting the received signal into a signal of the first communication standard, and transmitting the converted signal to the Master SerDes, in the second mode, the LINK converts, upon receiving a signal of a plurality of bytes of the first communication standard transmitted from the Master SerDes, the received signal into a signal of the second communication standard, and transmits the converted signal to the Slave byte by byte, receives, every time the converted signal is transmitted to the Slave byte by byte, a signal of the second communication standard including one of the ACK signal and the NACK signal from the Slave and holds the received signal, and transmits, after finishing transmitting the signal from the Master SerDes to the Slave, a signal of the first communication standard corresponding to the held signal to the Master SerDes, a signal from the Master SerDes includes command information indicating content transmitted from the Master SerDes, and a signal from the Slave includes command information indicating content transmitted from the Slave.

20. A communication system, comprising:

a first memory storing a first program code, and a first processor configured to execute the first program code to perform operations of a Master Serializer/Deserializer (SerDes) that includes a first LINK; and a second memory storing a second program code, and a second processor configured to execute the second program code to perform operations of a Slave SerDes that includes a second LINK, wherein the first LINK is configured for alternatively selecting a first mode and a second mode when transmitting the signal from a Master to the Slave SerDes, in the first mode, the first LINK repeats processing of converting the signal transmitted from the Master into a signal of a first communication standard in units of one byte, receiving a signal of the first communication standard including one of an acknowledgement (ACK) signal representing an affirmative response and a non-acknowledgement (NACK) signal representing a negative response after transmitting the converted signal to the Slave SerDes, converting the received signal into a signal of a second communication standard, and transmitting the converted signal to the Master, in the second mode, the first LINK transmits, to the Master, a signal including one of the ACK signal and the NACK signal every time a signal of a plurality of bytes transmitted from the Master is received byte by byte, collectively transmits the converted signal to the Slave SerDes after the conversion of the signal of a plurality of bytes received from the Master is completed, then, receives a signal of the first communication standard including one of the ACK signal and the NACK signal from the Slave SerDes and holds the received signal, and then, converts, in response to a read request from the Master, the signal of the first communication standard into a signal of the second communication standard and transmits the converted signal to the Master, a signal to be transmitted to the Slave SerDes includes command information indicating content transmitted from the Master, a signal to be transmitted to the Master includes command information indicating content transmitted from the Slave SerDes, the second LINK is configured for alternatively selecting a first mode and a second mode when transmitting the signal from the Master SerDes to the Slave, in the first mode, the second LINK repeats processing of converting a signal of a first communication standard transmitted from the Master SerDes into a signal of a second communication standard in units of the received signal, receiving a signal of the second communication standard including one of an ACK signal representing an affirmative response and a NACK signal representing a negative response transmitted from the Slave after transmitting the converted signal to the Slave, converting the received signal into a signal of the first communication standard, and transmitting the converted signal to the Master SerDes, in the second mode, the second LINK converts, upon receiving a signal of a plurality of bytes of the first communication standard transmitted from the Master SerDes, the received signal into a signal of the second communication standard, and transmits the converted signal to the Slave byte by byte, receives, every time the converted signal is transmitted to the Slave byte by byte, a signal of the second communication standard including one of the ACK signal and the NACK signal from the Slave and holds the received signal, and transmits, after finishing transmitting the signal from the Master SerDes to the Slave, a signal of the first communication standard corresponding to the held signal to the Master SerDes, a signal from the Master SerDes includes command information indicating content transmitted from the Master SerDes, and a signal from the Slave includes command information indicating content transmitted from the Slave.

* * * * *